United States Patent
Shah et al.

(10) Patent No.: US 12,481,411 B1
(45) Date of Patent: Nov. 25, 2025

(54) CONTEXT-SPECIFIC LARGE LANGUAGE MODEL FUNCTION BUTTONS

(71) Applicant: Dropbox, Inc., San Francisco, CA (US)

(72) Inventors: Hiten Shah, Redwood City, CA (US); Richard Chan, Flushing, NY (US); Theo Richardson, Toronto (CA)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 19/196,582

(22) Filed: May 1, 2025

Related U.S. Application Data

(60) Provisional application No. 63/793,486, filed on Apr. 23, 2025.

(51) Int. Cl.
  *G06F 3/04817* (2022.01)
  *G06F 40/166* (2020.01)

(52) U.S. Cl.
  CPC ........ *G06F 3/04817* (2013.01); *G06F 40/166* (2020.01)

(58) Field of Classification Search
  CPC ............................ G06F 3/04817; G06F 3/0482
  See application file for complete search history.

(56) References Cited

U.S. PATENT DOCUMENTS

| | | | |
|---|---|---|---|
| 7,953,756 B1 | 5/2011 | Qin | |
| 8,463,608 B2 | 6/2013 | Dow et al. | |
| 8,589,950 B2 | 11/2013 | Treat et al. | |
| 9,916,328 B1 * | 3/2018 | Sharifi | G06F 16/24578 |
| 11,256,735 B2 | 2/2022 | Narth et al. | |
| 12,321,725 B1 | 6/2025 | Wilson et al. | |
| 12,380,340 B1 | 8/2025 | Mamut et al. | |
| 2002/0042688 A1 | 4/2002 | Banfer | |
| 2006/0026532 A1 | 2/2006 | Pagan | |
| 2012/0260203 A1 | 10/2012 | Commarford et al. | |
| 2012/0268361 A1 | 10/2012 | Shotel et al. | |

(Continued)

FOREIGN PATENT DOCUMENTS

| | | |
|---|---|---|
| EP | 2515513 A1 | 10/2012 |
| EP | 2853314 A1 | 4/2015 |

OTHER PUBLICATIONS

Non-Final Office Action from U.S. Appl. No. 19/196,586, mailed on Jun. 17, 2025, 27 pages.

(Continued)

*Primary Examiner* — Asher D Kells
(74) *Attorney, Agent, or Firm* — Keller Preece PLLC

(57) ABSTRACT

This disclosure describes systems that generate a selection of large language model (LLM) function buttons in a floating widget within a web browser of a client device. The disclosed systems can generate or otherwise select the LLM function buttons to include based on context of a webpage within the web browser. Responsive to detecting an indication of an interaction with an LLM function button, the disclosed systems can generate a side panel within the web browser according to the LLM function button. In some embodiments, the disclosed systems can display and utilize a customized LLM function button responsive to detecting a certain webpage or content within the webpage. Further, in some embodiments, the disclosed systems can generate an LLM function button to perform a customized workflow responsive to detecting a certain webpage or content within the webpage.

20 Claims, 29 Drawing Sheets

(56) References Cited

U.S. PATENT DOCUMENTS

| | | | |
|---|---|---|---|
| 2017/0118258 A1 | 4/2017 | Lieb | |
| 2017/0255865 A1 | 9/2017 | Riscutia et al. | |
| 2018/0300028 A1* | 10/2018 | Vora | G06Q 30/0277 |
| 2019/0179875 A1 | 6/2019 | Lowery et al. | |
| 2021/0034693 A1* | 2/2021 | Semerad | G06F 16/986 |
| 2021/0256076 A1* | 8/2021 | McMurray | G06F 16/958 |
| 2022/0012299 A1 | 1/2022 | Wittke et al. | |
| 2024/0256615 A1* | 8/2024 | Liu | G06F 16/9532 |
| 2024/0256618 A1 | 8/2024 | Adada et al. | |
| 2024/0281481 A1* | 8/2024 | Yushkina | G06F 9/44526 |
| 2024/0362036 A1* | 10/2024 | Jacob | G06F 3/0481 |
| 2024/0403328 A1 | 12/2024 | Hecht et al. | |
| 2025/0005655 A1 | 1/2025 | Bennett et al. | |
| 2025/0053430 A1 | 2/2025 | Jones et al. | |
| 2025/0095808 A1* | 3/2025 | Davelaar | G06F 3/0482 |
| 2025/0117573 A1* | 4/2025 | Azose | G06N 20/00 |
| 2025/0123863 A1* | 4/2025 | LaForge | H04L 67/53 |
| 2025/0173043 A1 | 5/2025 | Ma et al. | |
| 2025/0199891 A1* | 6/2025 | Brazier | G06F 9/451 |

OTHER PUBLICATIONS

Non-Final Office Action from U.S. Appl. No. 19/196,588, mailed on Jul. 1, 2025, 22 pages.
Final Office Action from U.S. Appl. No. 19/196,586 mailed on Sep. 11, 2025, 33 pages.
Final Office Action from U.S. Appl. No. 19/196,588 mailed on Sep. 10, 2025, 26 pages.

* cited by examiner

CONTEXT-SPECIFIC LARGE LANGUAGE MODEL FUNCTION BUTTONS

CROSS-REFERENCE TO RELATED APPLICATIONS

This application claims the benefit of, and priority to, U.S. Provisional Application No. 63/793,486, entitled CONTEXT-SPECIFIC LARGE LANGUAGE MODEL FUNCTION BUTTONS, filed Apr. 23, 2025, the contents of which are incorporated by reference herein in their entirety.

BACKGROUND

Advancements in computing devices and networking technology have given rise to a variety of innovations in cloud-based digital content storage, retrieval, and processing. For example, advancements in cloud-based infrastructures and distributed computing systems has provided access to creation and storage of vast amounts of digital content. Further, existing systems also broadly provide access to artificial intelligence models that can access the digital content to accomplish a variety of tasks for user accounts. Indeed, existing systems can use artificial intelligence models to generate responses to user queries and/or to generate content for user accounts. Despite these capabilities, existing systems suffer from a variety of technical deficiencies, especially regarding efficiency, operational flexibility, and accuracy.

As mentioned briefly above, conventional systems suffer from a number of technical disadvantages or deficiencies with regard to utilizing artificial intelligence models. For example, conventional systems are often inefficient. For the most part, conventional systems provide access to artificial intelligence models within a singular webpage and/or application. The localized manner in which conventional systems provide access to artificial intelligence models is navigationally inefficient, often requiring excessive navigation through numerous device interactions to navigate to the virtual location (e.g., a webpage and/or application) dedicated to an artificial intelligence model. Providing limited, localized access to artificial intelligence models requires excessive numbers of device interactions to interact with and provide information to (e.g., by locating and separately uploading) the artificial intelligence models. Processing these excessive navigational interactions at multiple levels (sometimes in entirely separate applications or platforms) also consumes excessive computing resources that could otherwise be preserved with a more efficient system.

In addition to being inefficient, many conventional systems are operationally inflexible. Indeed, as noted above, most existing content management systems utilize rigid approaches to providing access to artificial intelligence models, requiring a user account to navigate to a specific, localized web address, webpage, or application to interact with artificial intelligence models. But the isolated, localized nature of many existing systems limits the functionality and applicability of artificial intelligence models. For example, an artificial intelligence model that is localized to a specific web address is limited in the tasks it can perform for a user account by the inputs it receives (e.g., such as a prompt and/or uploaded content item). Further, existing systems are limited to using artificial intelligence models to perform static, predetermined workflows based on generalized parameters of artificial intelligence models.

In addition to being inefficient and operationally inflexible, many systems are also inaccurate. Indeed, conventional systems are prone to hallucinations or other inaccurate responses due to their incomplete data. Because conventional artificial intelligence models depend heavily on prompts/provided inputs to generate responses, the accuracy of responses generated by conventional systems is inherently limited by the amounts of detail and information provided by the prompts or inputs.

SUMMARY

Embodiments of the present disclosure provide benefits and/or solve one or more of the foregoing or other problems in the art with systems, non-transitory computer-readable media, and methods for providing access to artificial intelligence models using a floating widget approach. For instance, the disclosed systems can generate a floating large language model (LLM) function widget (sometimes hereinafter referred to as a "floating widget") that persists or follows across webpages (independent of webpage content) of a web browser and that includes one or more LLM function buttons. The disclosed systems can generate the LLM function buttons to be selectable to execute one or more tasks based on content of a displayed webpage. Accordingly, the disclosed systems can determine which LLM function buttons to provide (and which to omit) in the widget based on displayed content displayed in a web browser. Further, the disclosed systems can determine a change in the displayed content, such as by detecting a navigational input from one webpage to another webpage that displays new content. Based on determining the change in the displayed content, the disclosed systems can modify the selection of one or more LLM function buttons within the floating widget to include a new LLM function button that corresponds to the new content.

Additionally, the disclosed systems can provide a tool for generating custom LLM function buttons. The tool can include options for customizing function and appearance of an LLM function button. Upon generating a button, the disclosed systems can display the custom LLM function button within a floating widget in a webpage responsive to determining that a web address of the webpage matches one or more predetermined web addresses. Further, the disclosed systems can adapt the function of the custom LLM function button to be applicable to one or more webpages, such as a group of webpages within a domain. Moreover, in some embodiments, the disclosed systems can record actions performed by a user account and generate the custom LLM function button to replicate the actions performed by the user account.

Additionally, the disclosed systems can generate an LLM function button to automatedly or autonomously perform a workflow for a user account (e.g., an autonomous workflow function button). The disclosed systems can record a set of user account interactions corresponding to a webpage and can determine a series of functions corresponding to the set of user account interactions. The disclosed systems can generate a function prompt to use an LLM to perform, mimic, or recreate the set of user account interactions. Further, in some embodiments, the disclosed systems can determine to generate the autonomous workflow function button based on determining a repeated access pattern and a repeated action pattern corresponding to the webpage.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure will describe one or more example implementations of the systems and methods with additional specificity and detail by referencing the accompanying figures. The following paragraphs briefly describe those figures.

DETAILED DESCRIPTION

This disclosure describes one or more embodiments of a function button system that utilizes large language model (LLM) function buttons to perform functions for user accounts. For example, the function button system 1) generates a floating widget that includes one or more LLM function buttons according to content of a webpage. Additionally, the function button system 2) generates contextualized LLM function buttons for execution of customized tasks relating to specific webpages. Further, the function button system 3) generates an LLM function button to perform autonomous workflows relating to specific webpages. More detail regarding each enumerated topic is provided under the respective headings below.

Floating Widget and Function Buttons:

As mentioned, the function button system can generate a floating large language model (LLM) function widget (sometimes hereinafter referred to as a "floating widget") that adapts to different content presented in different webpages of a web browser. The function button system can detect content of the webpage and can generate the floating widget to include one or more large language model (LLM) function buttons according to the content of the webpage. Further, based on detecting a change in content of the webpage, the function button system can modify a location of the floating widget as well as modify the one or more LLM function buttons within the floating widget according to the change in content.

Figure 1:
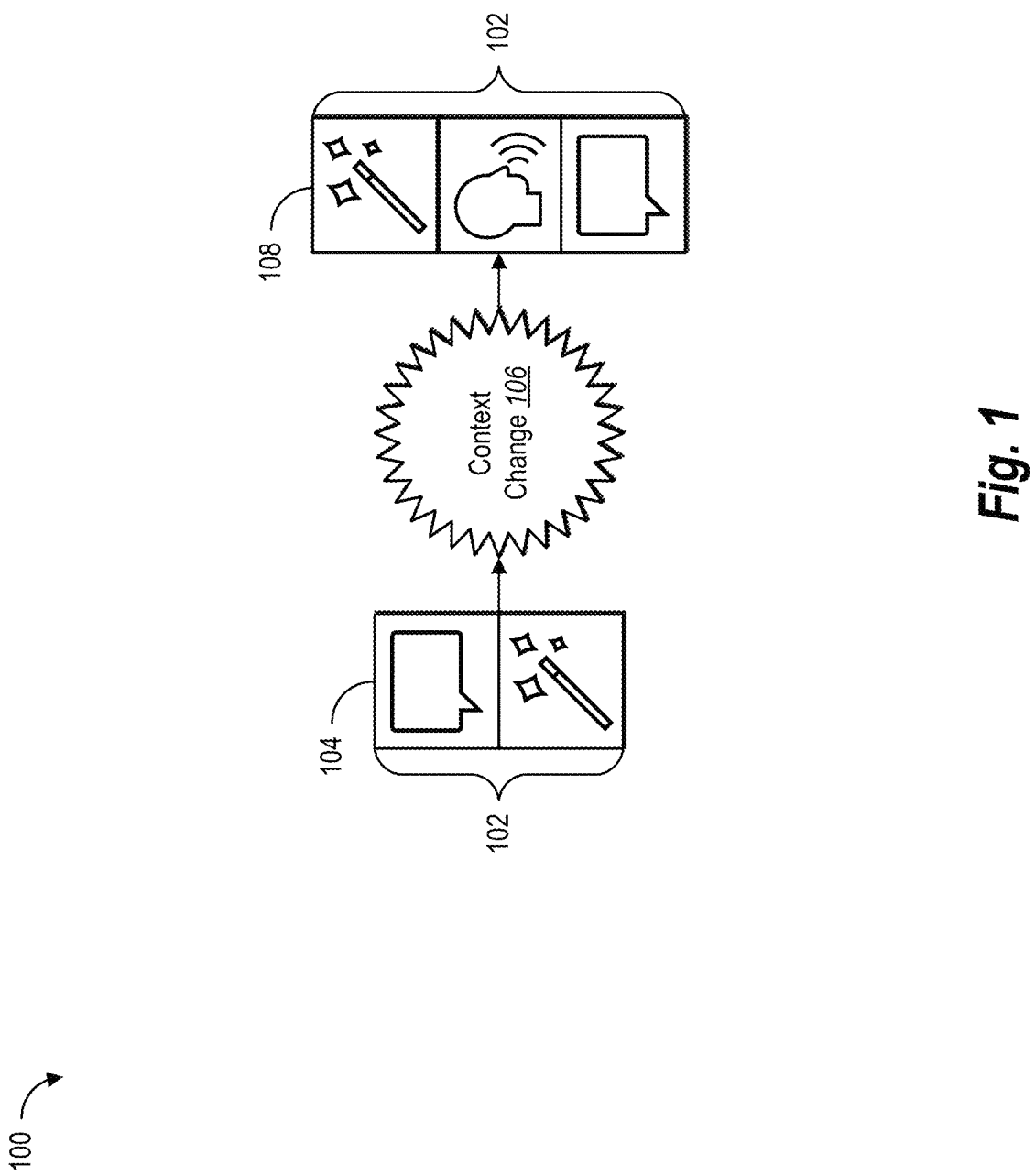
FIG. 1 illustrates an overview of a function button system generating a floating widget that includes a subset of a plurality of large language model (LLM) function buttons and modifying the subset of LLM function buttons according to a context change in accordance with some embodiments.

As just mentioned, the function button system can generate a floating widget that overlays content of a webpage and that is independent from the webpage. As part of a web browser extension or other installable computer application, the function button system can generate the floating widget to be draggable/movable within the bounds of the webpage and/or within the bounds of the web browser window. As also noted, the function button system can include one or more LLM function buttons in the floating widget according to content of the webpage. The function button system can generate the one or more LLM function buttons to be selectable to execute tasks relating to the content of the webpage. Responsive to determining a change in content and/or context, the function button system can modify the floating widget to include one or more additional LLM function buttons. FIG. 1 illustrates an overview of modifying a floating widget responsive to determining a context change in accordance with one or more embodiments. Additional detail regarding the acts and processes introduced in relation to FIG. 1 is provided thereafter with reference to subsequent figures.

As illustrated in FIG. 1, the function button system 100 can generate a floating widget 102. The function button system 100 can generate the floating widget 102 within a web browser (e.g., such as a search tab within GOOGLE CHROME or SAFARI, among others) and can adapt the floating widget 102 to different webpages shown or navigated in the web browser. For example, the function button system 100 can provide the floating widget 102 for display in a web browser based on determining or otherwise identifying a user account interaction installing and/or activating the floating widget 102 with the web browser (e.g., such as a click or a tap to open the webpage of the web browser). In some cases, once installed as a web browser extension, the function button system 100 provides the floating widget 102 for display upon opening an instance of the web browser. The function button system 100 can provide a single instance of the floating widget 102 for each instance (e.g., window) of a web browser, where each instance (or window) can include multiple tabs. In some embodiments, the function button system 100 utilizes the floating widget 102 to process and accommodate functions for content in multiple browser tabs, while in other embodiments the function button system 100 instantiates a new floating widget for each tab.

Further, in some embodiments, the function button system 100 can determine a location of the floating widget 102 within the webpage according to the content of the webpage. For instance, the function button system 100 can provide the floating widget 102 adjacent to (or within a threshold pixel distance or proximity of) content identified as corresponding to one or more LLM function buttons within the floating widget 102.

As shown in FIG. 1, the function button system 100 can generate the floating widget 102 to include an LLM function button 104. In some embodiments, the function button system 100 can generate or otherwise determine the LLM function button 104 according to a web address of the webpage. For example, the function button system 100 can analyze the web address to determine one or more functions to perform for the user account. Based on determining the one or more functions corresponding to the webpage, the function button system 100 can select the LLM function button 104 (or more than one LLM function button) to include in the floating widget 102.

In some embodiments, the function button system 100 can extract or otherwise determine content from the webpage and can determine to provide the LLM function button 104 according to the content. Indeed, the function button system 100 can select the LLM function button 104 from among a set of candidate LLM function buttons to present within the floating widget 102 based on the content of the displayed webpage (e.g., where the candidate buttons each correspond to different types of content). The function button system 100 can further generate the LLM function button 104 to be selectable to execute a function according to the content of the webpage.

For example, the function button system 100 can extract content from the webpage by determining a domain of the webpage or content displayed on the webpage. Based on determining the content, the function button system 100 can select the LLM function button 104 from among a plurality of LLM function buttons to include in the floating widget 102. For example, the function button system 100 can analyze the content to determine one or more functions to perform that involve or otherwise include the content.

Further, in some embodiments, the function button system 100 can generate the floating widget 102 to include a subset of the plurality of LLM function buttons. In some embodiments, the plurality of LLM function buttons can include a summarize function button, a chat function button, a tone function button, a template function button, and an autonomous workflow function button. More information regarding the specific functionalities of each of the plurality of LLM function buttons is provided below, at least with regard to the discussion of FIGS. 4-8.

As illustrated in FIG. 1, the function button system 100 can detect a context change 106. For example, the function button system 100 can detect the context change 106 by detecting a change from a first webpage to a second webpage within the web browser. For example, the function button system 100 can extract a first set of content from the first webpage and a second set of content from the second webpage and compare them to determine that they are different. As another example, the function button system 100 can extract a first web address of the first webpage and extract a second address of the second webpage and compare the first web address with the second web address to determine that they are different. In some embodiments, the function button system 100 can detect the context change 106 by extracting a first set of content from a first portion of the webpage and detecting a second set of content from a second portion of the webpage and comparing them to determine that the first set of content and the second set of content are different. In some embodiments, the function button system 100 can detect the context change 106 by detecting a change from a first web browser to a second web browser, from a web browser to an application, or from a first application to a second application, or from an application to the web browser.

In some embodiments, the context change 106 can be from a first webpage to a second webpage. In some embodiments, the context change 106 can be a change in domain (including a set of related webpages under the domain) from a first domain to a second domain. For example, in some embodiments the function button system 100 can determine the context change 106 by determining that the second webpage has a different domain than the first webpage. Based on determining that the second webpage has a different domain than the first webpage, the function button system 100 can update the floating widget 102 to include the different LLM function button 108 to correspond to the different domain.

As shown in FIG. 1, responsive to detecting the context change 106, the function button system 100 can modify the floating widget 102 by including a different LLM function button 108. In some embodiments, the function button system 100 can provide the different LLM function button 108 within the floating widget 102 in addition to the LLM function button 104. In some embodiments, the function button system 100 can replace the LLM function button 104 in the floating widget 102 with the different LLM function button 108. Further, when selecting the different LLM function button 108 from among the plurality of LLM function buttons, the function button system 100 can determine the different LLM function button 108 according to the context change 106.

For example, the function button system 100 can determine that the first content of the first webpage includes a news article. Responsive to determining that the first content includes a news article, the function button system 100 can select the LLM function button 104 to include in the floating widget 102 based on determining that a function of the LLM function button 104, such as a chat function button corresponds to the content in the first webpage. Further, the function button system 100 can determine the context change 106 by identifying a new webpage (e.g., navigation to a second webpage within the web browser) for an email service. Responsive to determining that the context change 106 includes an email webpage, the function button system 100 can modify the floating widget 102 by including the different LLM function button 108, such as a tone function button (e.g., that can be selectable to generate text for the user account according to a tone-specific indicator within the email webpage).

Additionally, in some embodiments the function button system 100 can analyze the web address and/or content of the webpage to determine a ranked order of LLM function buttons to include in the floating widget 102. The function button system 100 can determine a subset of LLM function buttons to include in the floating widget 102 according to the ranked order. For example, in some embodiments the function button system 100 can determine that the ranked order includes a first position (e.g., a highest position compared to other positions in the ranked order) that corresponds to a summarize function button, a second position that corresponds to a tone function button, and a third position that corresponds to a chat function button. In some embodiments, based on determining the context change 106, the function button system 100 can modify or otherwise update the ranked order. In some embodiments, the function button system 100 can determine the ranked order according to input from a user account.

Further, as will be discussed in more detail below, responsive to selection of an LLM function button, the function button system 100 generates a button-specific prompt to provide to an LLM. The function button system 100 can generate a button-specific prompt to include current content (e.g., content of a webpage the function button system 100 currently or actively displays in a web browser) to inform processes of the LLM. Additionally, the function button system 100 can generate the button-specific prompt to include a button-specific instruction to further inform the LLM regarding how to use the current content. Accordingly, not only does the function button system 100 use the current content to determine a selection of LLM function buttons to provide in the floating widget 102, but the function button system 100 further uses the current content to inform LLM processes instantiated upon selection of an LLM function button.

As suggested by the foregoing discussion, the function button system 100 provides a variety of technical advantages relative to conventional systems. For example, the function button system 100 can improve efficiency compared to conventional computing systems. Indeed, as illustrated in FIG. 1, the function button system 100 can provide a floating widget that follows and adapts to displayed webpages within a web browser, as described. Thus, rather than requiring excessive navigation back and forth among different tabs, web browsers, and/or applications in order to provide access to (and upload content for processing with) artificial intelligence models, the function button system 100 generates the floating widget to automatically adapt to currently displayed webpages (and/or web browser or application) for quick (e.g., single-click) interactions with large language models. Whereas a prior system may require a first sequence of interactions to access a large language model interface, a second sequence of interactions to access and upload content to the large language model through the interface, and a third sequence of interactions to enter and submit a query/prompt regarding the content, the function button system 100 can reduce (or condense) all of these interactions to a single click in the floating widget that triggers prompt generation (including content upload) and analysis using a large language model to generate and display a response. Thus, the function button system 100 reduces excessive navigational inputs required to interact with artificial intelligence models and likewise reduces computational resources (e.g., such as processing power, memory, storage, or other network resources) required to navigate among numerous digital locations to interact with and utilize artificial intelligence models.

In addition, embodiments of the function button system 100 improve operational flexibility over conventional systems. By determining LLM function buttons to include in the floating widget according to content of the webpage and/or a web address of the webpage, the function button system 100 is able to flexibly adapt the floating widget—and the corresponding functions of a large language model—to webpages navigated to or otherwise displayed using a web browser. Thus, whereas conventional systems are hyper-dependent upon prompts to perform processes, the function button system 100 determines content of webpages and uses the content to inform and augment performance of content-specific processes. Further, the function button system 100 continuously analyzes content of the webpage and adapts the floating widget and the selection of LLM function buttons within the floating widget according to the current content of the webpage.

Further, embodiments of the function button system 100 improve accuracy over conventional systems. By generating LLM-function-button-specific prompts that include or describe current content of a web browser, the function button system 100 improves the accuracy of responses generated using artificial intelligence models. Indeed, the function button system 100 generates the LLM function button-specific prompts to enable artificial intelligence models to perform tailored tasks in an accurate manner. Indeed, whereas prior systems are overly reliant on users providing accurate, robust prompts, the function button system 100 intelligently generates prompts based on displayed content in a webpage, thus reducing erroneous data and increasing the accuracy and reliability of generated responses.

As illustrated by the foregoing discussion, the present disclosure utilizes a variety of terms to describe features and benefits of the function button system 100. Additional detail is hereafter provided regarding the meaning of these terms as used in this disclosure. As used herein, the term "digital content item" (or sometimes simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is siloed to a particular computer application but is not necessarily accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

In addition, the term "large language model" (or "LLM") refers to a set of one or more machine learning models trained to perform computer tasks to generate or identify computing code and/or data in response to trigger events (e.g., user account interactions, such as text queries and button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate or identify computing code and/or data based on various contextual data, including information extracted from webpages, stored content items, and/or from historical user account behavior.

Relatedly, as used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, and Bayesian networks. In some embodiments, the model modification system utilizes a large language machine learning model in the form of a neural network.

Along these lines, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., a summary of content of a webpage. a chat interface, tone-specific composed text, a templated content item, and or a modification of a field of a webpage, among others) based on a plurality of inputs provided to the neural network. In some cases, a neural network refers to an algorithm (or a set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, an LLM, or a generative neural network.

Figure 2:
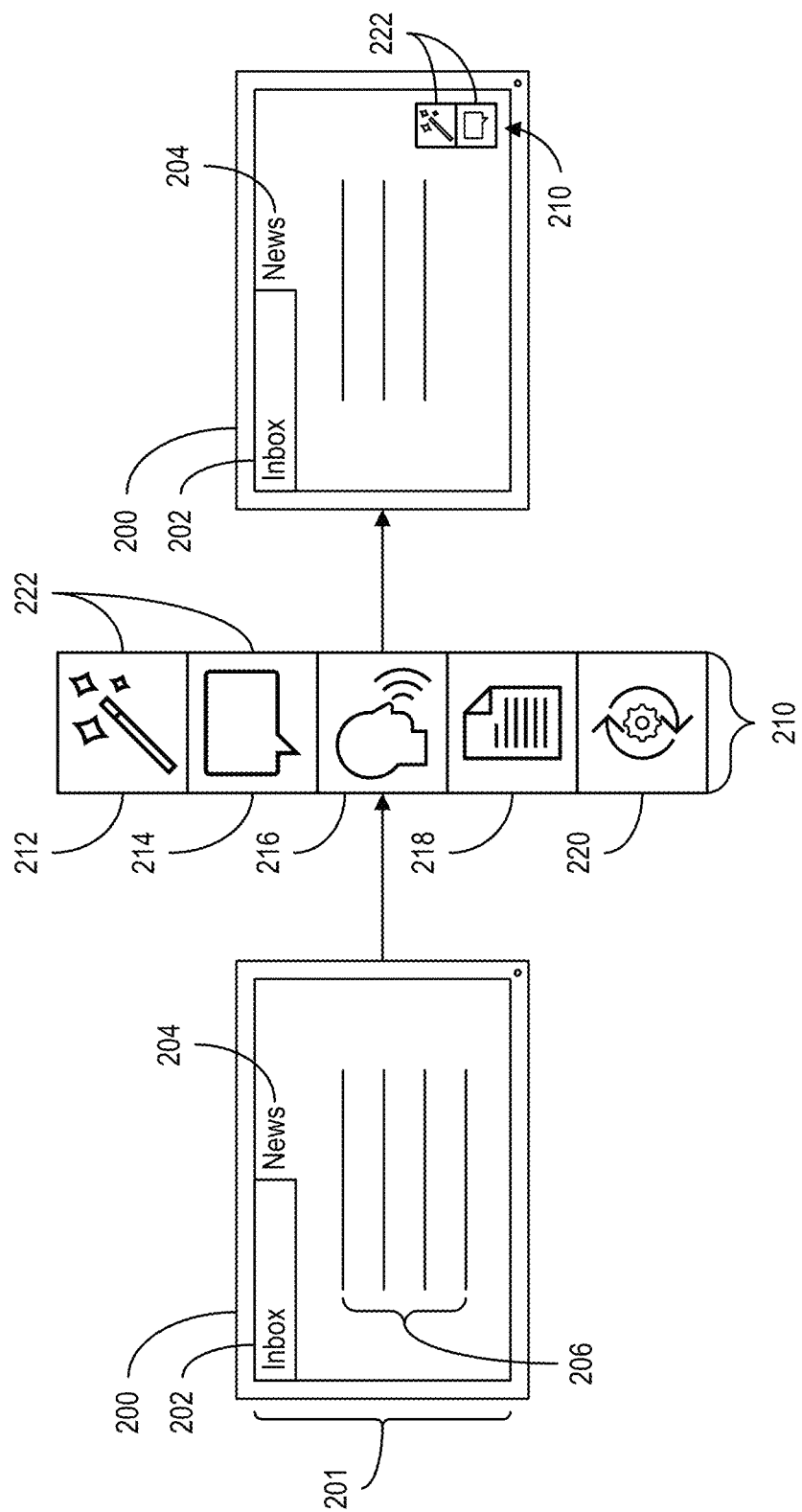
FIG. 2 illustrates an example overview of providing a floating widget within a webpage according to determining content of the webpage in accordance with some embodiments.

As previously mentioned, the function button system 100 can generate the floating widget to include a subset of LLM function buttons according to content of a webpage. For example, the function button system 100 can provide an adaptable floating widget that is independent from, but aware of, webpage content and that persists across different webpages navigating using a web browser (e.g., as a component within a browser window or outside of the browser window). FIG. 2 illustrates the function button system 100 extracting content from a webpage and selecting a subset of LLM function buttons to include in a floating widget according to the content in accordance with one or more embodiments.

As illustrated in FIG. 2, the function button system 100 can display a plurality of webpages that can include a first webpage 204 (e.g., "News") and a second webpage 202 (e.g., "Inbox") in a web browser 201 of a client device 200. The function button system 100 can extract current content 206 from a current webpage of the web browser 201. As used herein, the term "current webpage" can refer to a webpage that the function button system 100 actively displays within the web browser 201 (e.g., a webpage that is visible on the client device 200). In some embodiments, the current webpage can be the first webpage 204. In some embodiments, the current webpage can be the second webpage 202. Similarly, the term "current content" can refer to content within the current webpage (e.g., content of the current webpage that is visible or otherwise actively displayed on the client device 200). In addition, current content can refer to content of multiple webpages of the web browser and/or multiple windows of a web browser.

As shown in FIG. 2, based on extracting the current content 206, the function button system 100 can determine a subset of LLM function buttons 222 of a plurality of LLM function buttons (such as a first LLM function button 212, a second LLM function button 214, a third LLM function button 216, a fourth LLM function button 218, and a fifth LLM function button 220) of a floating widget 210 to display in the first webpage 204 (e.g., the current webpage). For example, the function button system 100 can determine the subset of LLM function buttons 222 based on analyzing the current content 206 to determine a classification for the current content 206. The function button system 100 can use the classification of the current content 206 to determine the subset of LLM function buttons 222.

Further, in some embodiments, the function button system 100 can extract a web address from the first webpage 204. The function button system 100 can classify the web address of the first webpage 204 (e.g., such as "News"). Based on classifying the web address of the first webpage 204, the function button system 100 can determine the subset of LLM function buttons 222 based on the classification of the first webpage 204.

As used herein, the term "floating widget" can refer to a graphical user interface element that includes an LLM function button and that accompanies a web browser (or another computer application). The function button system 100 can render the floating widget within a web browser or an application of a client device. Further, the function button system 100 can render the floating widget to include one or more aspects that can be modified by a user account. For example, the function button system 100 can render the floating widget to be free-floating within the web browser and/or application such that the floating widget overlays content of a webpage of the web browser. Additionally, in some embodiments, the function button system 100 can enable a size of the floating widget to be modified by the user account.

Furthermore, as used herein, the term "LLM function button" can refer to an element of the floating widget selectable to instantiate a series of functions. For example, the series of functions can include one or more of: extracting content from the web browser and/or application (e.g., such as from a webpage of the web browser), generating an LLM function button-specific prompt, providing the content and the LLM function button-specific prompt to an LLM to cause the LLM to generate an LLM function button-specific output. Additionally, in some embodiments, the function button system 100 can generate the LLM function button to be selectable to generate a side panel within the web browser and/or the application. Additionally, the series of functions can include providing the LLM function button-specific output for display within the side panel.

For example, an LLM function button can be a summarize function button selectable generate a summary of current content 206 of a current webpage of a web browser 201. As another example, an LLM function button can be a chat function button selectable to modify the web browser to include a side panel that further includes a chat interface. As a further example, an LLM function button can be a tone function button selectable to generate tone-specific composed text. Additionally, an LLM function button can be a template function button selectable to generate a templated content item. Moreover, an LLM function button can be an autonomous workflow function button selectable to perform functions relating to the current webpage (e.g., for example by modifying one or more fields of the current webpage).

To provide an example of the function button system 100 determining the subset of LLM function buttons 222, the function button system 100 can extract the current content 206 (e.g., content from the "News" webpage). Further, the function button system 100 can determine a classification of "current events" (or something similar) based on determining the current content 206 is "news." Based on determining the classification, the function button system 100 can select the subset of LLM function buttons 222 to augment the current content 206. For example, the function button system 100 can determine, based on classifying the current content 206 as "current events," to augment the current content 206 by selecting the subset of LLM function buttons 222 to include a "Summarize" LLM function button. In some embodiments, the "Summarize" LLM function button can be the first LLM function button 212. Further, the function button system 100 can generate the "Summarize" LLM function button to be selectable to provide a summary of the current content 206 within the web browser 201. Additionally, the function button system 100 can determine, based on classifying the current content 206 as "current events," select the subset of LLM function buttons 22 to augment the current content 206. For example, the function button system 100 can augment the current content 206 by selecting the subset of LLM function buttons 222 to include a "Chat" LLM function button (e.g., the second LLM function button 214). The function button system 100 can generate the "Chat" LLM function button to be selectable to provide a chat interface within the web browser 201. By providing the chat interface within the web browser 201, the function button system 100 can enable the user account to chat with an LLM about the current content 206 (e.g., the current events described or otherwise depicted in the first webpage 204).

As illustrated in FIG. 2, based on identifying the subset of LLM function buttons 222, the function button system 100 can display the subset of LLM function buttons 222 within the floating widget 210 within the current webpage (e.g., the first webpage 204). Moreover, the function button system 100 can update or otherwise modify the subset of LLM function buttons 222 based on detecting a context change and/or content change. For example, responsive do determining that the second webpage 202 is displayed in the web browser 201 (such as from a navigational input from the user account navigating to the second webpage 202), the function button system 100 can extract content from the second webpage 202 and change a composition of the subset of LLM function buttons 222 that the function button system 100 displays in the floating widget 210. To illustrate, based on extracting content from the second webpage 202, the function button system 100 can modify the subset of LLM function buttons 222 to include the third LLM function button 216 and the fifth LLM function button 220.

To further illustrate, in some embodiments, the function button system 100 can detect a change in the current content 206. For example, the function button system 100 can detect the change in the current content 206 by detecting an update to a news story. Based on detecting the change in the current content 206, the function button system 100 can modify the subset of LLM function buttons 222 in the floating widget 210, such as by replacing the second LLM function button 214 with the fourth LLM function button 218.

In some embodiments, the function button system 100 can display the floating widget 210 as a single icon (e.g., such as a bauble) within a current webpage. Further, the function button system 100 can generate the bauble to be expandable along an axis responsive to detecting an indication of a user account interaction with the bauble. For example, responsive to detecting the user account interaction (e.g., such as a hover, click, or a tap), the function button system 100 can cause the bauble to expand along the axis to display the subset of LLM function buttons 222. In some embodiments, responsive to detecting the user account interaction, the function button system 100 can cause the bauble to expand vertically (e.g., along a vertical axis) to display the subset of LLM function buttons 222 in a column. In some embodiments, responsive to detecting the user account interaction, the function button system 100 can cause the bauble to expand horizontally (e.g., along a horizontal axis) to display the subset of LLM function buttons 222 in a row.

Figure 3:
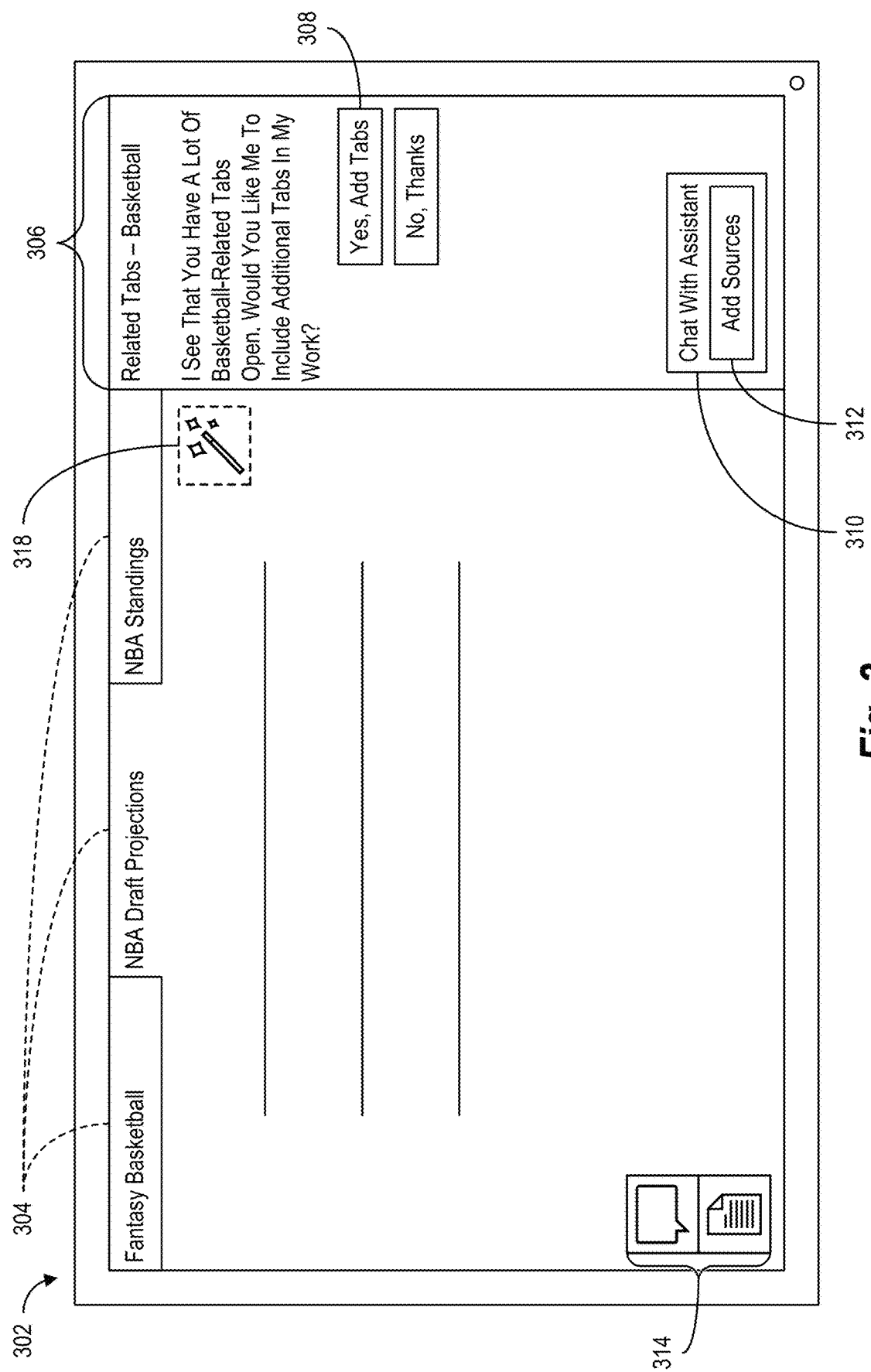
FIG. 3 illustrates generation of a side panel in response to detecting an interaction with an LLM function button in accordance with some embodiments.

As previously mentioned, in some embodiments, the function button system 100 can determine the subset of LLM function buttons from a plurality of sources, and can extract content from the plurality of sources. For example, the function button system 100 can determine that a plurality of webpages are open in a web browser and can extract content from the plurality of webpages to provide to an LLM function button. FIG. 3 illustrates the function button system 100 identifying multiple related webpages and determining to include content from the related webpages in functionalities the function button system 100 uses LLM function buttons to perform in accordance with one or more embodiments.

As shown in FIG. 3, in some embodiments the function button system 100 can identify a plurality of webpages 304 (e.g., a first tab "Fantasy Basketball," a second tab "NBA Draft Projections" and a third tab "NBA Standings"). In some embodiments, the function button system 100 can determine that the plurality of webpages 304 contain related content by extracting titles (and/or other content) from each of the plurality of webpages 304 (e.g., "Fantasy Basketball," "NBA Draft Projections," and "NBA Standings") and provide the titles to a LLM to cause the LLM to determine a semantic relationship between one or more of the plurality of titles. To illustrate, the function button system 100 can use the LLM to determine that each of the plurality of titles refers or otherwise relates to a same topic, such as basketball. Additionally, the function button system 100 can extract content from each of the plurality of webpages 304 and provide the content of each webpage to the LLM to determine one or more semantic relationships between the content of each webpage. For example, the function button system 100 can use the LLM to determine that each webpage of the plurality of webpages 304 includes content relating to a particular NBA team.

In some embodiments, based on determining that one or more of the plurality of webpages 304 includes related content, the function button system 100 can determine to include the related content from the plurality of webpages in LLM functions that the function button system 100 facilitates through a floating widget 314. For example, responsive to detecting an indication of an interaction with an LLM function button of the floating widget 314 (e.g., such as a chat function button or a template function button), the function button system 100 can generate a side panel 306 within the web browser. Within the side panel, the function button system 100 can provide an indication of related content (e.g., "Related Tabs-Basketball," and "I See That You Have A Lot of Basketball-Related Tabs Open. Would you Like Me To Include Additional Tabs In My Work?" or something similar, such as "I See that You Have A Lot of Tabs Open. Would You Like Me To Include Additional Tabs In My Work?").

In addition to providing the indication of related content, the function button system 100 can provide a side panel element 308 selectable to confirm adding additional webpages to augment LLM processes that the function button system 100 facilitates through the floating widget 314. Further, in some embodiments, responsive to determining that the web browser includes the plurality of webpages 304 (e.g., without determining that the plurality of webpages 304 contain related content), the function button system 100 can automatically provide the side panel element 308 selectable to cause the function button system 100 to extract content from one or more of the plurality of webpages 304. For example, the function button system 100 can provide an indication of multiple webpages and can provide the side panel element 308 accordingly. Further, in some embodiments, the function button system 100 can extract content from a plurality of web browsers. To illustrate, the function button system 100 can determine that a client device displays multiple instances (e.g., windows) of a web browser. Based on determining the multiple instances of the web browser, the function button system 100 can provide the side panel element 308 to be selectable to enable the function button system 100 to extract content from the multiple instances of the web browser to use in functionalities the function button system 100 facilitates through the floating widget 314.

Further, the function button system 100 can generate a chat interface 310 within the side panel 306. Responsive to receiving an indication of an interaction with the side panel element 308 (such as a click, swipe, or tap), the function button system 100 can extract content from the plurality of webpages 304 to augment a conversation between the user account and an LLM of the chat interface 310. As an additional example, responsive to receiving the indication of the interaction with the side panel element 308, the function button system 100 can augment one or more LLM functions of LLM function buttons displayed within the floating widget 314. To illustrate, responsive to detecting the indication of the interaction with a summarize function button in the floating widget 314, the function button system 100 can extract content from the plurality of webpages 304 and generate a summary of the content of the plurality of webpages 304.

As shown in FIG. 3, the function button system 100 can generate the chat interface 310 to include a chat interface element 312 that is selectable to add sources to augment the conversation with the LLM. For example, responsive to an indication of an interaction with the chat interface element 312, the function button system 100 can receive one or more content items (e.g., such as a document, spreadsheet, and/or presentation) via the chat interface 310. Further, in some embodiments, the function button system 100 can use the content items received via the chat interface 310 to augment the conversation within the chat interface 310, but not other LLM processes facilitated through the floating widget 314. For example, in some embodiments, the function button system 100 can determine use the content items the function button system 100 receives via the chat interface 310 to augment a conversation with an LLM, and can determine not to use the content items to augment or otherwise modify the floating widget 314. In some embodiments, the function button system 100 can determine to use the content items received via the chat interface 310 to augment the subset of LLM function buttons the function button system 100 displays in the floating widget 314. More information regarding the side panel 306 and the chat interface 310 can be found below regarding the discussion of FIG. 9.

As shown in FIG. 3, the function button system 100 can embed an LLM function button 318 directly within a webpage (e.g., at a specific location in the webpage) rather than providing the function button within the floating widget 314. Indeed, the function button system 100 can extract content from the webpage and can analyze the content to determine to embed the LLM function button 318. For example, the function button system 100 can determine to embed the LLM function button 318 to augment the floating widget 314. To illustrate, the function button system 100 can determine to embed the LLM function button 318 responsive to determining a location of the floating widget 314, such that the function button system 100 embeds the LLM function button 318 in a first location of the webpage and displays the floating widget 314 in a second location of the webpage. Further, the function button system 100 can determine to embed the LLM function button 318 responsive to determining that a portion of content of the webpage meets or exceeds a threshold importance level for the user account. Responsive to determining that the portion of the content meets or exceeds the threshold, the function button system 100 can determine to embed the LLM function button 318 adjacent to the portion of the context (e.g., within a threshold number of pixels of the portion of the content).

As illustrated in FIG. 3, the function button system 100 can determine that the floating widget 314 is located in and/or overlays content in a corner (such as a bottom left corner) of the web browser of the client device 302. Based on determining the location of the floating widget 314, the function button system 100 can determine to embed the LLM function button 318 in another location of the web browser of the client device 302, such as in a location next to content of the webpage that the function button system 100 determines to be relevant to the user account. Accordingly, the function button system 100 can embed the LLM function button 318 in a first location of the webpage to provide the user account with a first functionality corresponding to the LLM function button 318. Additionally, the function button system 100 can generate the floating widget 314 to include a subset of LLM function buttons that is different from the LLM function button 318 to provide the user account with a set of functionalities. More information regarding the function button system 100 determining to embed LLM function buttons 318 within the webpage can be found below regarding the discussion of FIG. 10.

As previously mentioned, in some embodiments, the function button system 100 can determine that multiple windows of a web browser are open. The function button system 100 can determine a relationship between the multiple windows of the web browser, such as that the multiple windows relate to a single browsing journey for a user account. For example, the function button system 100 can determine that the user account interacts with the multiple windows (e.g., such as iterating between the multiple windows). Further, in some embodiments, the function button system 100 can determine that the multiple windows are spread across multiple screens/multiple client devices (such as dual monitors) and yet are still related to the single browsing journey. Accordingly, the function button system 100 can display the floating widget 314 in an active window (e.g., a window the user account is modifying or otherwise interacting with) of the web browsing journey.

In some embodiments, responsive to determining that the multiple windows relate to the single user journey, the function button system 100 can determine an anchor window in which to display the floating widget 314. To illustrate, the function button system 100 can determine to display the floating widget 314 in the anchor window and not to modify the location of the floating widget according to an active window. In some embodiments, the function button system 100 can determine whether to display the floating widget in the active window or the anchor window according to input from the user account. Further, in some embodiments, responsive to determining the multiple windows are a part of the same browsing journey, the function button system 100 can display a first floating widget in a first window of the multiple windows and a second floating widget in a second window of the multiple windows.

Figure 4:
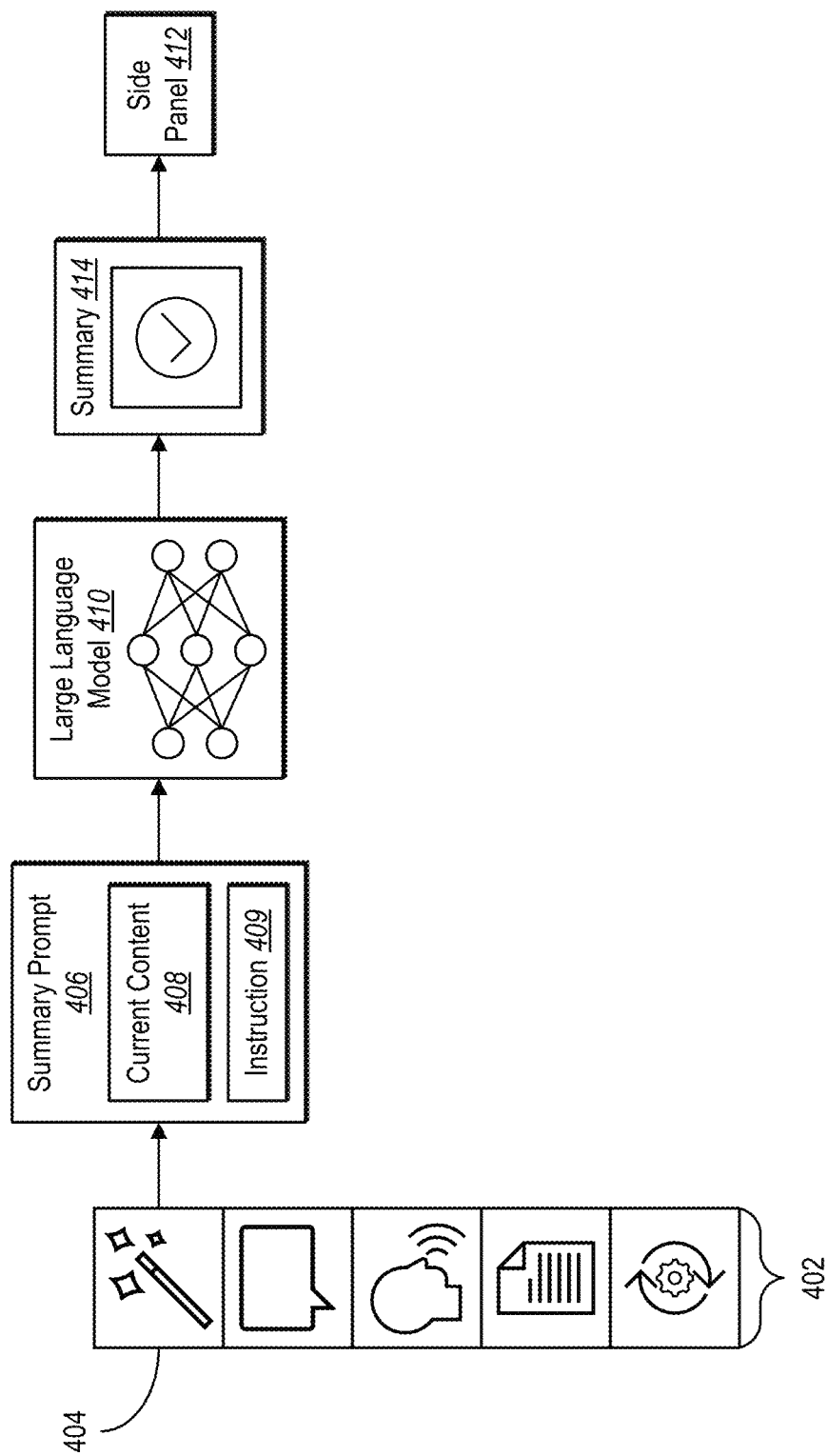
FIG. 4 illustrates generation of a summary of current content responsive to a selection of a summarize function button in accordance with some embodiments.

As previously mentioned, the function button system 100 can generate the floating widget to include a summarize function button. For example, the function button system 100 can generate the summarize function button to be selectable to use an LLM to generate a summary of current content of a current webpage. FIG. 4 illustrates the function button system 100 generating a summary of current content and providing the summary within a side panel of a current webpage in accordance with one or more embodiments.

As illustrated in FIG. 4, the function button system 100 can generate or otherwise structure a floating widget 402 to include a plurality of LLM function buttons. Specifically, the function button system 100 can include a summarize function button 404 (e.g., a summarize LLM function button). The function button system 100 can represent the summarize function button 404, along with each of the plurality of LLM function buttons, using an icon. Indeed, the function button system 100 can represent the summarize function button 404 with a first icon that is different from other icons corresponding to other LLM function buttons of the plurality of function buttons.

As shown in FIG. 4, the function button system 100 can generate the summarize function button 404 to be selectable to provide a summary prompt 406 to a large language model 410. For example, responsive to detecting an indication of an interaction (such as a click, a tap, or a swipe from a user account) with the summarize function button 404 (e.g., within a current webpage of a web browser), the function button system 100 can extract current content 408 from the current webpage. Additionally, the function button system 100 can generate an instruction 409 for the large language model 410 (or simply "LLM 410") to summarize the current content 408. The function button system 100 can generate the instruction 409 to highlight or otherwise identify segments of the current content 408 for the LLM 410 to include or exclude when summarizing the current content 408. For example, the function button system 100 can personalize the instruction 409 using data corresponding to the user account to augment the instruction 409 according to preferences of the user account. The function button system 100 can provide the summary prompt 406 including the current content 408 and the instruction 409 to the large language model 410.

As illustrated in FIG. 4, based on providing the summary prompt 406 to the LLM 410, the function button system 100 can use the LLM 410 to generate a summary 414 of the current content 408 according to the instruction 409. The function button system 100 can generate the summary 414 as a content item (e.g., such as a word document, spreadsheet, or other type of content item) or as natural language text. In some embodiments, the function button system 100 can generate the instruction 409 to include a format indication for the summary 414.

Additionally, as shown in FIG. 4, the function button system 100 can provide the summary 414 to the user account in a side panel 412 of the web browser. For example, responsive to detecting the interaction with the summarize function button 404, the function button system 100 can generate the side panel 412 within the web browser. The function button system 100 can generate the side panel 412 in parallel with generating the summary 414. More information regarding the function button system 100 generating the side panel 412 can be found below at least with regard to the discussion of FIG. 9.

Figure 5:
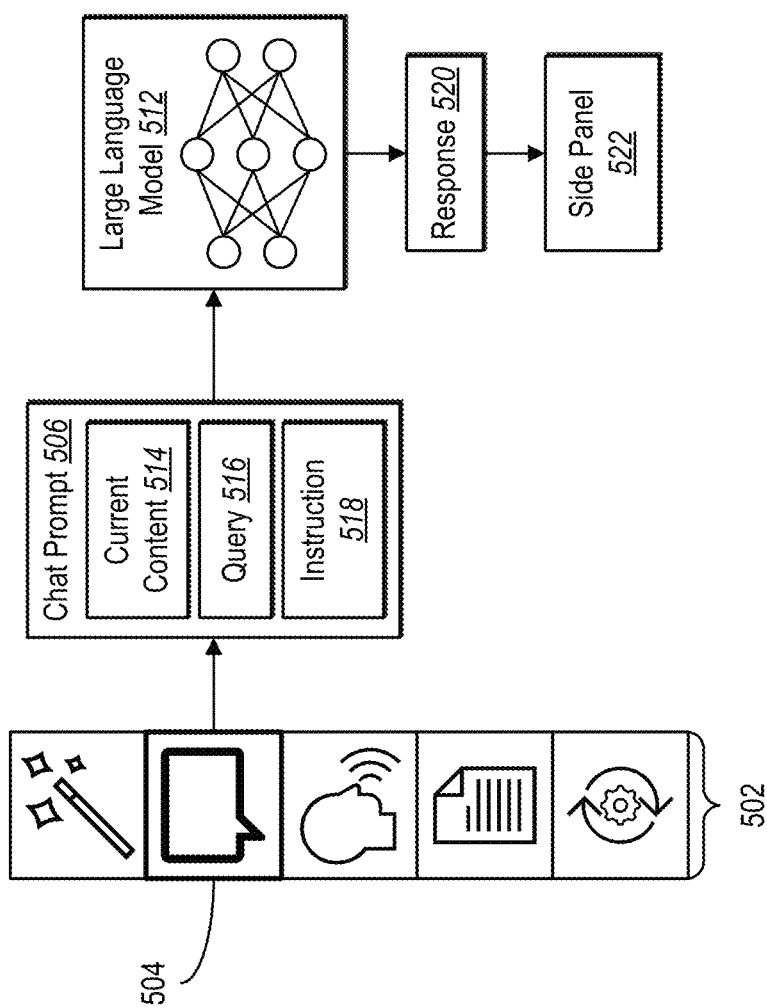
FIG. 5 illustrates generation of a response to a query responsive to a selection of a chat function button in accordance with one or more embodiments.

As previously discussed, the function button system 100 can generate the floating widget to include a chat function button. For example, the function button system 100 can generate the chat function button to be selectable to provide a user account with access to an LLM within a chat interface of a current webpage. FIG. 5 illustrates the function button system 100 generating a chat interface within a side panel in response to detecting an interaction with the chat function button in accordance with one or more embodiments.

As illustrated in FIG. 5, the function button system 100 can generate or otherwise structure a floating widget 502 to include plurality of LLM function buttons. The function button system 100 can include a chat function button 504 (e.g., a chat LLM function button) in the plurality of function buttons. In addition, the function button system 100 can display the chat function button 504 as a chat icon within the floating widget 502.

As shown in FIG. 5, the function button system 100 can generate the chat function button 504 to be selectable to provide a chat prompt 506 to a large language model 512 (or simply "LLM 512"). The function button system 100 can generate the chat prompt 506 to include current content 514 (e.g., of a current webpage of a web browser where the function button system 100 displays the floating widget 502). Further the function button system 100 can generate the chat prompt 506 to include an instruction 518 to provide to the large language model 512. Further, the function button system 100 can generate the chat prompt 506 to include a query 516. In some embodiments, responsive to determining an indication of an interaction with the chat function button 504, the function button system 100 can generate a side panel 522 within the web browser. Further, the function button system 100 can generate the side panel 522 to include a chat interface. The function button system 100 can receive the query 516 via the chat interface of the side panel 522.

In some embodiments, the function button system 100 can determine the current content 514 to extract from the current webpage based on the query 516. Further, in some embodiments the function button system 100 can generate the instruction 518 according to the query 516. For example, the function button system 100 can determine that the query 516 indicates a specific portion of the current webpage (e.g., such as a range of paragraphs or pages, one or more images, one or more data tables, among others). In some embodiments, the function button system 100 can extract the current content 514 according to the indication of a specific portion in the query 516. In some embodiments, the function button system 100 can extract the current content 514 by extracting the content of the current webpage and can generate the instruction 518 to identify or otherwise emphasize the specific portion of the current webpage.

As illustrated in FIG. 5, the function button system 100 can provide the chat prompt 506 including the current content 514, the query 516, and the instruction 518 to the LLM 512. Based on providing the chat prompt 506 to the LLM 512, the function button system 100 can use the LLM 512 to generate a response 520 to the query 516. For example, the function button system 100 can use the LLM 512 to process the current content 514 according to the instruction 518 to generate the response 520. Further, the function button system 100 can provide the response 520 to the user account via the side panel 522.

Accordingly, the function button system 100 can iteratively receive queries and generate responses to queries within the side panel 522. Based on receiving a subsequent query, the function button system 100 can extract a new set of current content from the current webpage and generate a new instruction according to the subsequent query and/or the new set of current content. Additionally, in some embodiments, the function button system 100 can extract content from a plurality of webpages within the web browser. Further, in some embodiments, the function button system 100 can provide a prompt to the user account via the side panel 522 (e.g., that is unrelated to the query 516 or the subsequent query).

Figure 6:
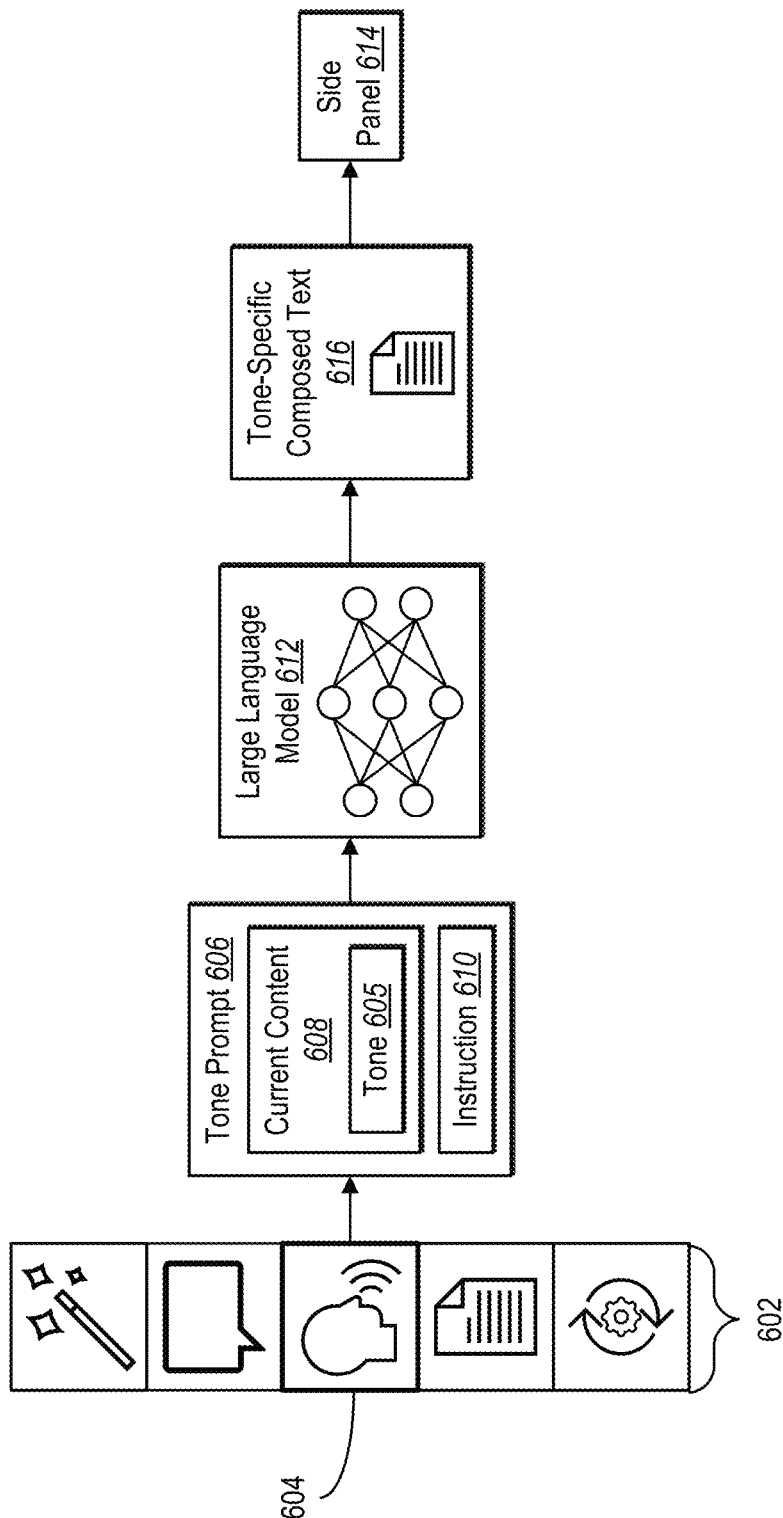
FIG. 6 illustrates generation of tone-specific text responsive to a selection of a tone function button in accordance with some embodiments.

As previously mentioned, the function button system 100 can generate the floating widget to include a tone function button. For example, the function button system 100 can generate the tone function button to be selectable to generate tone-specific composed text for the user account. FIG. 6 illustrates the function button system 100 generating tone-specific composed text based on providing a tone prompt to a large language model in accordance with one or more embodiments.

As illustrated in FIG. 6, the function button system 100 can generate a floating widget 602 to include a plurality of LLM function buttons. The function button system 100 can include a tone function button 604 (e.g., a tone LLM function button) in the plurality of LLM function buttons. In addition, the function button system 100 can display the tone function button 604 as a tone indicator icon within the floating widget 602.

As shown in FIG. 6, the function button system 100 can generate the tone function button 604 to be selectable to generate a tone prompt 606 to provide to a large language model 612 (or simply "LLM 612"). For example, responsive to detecting an indication of an interaction (such as a click, tap, or a swipe from a user account) with the tone function button 604 (e.g., within a current webpage of a web browser), the function button system 100 can extract current content 608 from the current webpage. Further, the function button system 100 can generate an instruction 610 for the LLM 612 to identify a tone 605 from the current content 608 and generate tone-specific composed text 616 according to the tone 605.

For example, the function button system 100 can determine to include the tone function button 604 in the floating widget 602 responsive to detecting a specific type of content within the current webpage, such an email webpage. To illustrate, the function button system 100 can determine that the current content 608 of the current webpage includes an email message. Responsive to detecting an indication of an interaction with the tone function button 604, the function button system 100 can extract the current content 608 from the current webpage (e.g., such as the email message). The function button system 100 can generate the tone prompt 606 comprising the current content 608 and the instruction 610 to use the LLM 612 to parse and identify the tone 605 associated with the current content 608. For example, the function button system 100 can use the LLM 612 to determine the tone 605 by parsing the current content 608 to identify the tone 605 from certain phrases in the email, such as a title corresponding to the user account (e.g., determining whether the email addresses the user account professionally, such as with "Mr.," "Mrs.," or some title such as "Doctor" or "Attorney"), a closing phrase of the email (e.g., such as "Kind Regards," "Warmly," or "Thanks"). Indeed, the function button system 100 can use the LLM 612 to parse the current content 608 to determine a level of professionalism associated with the current content 608 and can determine the tone 605 according to the level of professionalism.

Further, in some embodiments, the function button system 100 can determine the tone 605 associated with the current content 608 by identifying a relationship between the user account and an additional user account associated with the current content 608. To illustrate, the current content 608 can be an email sent from the additional user account and received by the user account, or the current content 608 can be a draft email from the user account to the additional user account. The function button system 100 can identify the additional user account and utilize a knowledge graph to determine a relationship between the user account and the additional user account. To illustrate, the function button system 100 can identify a first node in the knowledge graph that corresponds to the user account and a second node in the knowledge graph that corresponds to the additional user account. Based on identifying the first node and the second node in the knowledge graph, the function button system 100 can identify one or more edges within the knowledge graph that connect the first node and the second node and that identify a relationship between the user account and the additional user account.

For example, the function button system 100 can determine, based on identifying the one or more edges, that the additional user account corresponds to a supervisor of the user corresponding to the user account. Based on determining that the additional user account corresponds to the supervisor, the function button system 100 can determine that the tone 605 associated with the current content 608 is professional and respectful. As another example, the function button system 100 can determine, based on identifying the one or more edges, that the additional user account corresponds to a family member of the user corresponding to the user account. Based on determining that the additional user account corresponds to the family member, the function button system 100 can determine that the tone 605 associated with the current content 608 is warm and familial.

As illustrated in FIG. 6, based on providing the tone prompt 606 to the LLM 612, the function button system 100 can use the LLM 612 to generate tone-specific composed text 616 according to the tone 605 associated with the current content 608. For example, the tone-specific composed text 616 can be an email address to the additional user account or a response to an email received from the additional user account. The function button system 100 can provide the tone-specific composed text 616 for display within a side panel 614 of the web browser. In some embodiments, the function button system 100 can provide the tone-specific composed text 616 directly in the current webpage of the web browser. In some embodiments, the function button system 100 can present a series of preset tone options within the side panel 614, and can determine or otherwise update the tone 605 responsive to a user selection of a tone option from the series of preset tone options. Further, in some embodiments, the function button system 100 can generate one or more of the preset tone options to correspond additional user accounts that are related to or otherwise connected to the user account (e.g., tone-defining personas) within a content management system.

Figure 7:
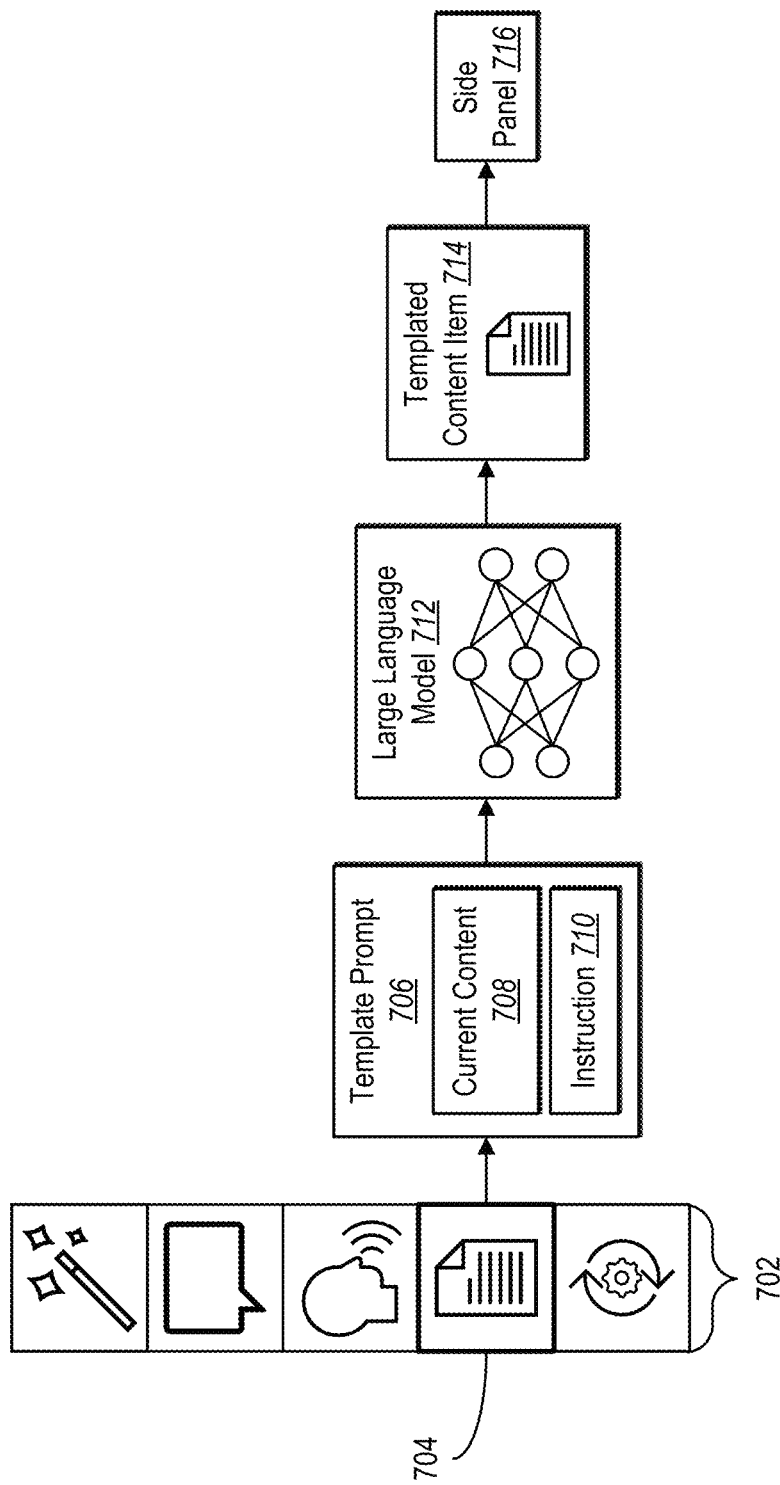
FIG. 7 illustrates generation of a templated content item responsive to a selection of a template function button in accordance with some embodiments.

As previously mentioned, the function button system 100 can generate the floating widget to include a template function button. For example, the function button system 100 can generate the template function button to be selectable to use an LLM to generate a templated content item. FIG. 7. illustrates the function button system 100 generating a templated content item and providing the templated content item for display within a side panel of a current webpage in accordance with one or more embodiments.

As illustrated in FIG. 7, the function button system 100 can generate a floating widget 702 to include a plurality of LLM function buttons. Specifically, the function button system 100 can include a template function button 704 (e.g., a template LLM function button). Further, the function button system 100 can display the template function button 704 as a content item icon within the floating widget 702.

As shown in FIG. 6, the function button system 100 can generate the template function button 704 to be selectable to generate a template prompt 706 to provide to a large language model 712 (or simply "LLM 712"). For example, the function button system 100 can display the floating widget 702 including the template function button 704 within a current webpage of a current web browser of a client device. Responsive to detecting an indication of an interaction with the template function button 704 (such as a click, tap, or a swipe), the function button system 100 can generate a template prompt 706 and can provide the template prompt 706 to the LLM 712.

As illustrated in FIG. 7, the function button system 100 can generate the template prompt 706 to include current content 708 (e.g., of the web browser) and an instruction 710. Indeed, responsive to detecting the indication of the interaction with the template function button 704, the function button system 100 can extract the current content 708 of the current webpage. The function button system 100 can further generate the instruction 710 to include a semantic language command for the LLM 712 to generate a templated content item 714 based on the current content 708. In some embodiments, the function button system 100 can generate the instruction 710 to identify one or more portions of the current content 708 for the LLM 712 to include or exclude from the templated content item 714. For example, the function button system 100 can generate the instruction 710 to include a semantic language command to enable the function button system 100 to use the LLM 712 to parse the current content 708 to identify one or more types of data to use to generate the templated content item 714.

Additionally, the function button system 100 can generate the instruction 710 to include a designation of a format type for the templated content item 714 (e.g., such as a document, a spreadsheet, or a slideshow presentation, among others). Further, in some embodiments, the function button system 100 can generate the instruction 710 to include a semantic command to enable the function button system 100 to use the LLM 712 to parse the current content 708 and determine the format type based on detecting one or more types of data in the current content 708. For example, the function button system 100 can use the LLM 712 to parse the current content 708 to identify a first type of data in the current content 708 (such as one or more lists of numeric values). Based on detecting the one or more lists, the function button system 100 can generate the instruction 710 to designate a first format type (such as a spreadsheet) for the templated content item 714 corresponding to the first type of data.

As illustrated, based on providing the template prompt 706 to the LLM 712, the function button system 100 can use the LLM 712 to generate the templated content item 714 according to the instruction 710. The function button system 100 can provide the templated content item 714 for display within a side panel 716 of the web browser. For example, the function button system 100 can generate the side panel 716 responsive to determining the indication of the interaction. In some embodiments, the function button system 100 can provide a preview of the templated content item 714 within the side panel 716 and can provide the templated content item 714 within the side panel 716 responsive to receiving an indication of approval of the preview.

For example, the function button system 100 can generate the preview to include a description of the templated content item 714 that indicates a format type of the templated content item 714 as well as one or more components of the current content 708 that the function button system 100 included in the templated content item 714. In some embodiments, the function button system 100 can generate the preview to include a display of the templated content item 714 (e.g., such as a display in the side panel 716 of one or more pages, spreadsheets, slideshows, or other components of the templated content item 714). Further, the function button system 100 can generate the side panel 716 to include a chat interface. Based on receiving an indication of approval of the preview within the side panel 716 and/or the chat interface, the function button system 100 can generate the templated content item 714 and provide the templated content item 714 within the side panel 716.

In some embodiments, responsive to detecting the indication of the interaction with the template function button 704, the function button system 100 can generate the side panel 716 to include a chat interface. The function button system 100 can use the chat interface to determine, via interactions of the user account with the chat interface, the current content 708 to use to generate the templated content item 714. Additionally or alternatively, the function button system 100 can use interactions of the user account within the chat interface to determine one or more parameters for the instruction 710. For example, based on detecting the indication of the interaction with the template function button 704, the function button system 100 can generate the side panel 716 including the chat interface and provide a query to the user account within the chat interface to determine parameters for the instruction 710. The function button system 100 can receive a response to the query from the user account and determine the current content 708 and/or one or more parameters of the instruction 710 from the response to the query.

In some embodiments, the function button system 100 can determine the current content 708 and/or the one or more parameters for the instruction 710 based on determining one or more interactions of the user account with the current webpage. For example, the function button system 100 can provide the query to the user account within the chat interface of the side panel 716 (such as, "What content of the webpage would you like me to include in the templated content item?"). Based on providing the query to the user account within the chat interface, the function button system 100 can monitor the current webpage to determine one or more interactions of the user account with the current webpage. For example, the function button system 100 can detect highlighted text within the current webpage and can extract the highlighted text as the current content 708 and/or can use the highlighted text to determine one or more parameters of the instruction 710.

In some embodiments, the function button system 100 can determine the current content 708 and/or one or more parameters of the instruction 710 based on a combination of a response to the query and determining one or more interactions of the user account with the current webpage. To illustrate, the function button system 100 can receive a response to the query that indicates a parameter of the instruction 710, such as a format type (e.g., "I want you to create an EXCEL Spreadsheet out of the data I am going to highlight"). Further, the function button system 100 can monitor the current webpage to determine the interaction with the current webpage that indicates the current content 708 for the function button system 100 to include in the templated content item 714 (e.g., the function button system 100 can monitor the current webpage to determine that the user account is highlighting one or more parts of the current webpage). Based on receiving the indication of the current content 708 and the one or more parameters of the instruction 710, the function button system 100 can generate the template prompt 706 to include the current content 708 and the instruction 710 and provide the template prompt 706 to the large language model 712 to generate the templated content item 714.

Figure 8:
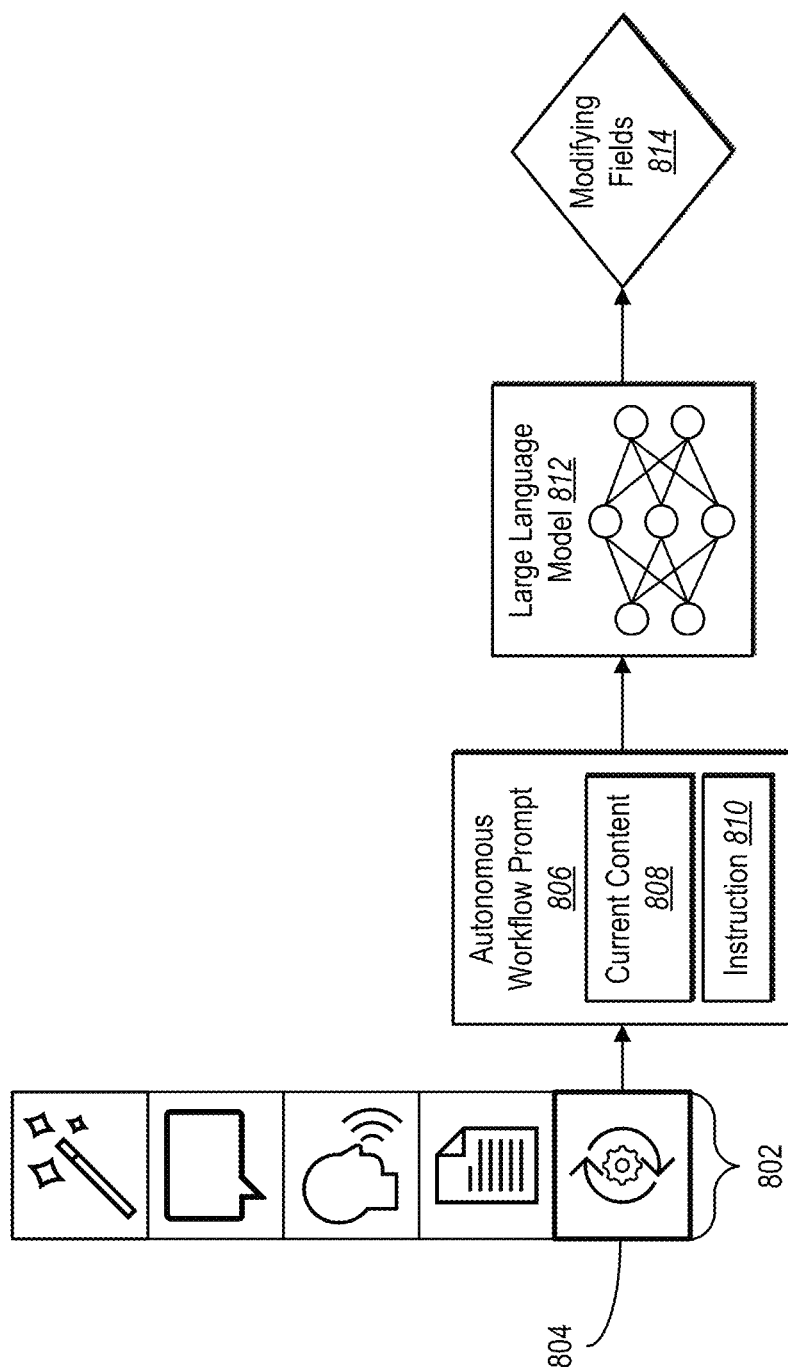
FIG. 8 illustrates modification of fields of a webpage responsive to a selection of an autonomous workflow function button in accordance with some embodiments.

As previously mentioned, the function button system 100 can generate the floating widget to include an autonomous workflow function button. For example, the function button system 100 can generate the autonomous workflow function button to be selectable to use an LLM to modify fields of a current webpage. FIG. 8 illustrates the function button system 100 modifying fields of the current webpage according to an autonomous workflow prompt in accordance with one or more embodiments.

As illustrated in FIG. 8, the function button system 100 can generate a floating widget 802 within a current webpage of a current web browser. The function button system 100 can include an autonomous workflow function button 804 within the floating widget 802. Specifically, the function button system 100 can demarcate the autonomous workflow function button 804 within the floating widget 802 using an autonomous workflow function button icon.

As illustrated in FIG. 8, responsive to detecting an indication of an interaction with the autonomous workflow function button 804, the function button system 100 can generate an autonomous workflow prompt 806. The function button system 100 can generate the autonomous workflow prompt 806 to include current content 808 from a current webpage of a web browser that the function button system 100 extracts from the current webpage. In some embodiments, the function button system 100 can extract the current content 808 by identifying one or more fields of the current webpage for the function button system 100 to modify. Further, the function button system 100 can generate the autonomous workflow prompt 806 to include an instruction 810 that indicates an autonomous workflow for the function button system 100 to use a large language model 812 (or simply "LLM 812") to perform. The function button system 100 can determine the autonomous workflow by identifying one or more steps performed by the user account to modify the one or more fields. More information regarding the function button system 100 determining the one or more steps performed by the user account can be found below at least with regard to the discussion of FIG. 17.

As illustrated in FIG. 8, Based on generating the autonomous workflow prompt 806, the function button system 100 can provide the autonomous workflow prompt 806 to the LLM 812. Further, the function button system 100 can use the LLM 812 to perform an act 814 of modifying fields of the current webpage (e.g., the one or more fields that the function button system 100 identifies or otherwise includes in the current content 808). For example, the function button system 100 can perform the act 814 of modifying fields by inserting field-specific data into each of the one or more fields. The function button system 100 can extract the field-specific data from a knowledge graph or database that stores information pertaining to the user account. In some embodiments, the function button system 100 can generate the instruction 810 to identify a content item within a content management system for the function button system 100 to extract data from that corresponds to the one or more fields. Additionally the function button system 100 can perform the act 814 of modifying the fields in real-time.

In the foregoing discussion of specific functionalities of different LLM function buttons (e.g., FIGS. 4-8), the term "current content" was frequently used to discuss extracting content to augment prompts for LLMs (e.g., "current content 408" of FIG. 4, "current content 514," of FIG. 5, "current content 608," of FIG. 6, "current content 708," of FIG. 7, and "current content 808" of FIG. 8. It should be understood that, in the foregoing discussion, "current content" can refer to content shown in a current webpage. For example, current content can be of a first webpage (e.g., the first webpage 204 of FIG. 2) that the function button system 100 actively displays on a client device. Further, "current content" can be of a second webpage (e.g., the second webpage 202 of FIG. 2) that the function button system 100 actively displays on a client device. Further, "current content" can refer to content from multiple webpages, such as a group of tabs of a web browser. To illustrate, in some embodiments "current content" can include tabs that are open in a web browser, but that the function button system 100 is not actively displaying. Moreover, in some embodiments "current content" can refer to content of multiple windows of multiple webpages. As previously discussed, in some embodiments, the function button system 100 can determine which webpages and/or web browsers to use as "current content" based on receiving an indication of current content from the user account.

Figure 9:
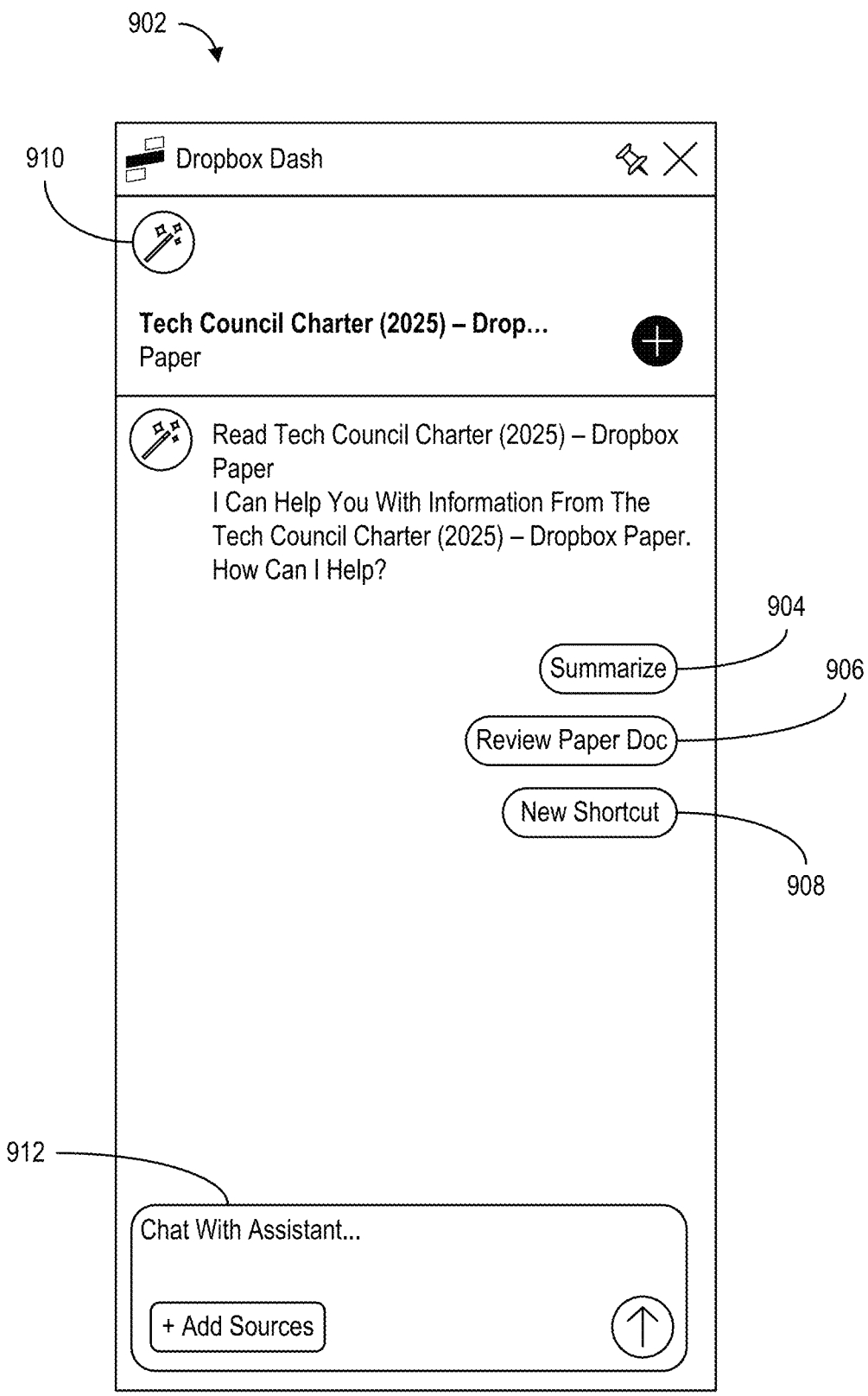
FIG. 9 illustrates an exemplary side panel generated in response to a selection of an LLM function button in accordance with some embodiments.

As previously mentioned, the function button system 100 can generate a side panel within a web browser of a client device. For example, responsive to detecting an indication of an interaction with an LLM function button within a floating widget that overlays content of a current webpage of a current web browser, the function button system 100 can generate the side panel according to the LLM function button. FIG. 9 illustrates the function button system 100 generating a side panel in accordance with one or more embodiments.

As shown in FIG. 9, the function button system 100 can generate a side panel 902 within a web browser of a client device. As previously discussed, the function button system 100 can generate the side panel 902 responsive to determining an indication of an interaction with an LLM function button. The function button system 100 can generate the side panel 902 to be horizontally aligned with or joined to the current webpage (e.g., such that the current webpage and the side panel 902 share a vertical border).

As illustrated in FIG. 9, the function button system 100 can generate the side panel 902 to include an icon 910 that corresponds to the LLM function button (such as an icon for the Summarize LLM function button as shown) that the function button system 100 detected an interaction with to instantiate generation of the side panel 902. Additionally, the function button system 100 can generate the side panel 902 to include an indication of a current webpage and/or current content of the webpage corresponding to the side panel 902 (e.g., "Tech Council Charter (2025)—Drop . . . "). For example, the function button system 100 can generate the indication of the current webpage and/or current content to indicate the current webpage that the function button system 100 overlaid with a floating widget that included the LLM function button.

Further, the function button system 100 can generate the side panel 902 to include an indication of a function for the function button system 100 to perform responsive to detecting the indication of the interaction with the LLM function (e.g., "Read Tech Council Charter (2025)—Dropbox Paper" and "I Can Help You With Information From the Tech Council Charter (2025)—Dropbox Paper. How Can I Help?"). Additionally, the function button system 100 can generate the side panel 902 to include a plurality of elements 904, 906, and 908 selectable to cause the function button system 100 to perform one or more actions corresponding to the current content.

Indeed, the function button system 100 can generate the plurality of elements 904, 906, and 908 to correspond to the LLM function button. For example, the function button system 100 can generate the side panel 902 to include a first element 904 selectable to cause the function button system 100 to generate a summary of current content of the current webpage. Additionally, the function button system 100 can generate the side panel 902 to include a second element 906 selectable to review (e.g., proofread) the current content. Further, the function button system 100 can generate the side panel 902 to include a third element 908 selectable to create a customized, autonomous workflow relating to the current content. More information regarding creating the customized, autonomous workflow can be found below at least with regard to the discussion of FIG. 17. Further, the function button system 100 can generate the side panel 902 to include a chat interface 912. The function button system 100 can use the chat interface 912 to receive a query from the user account and generate a response to the query.

In some embodiments, the function button system 100 can determine to include the chat interface 912 in the side panel 902 responsive to determining an indication of an interaction with an LLM function button of a plurality of LLM function buttons that the function button system 100 displays within a floating widget. To illustrate, responsive to determining an indication of an interaction with a summarize function button, a chat function button, a tone function button, a template function button, an autonomous workflow function button, and/or a different function button, the function button system 100 can determine to generate the side panel 902 and include the chat interface 912 in the side panel 902.

In some embodiments, the function button system 100 can generate the side panel 902 by modifying a size (e.g., a pixel size) of the current webpage within the current web browser. The function button system 100 can modify the size of the current webpage by determining a first horizontal length (e.g., a horizontal length measured in pixels) of the webpage and a second horizontal length of the web browser such that the first horizontal length is less than or equal to the second horizontal length.

Based on determining the second horizontal length (e.g., the horizontal length of the webpage), the function button system 100 can determine a first fraction of the second horizontal length and a second fraction of the second horizontal length such that the first fraction and the second fraction sum to 1 (e.g., such as $4/5$ and $1/5$). The function button system 100 can generate the side panel 902 by modifying the first horizontal length (e.g., of the current webpage) to be the first fraction of the second horizontal length (e.g., the function button system 100 can change the first horizontal length of the webpage to be the first fraction of the second horizontal length of the web browser). Further, the function button system 100 can generate the side panel 902 to have a third horizontal length that is equal to the second fraction of the second horizontal length. Accordingly, the function button system 100 can generate the side panel 902 within the web browser by reducing a horizontal size of the current webpage relative to a horizontal size of the web browser to generate the side panel 902 within the web browser.

Further, in some embodiments, the function button system 100 can generate the side panel 902 to be vertically aligned with or joined to the current webpage (e.g., such that the current webpage and the side panel 902 share a horizontal border). The function button system 100 can generate the side panel 902 to be vertically aligned with the current webpage in a similar process as described above, but by determining a first vertical length of the webpage and a second vertical length of the web browser rather than a first horizontal length of the webpage and a second horizontal length of the web browser. Indeed, in some embodiments, the function button system 100 can generate the side panel 902 within the web browser by determining the first horizontal length of the webpage, the second horizontal length of the web browser, the first vertical length of the webpage, the first vertical length of the web browser, and generating the side panel 902 according to the first horizontal length, the second horizontal length, the first vertical length, and the second vertical length.

Figure 10:
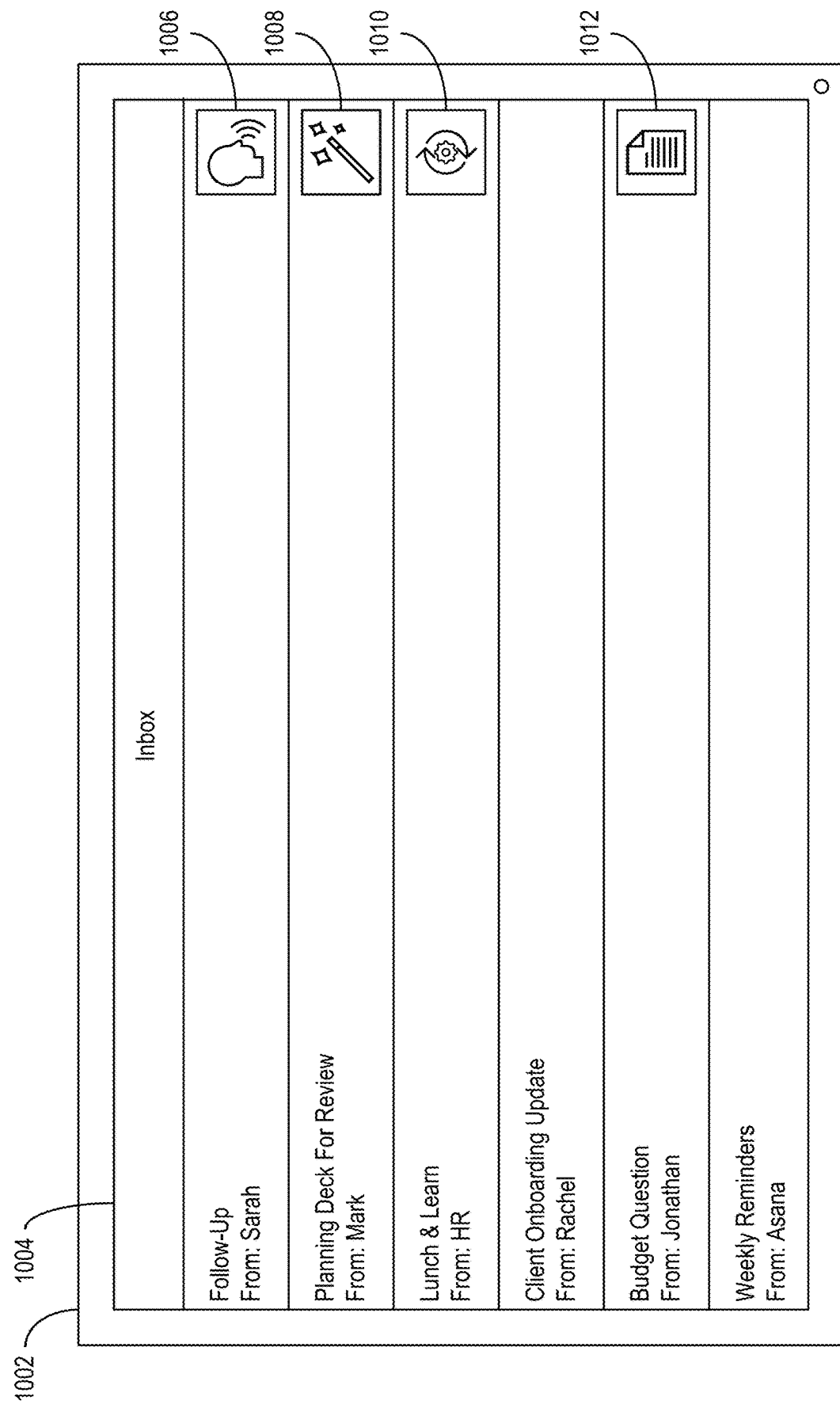
FIG. 10 illustrates embedding LLM function buttons in a webpage in accordance with some embodiments.

As previously discussed, in some embodiments, the function button system 100 can present a plurality of LLM function buttons within a current webpage (and/or an application) by embedding the plurality of LLM function buttons within the current webpage (e.g., as an alternative to presenting the plurality of LLM function buttons within a floating widget). For example, the function button system 100 can embed a plurality of LLM function buttons adjacent to corresponding emails. FIG. 10 illustrates the function button system 100 embedding a plurality of LLM function buttons within a current webpage in accordance with one or more embodiments.

As illustrated, in some embodiments, the function button system 100 can embed a plurality of LLM function buttons 1006, 1008, 1010, and 1012 in a current webpage 1004 of a web browser of a client device 1002. For example, the function button system 100 can extract or otherwise analyze current content of the current webpage 1004 to identify a webpage indicator to embed one or more of the plurality of LLM function buttons 1006, 1008, 1010, 1012 in the current webpage 1004. For example, the webpage indicator can be a type of the current webpage 1004, such as an email webpage. In some embodiments, based on determining the webpage indicator, the function button system 100 can determine one or more content indicators from current content of the webpage and embed one or more of the plurality of LLM function buttons 1006, 1008, 1010, 1012 according to the one or more content indicators. For example, the function button system 100 can determine the one or more content indicators according to emails within the webpage. To illustrate, the function button system 100 can extract and analyze emails or parts of emails, such as email titles, email addresses associated with user accounts that sent the emails, or content of the emails to determine the one or more content indicators.

As shown in FIG. 10, the function button system 100 can determine to embed a first LLM function button 1006 adjacent to or in line with a first email message. For example, responsive to determining that the first email contains a first type of content indicator, such as a request for a follow up from a first sender user account (e.g., "Follow Up" and/or "From: Sarah"), the function button system 100 can determine to embed the first LLM function button 1006 adjacent to the first email message. The function button system 100 can select the first LLM function button 1006 to be a tone function button that is selectable to autonomously generate a response to the request for the follow up. Responsive to detecting an indication of an interaction with the tone function button, the function button system 100 can extract current content from the first email, determine a tone from the current content, and generate tone-specific composed text according to the tone. In some embodiments, the function button system 100 can provide the tone-specific composed text to the user account within the current webpage 1004 (e.g., such as by generating a response to the first email). In some embodiments, the function button system 100 can provide the tone-specific composed text to the user account within a side panel.

As illustrated in FIG. 10, the function button system 100 can determine to embed a second LLM function button 1008 adjacent to or in line with a second email message. For example, responsive to determining that the second email message contains a second type of content indicator, such as an indication of a content item for review from a second sender user account (e.g., "Planning Deck For Review" and/or "From: Mark"), the function button system 100 can determine to embed the second LLM function button 1008 adjacent to the second email message. The function button system 100 can select the second LLM function button 1008 to be a summarize function button that is selectable to autonomously generate a summary of content of the second email message (e.g., the planning deck). The function button system 100 can generate a side panel and provide the summary to the user account via the side panel.

As shown in FIG. 10, the function button system 100 can determine to embed a third LLM function button 1010 adjacent to or in line with a third email message. To illustrate, responsive to determining that the third email message contains a third type of content indicator, such as an invitation to a meeting from a third sender user account (e.g., "Lunch & Learn," and/or "From: HR"), the function button system 100 can determine to embed the third LLM function button 1010 adjacent to the third email message. The function button system 100 can select the third LLM function button 1010 to be an autonomous workflow function button that is selectable to automatically modify one or more fields within the email message, such as personal data relating to the user account to complete a reservation for the lunch and learn.

As illustrated in FIG. 10, the function button system 100 can determine to embed a fourth LLM function button 1012 adjacent to or in line with a fourth email message. For example, responsive to determining that the fourth email message contains a fourth type of content indicator (e.g., "Budget Question" and/or "From: Jonathan"), the function button system 100 can determine to embed the fourth LLM function button 1012 adjacent to the fourth email message. The function button system 100 can select the fourth LLM function button 1012 to be a template function button that is selectable to generate a templated content item, such as a spreadsheet that provides details regarding the budget. The function button system 100 can generate a side panel and provide the templated content item to the user account via the side panel.

FIGS. 1-10, the corresponding text, and the examples provide a number of different systems and methods for generating a floating widget that includes an LLM function button. In addition to the foregoing, implementations can also be described in terms of flowcharts comprising acts or steps in a method for accomplishing a particular result. For example, FIG. 11 illustrates an example series of acts for generating a floating widget and modifying the floating widget in accordance with one or more embodiments.

Figure 11:
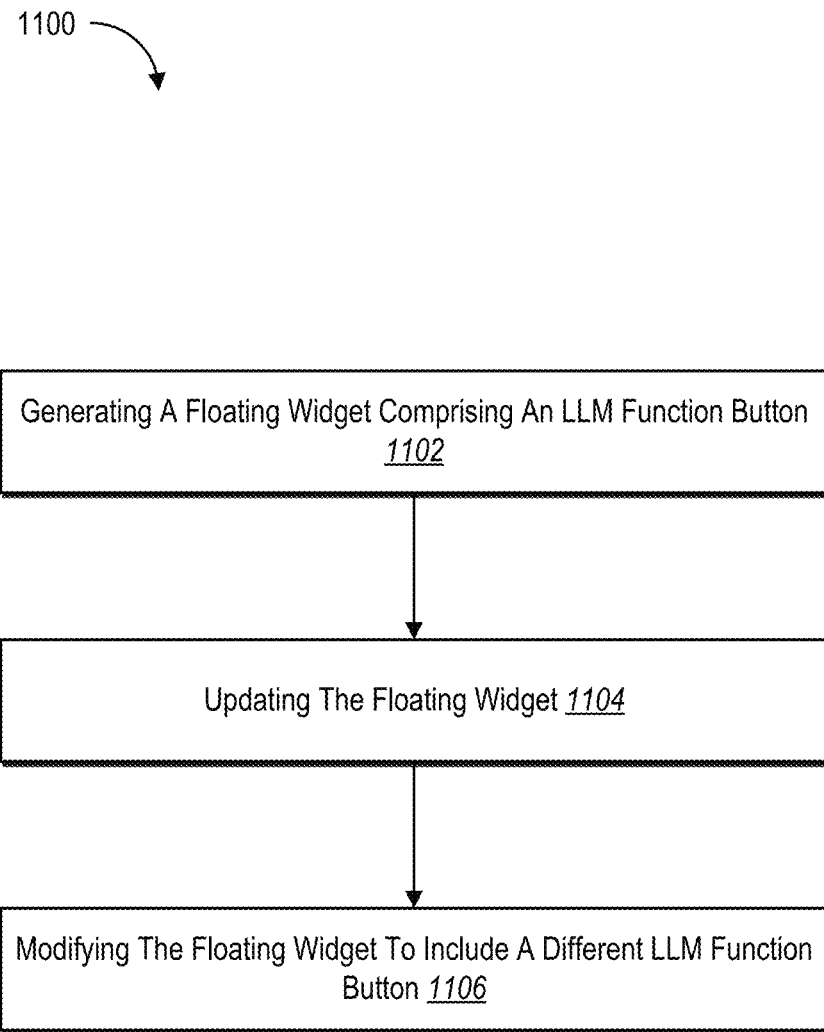
FIG. 11 illustrates an example flowchart of a series of acts for generating and modifying a floating widget in accordance with some embodiments.

While FIG. 11 illustrates acts according to certain implementations, alternative implementations may omit, add to, reorder and/or modify any of the acts shown in FIG. 11. The acts of FIG. 11 can be performed as part of a computer-implemented method. Alternatively, a non-transitory computer readable medium can comprise instructions, that when executed by one or more processors, cause a computing device to perform the acts of FIG. 11. In still further implementations, a system can perform the acts of FIG. 11.

As illustrated in FIG. 11, a series of acts 1100 may include an act 1102 of generating a floating widget comprising an LLM function button. Specifically, the act 1102 can include generating, for display overlaid on a first webpage within a web browser, a floating widget comprising a large language model (LLM) function button corresponding to first content of the first webpage overlaid by the floating widget.

As shown, the series of acts 1100 can include an act 1104 of updating the floating widget. Specifically, the act 1104 can include updating, in response to detecting a navigational input within the web browser navigating from the first webpage to a second webpage comprising second content different from the first content, the floating widget to overlay the second content of the second webpage.

As illustrated, the series of acts 1100 can include an act 1106 of modifying the floating widget to include a different LLM function button. Specifically, the act 1106 can include modifying, in response to detecting the floating widget overlaying the second content, the floating widget to include a different LLM function button corresponding to the second content of the second webpage.

Further, in some embodiments, the series of acts 1100 can include generating the floating widget to display a first subset of a plurality of LLM function buttons. Additionally, the series of acts 1100 can include modifying the floating widget to display a second subset of the plurality of LLM function buttons in response to detecting the navigational input.

Moreover, in one or more embodiments, the series of acts 1100 can include, responsive to receiving an indication of a selection of a summarize function button from among the plurality of LLM function buttons: extracting current content of a current webpage overlaid by the floating widget at selection of the summarize function button. Additionally, the series of acts 1100 can include generating a summary prompt comprising the current content and instructions to summarize the current content. Indeed, the series of acts 1100 can include generating, based on providing the summary prompt to an LLM, a summary of the current content. Furthermore, the series of acts 1100 can include providing the summary within a side panel of the web browser.

Additionally, in some embodiments, the series of acts 1100 can include, responsive to receiving an indication of a selection of a chat function button from among the plurality of LLM function buttons, instantiating a chat interface in a side panel of the web browser. Indeed, the series of acts 1100 can include extracting current content of a current webpage overlaid by the floating widget at selection of the chat function button. Moreover, the series of acts 1100 can include generating, in response to a query provided via the chat interface, a chat prompt comprising the current content, the query, and an instruction to generate a response to the query from the current content. Furthermore, the series of acts 1100 can include generating the response to the query for display in the chat interface by providing the chat prompt to an LLM.

Further, in one or more embodiments, the series of acts 1100 can include, responsive to receiving an indication of a selection of a tone function button from among the plurality of LLM function buttons, extracting current content of a current webpage overlaid by the floating widget at selection of the tone function button. Indeed, the series of acts 1100 can include generating a tone prompt comprising the current content and an instruction to generate tone-specific composed text according to a tone associated with the current content of the current webpage. Additionally, the series of acts 1100 can include generating, based on providing the tone prompt to an LLM, the tone-specific composed text. Indeed, the series of acts 1100 can include providing the tone-specific composed text for display within a side panel of the web browser.

In addition, in some embodiments, the series of acts 1100 can include, responsive to receiving an indication of a selection of a template function button from among the plurality of LLM function buttons, extracting current content of a current webpage overlaid by the floating widget at selection of the template function button. Indeed, the series of acts 1100 can include generating a template prompt comprising the current content and instructions to generate a templated content item according to the current content within the current webpage. Further, the series of acts 1100 can include generating, based on providing the template prompt to an LLM, the templated content item. In addition, the series of acts 1100 can include providing the templated content item within a side panel of the web browser.

Moreover, in one or more embodiments, the series of acts 1100 can include, responsive to receiving an indication of a selection of an autonomous workflow function button from among the plurality of LLM function buttons, extracting current content of a current webpage overlaid by the floating widget at selection of the autonomous workflow function button. Indeed, the series of acts 1100 can include generating an autonomous workflow prompt comprising the current content and instructions to execute an autonomous workflow based on the current content. Moreover, the series of acts 1100 can include executing the autonomous workflow by providing the autonomous workflow prompt to an LLM for modifying one or more fields within the current webpage.

Additionally, in some embodiments, the series of acts 1100 can include generating, for display overlaid on a first webpage within a web browser, a floating widget comprising a first subset of a plurality of large language model (LLM) function buttons corresponding to first content of the first webpage overlaid by the floating widget. Indeed, the series of acts 1100 can include updating, in response to detecting a navigational input within the web browser navigating from the first webpage to a second webpage comprising second content different from the first content, the floating widget to overlay the second content of the second webpage. In addition, the series of acts 1100 can include modifying, in response to detecting the floating widget overlaying the second content, the floating widget to include a second subset of the plurality of LLM function buttons corresponding to the second content of the second webpage.

Moreover, in one or more embodiments, the series of acts 1100 can include determining a context set relevant to the second content of the second webpage, the context set comprising a plurality of webpages open in respective tabs of the web browser. Indeed, the series of acts 1100 can include modifying the floating widget to include the second subset of the plurality of LLM function buttons based on the context set.

In addition, in some embodiments, the series of acts 1100 can include, responsive to receiving an indication of a selection of a summarize function button from among the first subset of the plurality of LLM function buttons, extracting current content of a current webpage overlaid by the floating widget at selection of the summarize function button. Indeed, the series of acts 1100 can include generating a summary prompt comprising the current content and instructions to summarize the current content. Further, the series of acts 1100 can include generating, based on providing the summary prompt to an LLM, a summary of the current content. Indeed, the series of acts 1100 can include providing the summary within a side panel of the web browser.

Furthermore, in one or more embodiments, the series of acts 1100 can include, responsive to receiving an indication of a selection of a chat function button from among the first subset of the plurality of LLM function buttons, instantiating a chat interface in a side panel of the web browser. Indeed, the series of acts 1100 can include extracting current content of a current webpage overlaid by the floating widget at selection of the chat function button. In addition, the series of acts 1100 can include generating, in response to a query provided via the chat interface, a chat prompt comprising the current content, the query, and an instruction to generate a response to the query from the current content. Moreover, the series of acts 1100 can include generating the response to the query for display in the chat interface by providing the chat prompt to an LLM.

Additionally, in some embodiments, the series of acts 1100 can include, responsive to receiving an indication of a selection of a tone function button from among the plurality of LLM function buttons, extracting current content of a current webpage overlaid by the floating widget at selection of the tone function button. Indeed, the series of acts 1100 can include generating a tone prompt comprising the current content and an instruction to generate tone-specific composed text according to a tone indication within the current content of the current webpage. Further, the series of acts 1100 can include generating, based on providing the tone prompt to an LLM, the tone-specific composed text. Additionally, the series of acts 1100 can include providing the tone-specific composed text within a side panel of the web browser.

Moreover, in one or more embodiments, the series of acts 1100 can include, responsive to receiving an indication of a selection of a template function button from among the plurality of LLM function buttons, extracting current content of a current webpage overlaid by the floating widget at selection of the template function button. Indeed, the series of acts 1100 can include generating a template prompt comprising the current content and instructions to generate a templated content item according to the current content within the current webpage. Furthermore, the series of acts 1100 can include generating, based on providing the template prompt to an LLM, the templated content item. Additionally, the series of acts 1100 can include providing the templated content item within a side panel of the web browser.

In addition, in some embodiments, the series of acts 1100 can include embedding, based on current content of a current webpage, at least one LLM function button of the first subset of the plurality of LLM function buttons in the current webpage.

Indeed, in one or more embodiments, the series of acts 1100 can include generating, for display overlaid on a first webpage within a web browser, a floating widget comprising a large language model (LLM) function button corresponding to first content of the first webpage overlaid by the floating widget. Further, in some embodiments, the series of acts 1100 can include updating, in response to detecting a navigational input within the web browser navigating from the first webpage to a second webpage comprising second content different from the first content, the floating widget to overlay the second content of the second webpage. In addition, the series of acts 1100 can include modifying, in response to detecting the floating widget overlaying the second content, the floating widget to include a different LLM function button corresponding to the second content of the second webpage. Furthermore, the series of acts 1100 can include generating, based on detecting an interaction with the LLM function button, a prompt for an LLM associated with the LLM function button, the prompt comprising an instruction for the LLM to complete a function of the LLM function button. Additionally, the series of acts 1100 can include providing the instruction and the first content of the first webpage to the LLM to cause the LLM to complete the function according to the prompt that includes the instruction and the first content.

Moreover, in some embodiments, the series of acts 1100 can include generating, based on detecting the interaction with the LLM function button, a side panel adjacent to the first webpage within the web browser. Indeed, the series of acts 1100 can include providing, for display in the side panel, a description of the LLM function button.

Additionally, in one or more embodiments, the series of acts 1100 can include generating the floating widget to display a first subset of a plurality of LLM function buttons. Indeed, the series of acts 1100 can include modifying the floating widget to display a second subset of the plurality of LLM function buttons in response to detecting the navigational input.

Furthermore, in some embodiments, the series of acts 1100 can include, based on determining that the LLM function button is a summarize function button, extracting current content of a current webpage overlaid by the floating widget at selection of the summarize function button. Indeed, the series of acts 1100 can include generating a summary prompt comprising the current content and instructions to summarize the current content. Moreover, the series of acts 1100 can include generating, based on providing the summary prompt to an LLM, a summary of the current content. Further, the series of acts 1100 can include providing the summary within a side panel of the web browser.

In addition, in one or more embodiments, the series of acts 1100 can include, based on determining that the LLM function button is a chat function button, instantiating a chat interface in a side panel of the web browser. Further, the series of acts 1100 can include extracting current content of a current webpage overlaid by the floating widget at selection of the chat function button. Indeed, the series of acts 1100 can include generating, in response to a query provided via the chat interface, a chat prompt comprising the current content, the query, and an instruction to generate a response to the query from the current content. Furthermore, the series of acts 1100 can include generating the response to the query for display in the chat interface by providing the chat prompt to an LLM.

Moreover, in some embodiments, the series of acts 1100 can include, based on determining that the LLM function button is a template function button, extracting current content of a current webpage overlaid by the floating widget at selection of the template function button. Indeed, the series of acts 1100 can include generating a template prompt comprising the current content and instructions to generate a templated content item according to the current content within the current webpage. Further, the series of acts 1100 can include generating, based on providing the template prompt to an LLM, the templated content item. In addition, the series of acts 1100 can include providing the templated content item within a side panel of the web browser.

Figure 12:
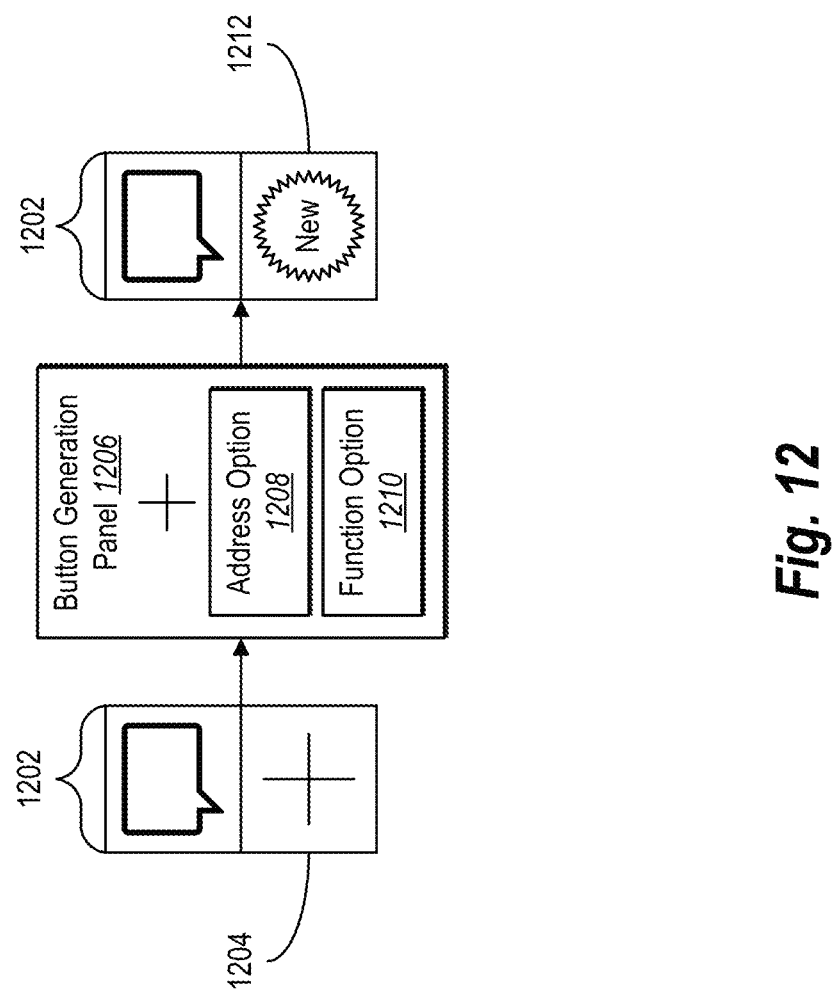
FIG. 12 illustrates an overview of the function button system generating an LLM function button responsive to an interaction with a LLM button generation option in accordance with some embodiments.

Contextually Generated Side Panel Buttons:

As previously mentioned, in some embodiments, the function button system 100 can generate a contextualized LLM function button (sometimes hereinafter referred to as a "customized LLM function button" or a "new LLM function button") to perform a custom function for a user account. For example, in addition to surfacing preset LLM function buttons within the floating widget, the function button system 100 can provide a set of button generation tools to enable the function button system 100 to surface customized LLM function buttons according to parameters such as a pre-defined web address. FIG. 12 illustrates an overview of generating a customized LLM function button according to parameters the function button system 100 determines within a button generation panel in accordance with one or more embodiments. Additional detail regarding the acts and processes introduced in relation to FIG. 12 is provided thereafter with reference to subsequent figures As illustrated in FIG. 12, the function button system 100 can provide a floating widget 1202 for display in a web page of a web browser. As previously mentioned, the function button system 100 can surface a subset of LLM function buttons within the floating widget 1202. In some embodiments, the function button system 100 can generate the floating widget 1202 to include an LLM button generation option 1204. For example, the function button system 100 can provide the LLM button generation option 1204 as a default option within the floating widget 1202.

In some cases, the function button system 100 can include the LLM button generation option 1204 in the floating widget 1202 responsive to determining that the webpage is a new webpage (e.g., by comparing the web address of the webpage with cached data for webpages a user account visited previously to determine that the webpage is the new webpage). In some embodiments, the function button system 100 can determine to include the LLM button generation option 1204 in the floating widget responsive to determining that a user account has repeatedly accessed the webpage. The function button system 100 can generate the LLM button generation option 1204 to be selectable to generate a new LLM function button 1212 (e.g., a customized LLM function button or a contextual LLM function button that is different from previously discussed LLM function buttons, such as the summarize function button, the chat function button, the tone function button, and/or the autonomous workflow function button, among others).

As shown in FIG. 12, the function button system 100 can generate and display a button generation panel 1206. Indeed, the function button system 100 can provide the button generation panel 1206 in response to a selection of the LLM button generation option 1204. As used herein, the term "button generation panel" can refer to a side panel that the function button system 100 generates within a web browser responsive to determining a selection of the LLM button generation option. Specifically, the function button system 100 can use the button generation panel to define parameters of the new LLM function button.

As illustrated, the function button system 100 can generate the button generation panel to include an address option 1208 and a function option 1210. Specifically, the function button system 100 can generate the address option 1208 to define web address parameters (e.g., one or more web addresses) where the function button system 100 will include the new LLM function button 1212 in the display of the floating widget 1202. Further, the function button system 100 can generate the function option to define function parameters (e.g., a workflow) that the function button system 100 executes responsive to an indication of a selection of the new LLM function button 1212. For example, the function button system 100 can perform a workflow according to the function parameters defined in the function option 1210, such as modifying one or more fields of a webpage or generating a specific summary of current content of the current webpage.

As illustrated, the function button system 100 can include the new LLM function button 1212 in the floating widget 1202. Indeed, responsive to determining that a web address of a current webpage matches one or more addresses from the address option 1208, the function button system 100 can include the new LLM function button 1212 in the floating widget 1202. Specifically, the function button system 100 can generate the new LLM function button 1212 to be selectable to perform a workflow from the function option 1210.

Additionally, in some embodiments, responsive to detecting an interaction with the LLM button generation option 1204, include previously generated customized LLM function buttons within the button generation panel 1206. For example, in some embodiments the function button system 100 can generate the button generation panel 1206 to include a window that displays customized LLM function buttons the function button system 100 generated according to previous interactions with the LLM button generation option 1204. To illustrate, in some embodiments the function button system 100 can generate the LLM button generation option 1204 to be a shortcut to customized LLM function buttons the function button system 100 previously generated. Further, the function button system 100 can receive a selection of a previously generated customized LLM function button to modify a function of the LLM function button according to input from a user account.

As previously mentioned, the function button system 100 provides a variety of technical advantages relative to conventional systems, such as improving operational flexibility over conventional systems. Indeed, by generating a customized LLM function button to perform customized, contextually aware tasks for the user account, the function button system 100 is able to harness large language models to execute functions that are specific to the content of a webpage. Further, the function button system 100 can adapt the functions to similar webpages, such as webpages that share a domain.

Figure 13:
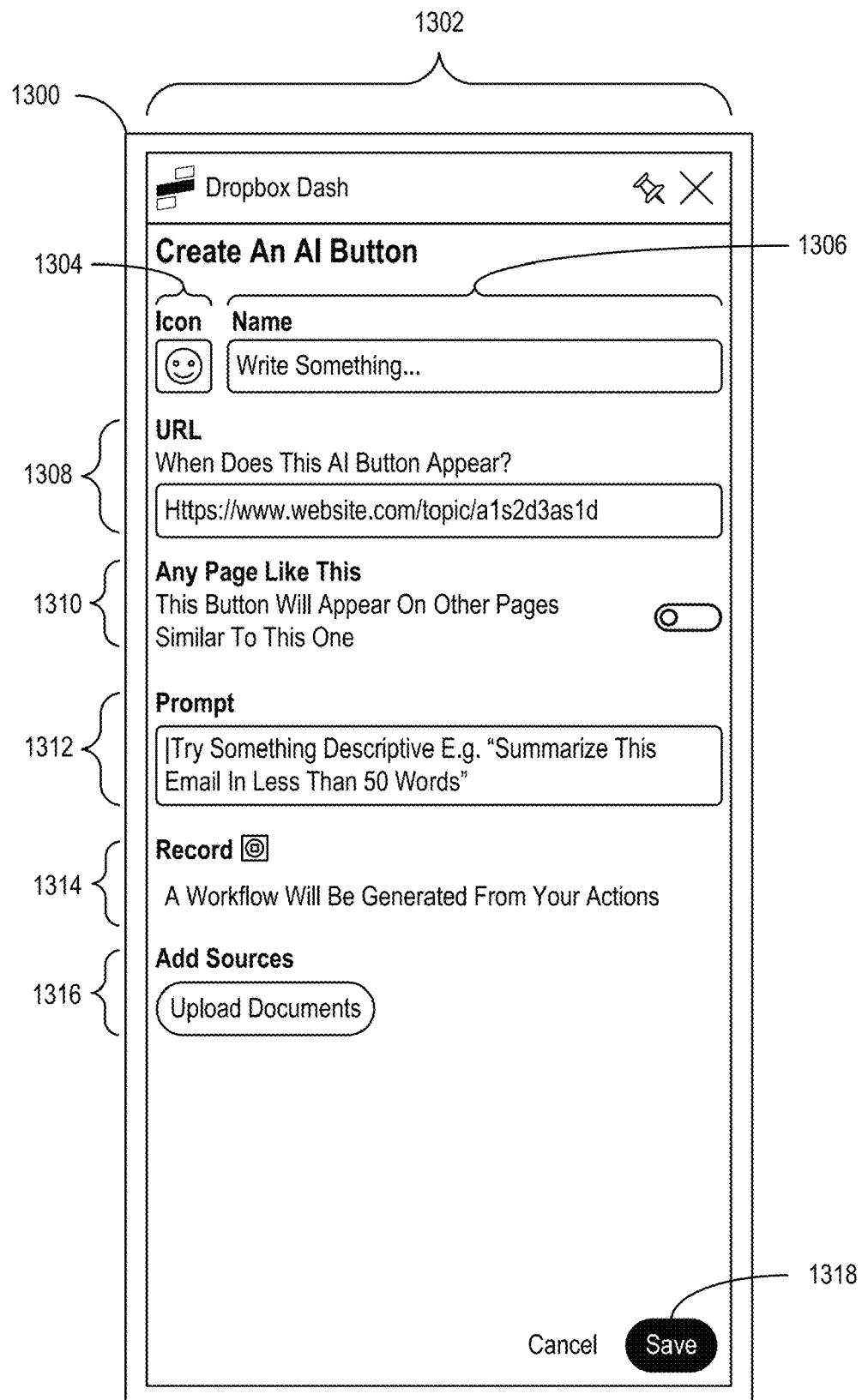
FIG. 13 illustrates the function button system determining one or more functions for a custom LLM function button according to interactions with a button generation panel in accordance with some embodiments.

As previously mentioned, the function button system 100 can generate a button generation panel within a web browser. For example, responsive to receiving an indication of a selection with the LLM button generation option (such as a click, a tap, or a swipe), the function button system 100 can generate the button generation panel within a current webpage of a web browser. FIG. 13 illustrates the function button system 100 generating the button generation panel to define parameters for a new LLM function button in accordance with one or more embodiments.

As shown in FIG. 13, the function button system 100 can generate and display a button generation panel 1302 within a web browser 1300 of a client device. For example, in response to detecting an interaction with a LLM button generation option, the function button system 100 can modify the web browser 1300 by compressing or otherwise truncating one or more webpages of the web browser 1300 to display the button generation panel 1302. To illustrate, the function button system 100 can generate the button generation panel 1302 to be adjacent to a currently displayed webpage of the web browser 1300. Further, the function button system 100 can generate the button generation panel 1302 to include one or more of a plurality of fields, such as an icon selection option 1304, a name definition option 1306, an address option 1308, a function adaptation option 1310, a function option 1312, an action record option 1314, and/or an interface element 1316, among others.

As illustrated, the function button system 100 can generate the button generation panel 1302 to include an icon selection option 1304. Responsive to an interaction with the icon selection option 1304, the function button system 100 can define one or more appearance parameters of the new LLM function button. For example, responsive to an indication of an interaction with the icon selection option 1304, the function button system 100 can modify the button generation panel 1302 to include an icon selection window. The function button system 100 can display icons within the icon selection window. Responsive to determining an interaction with an icon (e.g., such as a click a swipe or a tap) within the icon selection window, the function button system 100 can use the icon to represent the new LLM function button in a floating widget.

As shown in FIG. 13, the function button system 100 can generate the button generation panel 1302 to include a name definition option 1306. Responsive to an interaction with the name definition option 1306 (e.g., such as input from a user account), the function button system 100 can generate a name the new LLM function button. In some embodiments, the function button system 100 can display the name for the new LLM function button along with the icon for the new LLM function button in the floating widget. In some embodiments, the function button system 100 can display the name for the different LLM function button 108 in a side panel responsive to an interaction (e.g., a click, tap, or a swipe) with the new LLM function button within the floating widget. The function button system 100 can include the name of the new LLM function button within the side panel. Further, in some embodiments, responsive to an indication of an interaction with the name definition option 1306, the function button system 100 can provide one or more suggestions for the name of the new LLM function button based on additional interactions with other fields of the button generation panel 1302.

As previously mentioned, the function button system 100 can include the address option 1308 in the button generation panel 1302. Responsive to determining an interaction with the address option 1308, the function button system 100 can determine a location parameter for the new LLM function button. Specifically, the function button system 100 can use the location parameter to define a virtual location (e.g., such as a web address) where the function button system 100 will include the new LLM function button in the floating widget. For example, the function button system 100 can determine the interaction with the address option 1308 by determining a click, swipe, or tap with the address option 1308 and further receiving text, such as a web address, within the address option.

In some embodiments, the function button system 100 can determine a first interaction with the address option 1308, and can determine the virtual location by determining an interaction with a tab and/or a webpage of the web browser. To illustrate, in some embodiments, the function button system 100 can receive the first interaction with the address option 1308 that indicates an incoming indication of a virtual location where the function button system 100 will display the new LLM function button. Responsive to detecting the first interaction, the function button system 100 can determine the virtual location for the new LLM function button by determining an interaction with a tab of a webpage (e.g., the function button system 100 can extract a web address corresponding to the tab of the webpage and use the web address to define the virtual location associated with the new LLM function button.

As shown in FIG. 13, the function button system 100 can generate the button generation panel 1302 to include a function adaptation option 1310. The function button system 100 can use the function adaptation option 1310 to modify the location parameter of the address option 1308. For example, the function button system 100 can generate the function adaptation option 1310 to be an interactive user element that is selectable (e.g., toggleable) to expand the location parameter of the address option 1308. To illustrate, responsive to receiving an input of a web address in the address option 1308 and determining an indication of an interaction with the interactive user element (e.g., a click, tap, or a swipe) of the function adaptation option 1310, the function button system 100 can expand the location parameter to include web addresses that share a web domain with the web address the function button system 100 detects in the address option. Indeed, the function button system 100 can extract a web domain from the web address and expand the location parameter to include web addresses corresponding to the web domain. In some embodiments, responsive to receiving an interaction with the address option 1308, the function button system 100 can automatically provide a suggestion to the user account that indicates that the function button system 100 can expand the location parameter to include web addresses that share a same web domain as the web address the function button system 100 detects in the address option 1308.

As illustrated in FIG. 13, the function button system 100 can generate the button generation panel 1302 to include a function option 1312. Indeed, the function button system 100 can use the function option 1312 to determine a function or workflow to execute responsive to an indication of a selection of the new LLM function button. For example, the function or workflow can be a series of natural language instructions that the function button system 100 provides to an LLM responsive to receiving an indication of an interaction with the new LLM function button. To illustrate, the function button system 100 can receive a text input (e.g., a natural language instruction) from the user account within the function option 1312. The function button system 100 can analyze the text input to extract or otherwise determine a workflow from the text input. Specifically, the function button system 100 can extract the workflow from the text input by determining one or more processes that are executable by an LLM to accomplish a function or task indicated by the text input (e.g., the function button system 100 uses the text input to determine a function from the function option 1312 that the function button system 100 associates with the new LLM function button).

As shown in FIG. 13, the function button system 100 can generate the button generation panel 1302 to include an action record option 1314. Indeed, the function button system 100 can generate the action record option 1314 to be selectable to record one or more user account interactions. For example, the one or more user account interactions can be within a webpage of the web browser 1300 or within an application. The function button system 100 can extract a workflow from the one or more user account interactions. Based on extracting the workflow, the function button system 100 can generate a new LLM function button to be selectable to replicate the one or more user account interactions. In some embodiments, the function button system 100 can generate the action record option 1314 responsive to detecting an indication of an interaction with the function option 1312 (e.g., the function button system 100 can generate the action record option 1314 to be a subset of the function option 1312). In some embodiments, the function button system 100 can generate the action record option 1314 within a floating widget that overlays content of a webpage of the web browser 1300. More information regarding the action record option 1314 will be provided below at least with regard to the discussion of FIGS. 14 and 18A-18B.

As illustrated in FIG. 13, the function button system 100 can generate the button generation panel 1302 to include an interface element 1316 that is selectable to provide the function button system 100 with access to one or more content items. For example, the function button system 100 can include the interface element 1316 to generate the LLM function button that utilizes retrieval-augmented-generation (e.g., "RAG") in workflows that the function button system 100 executes relating to the function option 1312. For example, based on content items the function button system 100 receives via the interface element 1316 (or receives an indication of permission via the interface element 1316), the function button system 100 can determine to extract data from one or more of the content items in order to complete a workflow associated with the function option 1312.

To illustrate, the function button system 100 can receive input text into the function option 1312 that indicates a request for the function button system 100 to extract data from a content item. The function button system 100 can receive permission to extract data from the content item via the interface element 1316. In some embodiments, the function button system 100 can generate the interface element 1316 to enable the function button system 100 to receive an upload of one or more content items from which to extract data. In some embodiments, the function button system 100 can generate the interface element 1316 to be selectable to create a drop-down menu through which the function button system 100 receives permission to extract data from one or more content items.

An example will now be provided of how the function button system 100 can use the button generation panel 1302 and its elements to generate an LLM function button (e.g., a new LLM function button). The function button system 100 can generate the button generation panel 1302 within the web browser 1300 responsive to detecting an indication of an interaction with an LLM button generation option within the web browser (e.g., as discussed above with regard to FIG. 12). Within the button generation panel, the function button system 100 can provide the icon selection option 1304 and the name definition option 1306. In some embodiments, the function button system 100 can provide suggestions for an icon for the new LLM function button within the icon selection option. Further, in some embodiments the function button system 100 can provide name suggestions for the new LLM function button within the name definition option 1306.

Additionally, the function button system 100 can generate the button generation panel 1302 to include the address option 1308. In some embodiments, the function button system 100 can automatically extract a web address of a webpage corresponding to the LLM button generation option (e.g., the webpage over which the function button system 100 overlaid the floating widget that includes the LLM button generation option). Based on extracting the web address of the webpage, the function button system 100 can automatically populate the address option 1308 with the web address. Further, the function button system 100 can include the function adaptation option 1310 to expand the virtual locations where the function button system 100 displays the new LLM function button (e.g., according to one or more web addresses indicated by the address option and/or the function adaptation option 1310).

Moreover, the function button system 100 can generate the button generation panel 1302 to include the function adaptation option 1310. In some embodiments, the function button system 100 can generate the function adaptation option 1310 to be selectable (e.g., as a toggle button for enabling and disabling) to receive an input from a user account. The function button system 100 can use the workflow from the input. Based on extracting the workflow, the function button system 100 can determine one or more functions to execute according to a selection of the new LLM function button. For example, based on determining a selection (e.g., an indication of an interaction) of the new LLM function button, the function button system 100 can provide a prompt to an LLM that includes the workflow the function button system 100 extracted from the input to the function option.

In some embodiments, the function button system 100 can generate the button generation panel 1302 to include an action record option 1314. Based on detecting a selection of the action record option 1314, the function button system 100 can record one or more user account interactions within the web browser 1300. The function button system 100 can use the one or more interactions to determine a function to execute based on a selection of the new LLM function button. In some embodiments, the function button system 100 can determine the one or more functions of the new LLM function button to execute according to both an input into the function option 1312 and one or more recorded user account interactions (e.g., responsive to a selection of the action record option 1314). In addition, the function button system 100 can generate the button generation panel 1302 to include the interface element 1316 selectable to allow the function button system 100 to have access to and/or extract data from one or more content items.

Further, the function button system 100 can provide suggestions for one or more fields of the button generation panel 1302 based on determining a user account interaction with one or more other fields of the button generation panel 1302. To illustrate, in some embodiments the function button system 100 can provide a suggestion for the function adaptation option 1310 and/or the function option 1312 based on determining or otherwise receiving an input into the address option (e.g., a website). In some embodiments, the function button system 100 can provide a suggestion to input into the icon selection option 1304 and/or the name definition option 1306 based on receiving an input into the address option 1308, the function adaptation option 1310, the function option 1312, the action record option 1314, and/or an interaction with the interface element 1316.

As illustrated in FIG. 13, the function button system 100 can generate the button generation panel 1302 to include an interface element 1318 selectable to generate the new LLM function button according to the inputs of the various components of the button generation panel 1302. For example, responsive to detecting interactions with one or more of the icon selection option, the name definition option, the address option 1308, the function adaptation option 1310, the function option 1312, the action record option 1314, the interface element 1316, and/or the interface element 1318, the function button system 100 can generate the new LLM function button. Based on generating the new LLM function button, the function button system 100 can display the new LLM function button responsive to determining that a web address of a current webpage matches a web address indicated in the address option 1308 and/or the function adaptation option 1310.

Based on determining an indication of an interaction with the new LLM function button within the current webpage that matches the web address from the address option and/or the function adaptation option 1310, the function button system 100 can execute a workflow. Specifically, the function button system 100 can determine the workflow from the function option 1312 and/or the action record option 1314. Further, the function button system 100 can determine that the workflow indicates one or more content items for the function button system 100 to access to execute the workflow according to the interaction with the interface element 1316. The function button system 100 can execute the workflow by providing a prompt to an LLM that includes instructions to use the LLM to perform one or more actions indicated by the workflow. As previously mentioned, in some embodiments the prompt can include current content of the current webpage (e.g., the webpage with the web address that matches the web address indicated by the address option 1308 and/or the function adaptation option 1310.

Further, in some embodiments, the function button system 100 can generate the button generation panel 1302 to include an access interface element selectable to enable additional user accounts within a content management to access, and/or utilize the LLM function button that the function button system 100 creates from the inputs into the button generation panel 1302. For example, based on detecting an interaction with the access interface element and the interface element 1318, the function button system 100 can generate an LLM function button according to the parameters of the button generation panel 1302. The function button system 100 can analyze a knowledge graph to determine additional user accounts within the content management system (e.g., such as user accounts on a same organizational team or project as the user account) to provide with access to the LLM function button.

Figure 14:
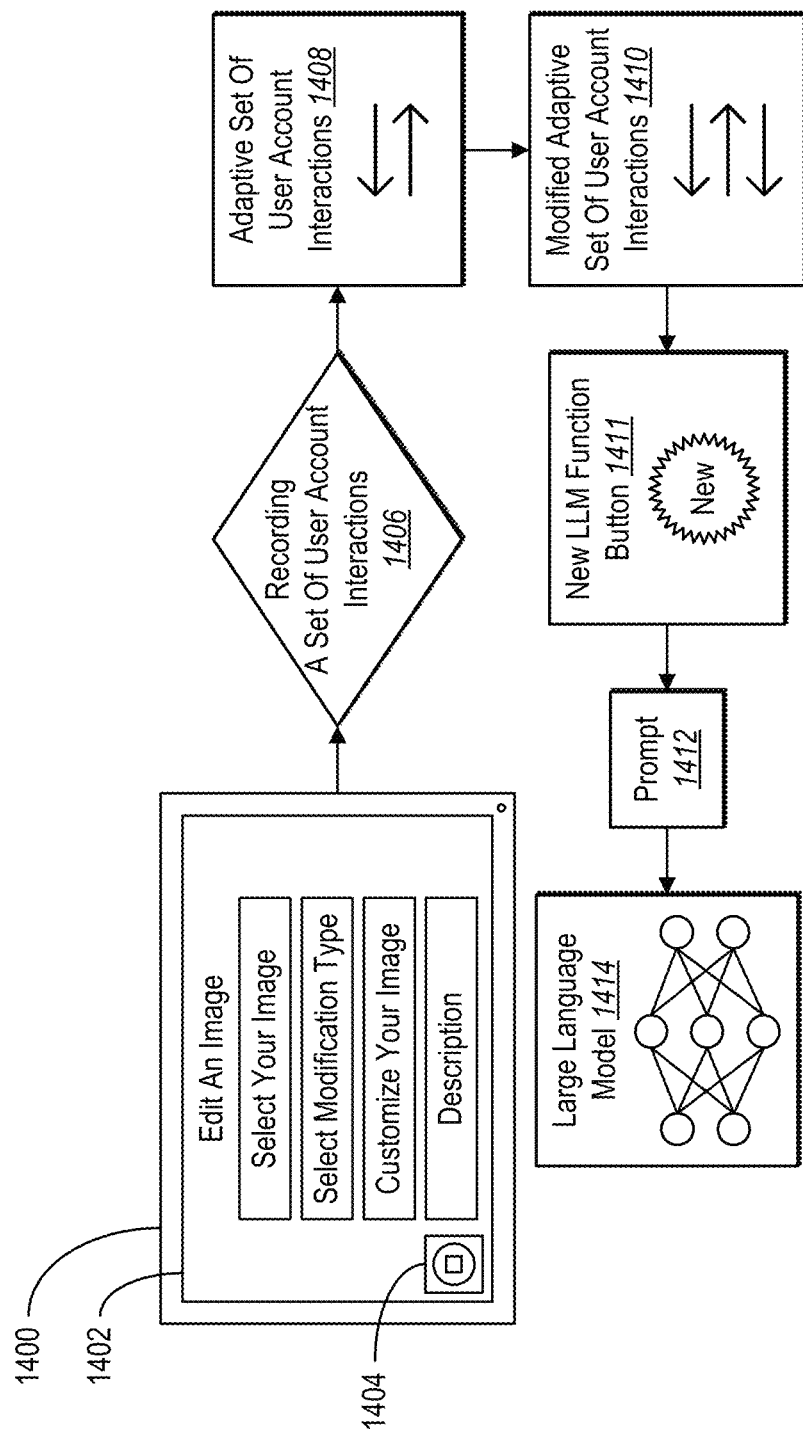
FIG. 14 illustrates the function button system recording a set of user account interactions to generate a custom LLM function button in accordance with some embodiments.

As previously mentioned, in some embodiments, the function button system 100 can record a set of user account interactions to determine an adaptive set of user account interactions. The function button system 100 can generate a new LLM function button based on the adaptive set of user account interactions. FIG. 14 illustrates the function button system 100 generating a new LLM function button (e.g., an LLM function button) based on recording a set of user account interactions and generating a prompt to provide to an LLM based on detecting an interaction with the new LLM function button in accordance with one or more embodiments.

As illustrated in FIG. 14, the function button system 100 can provide an action record option 1404 within a webpage 1402 of a client device 1400. In some embodiments, the function button system 100 can determine to display the action record option 1404 responsive to determining that a user account repeatedly and/or periodically accesses the webpage 1402. Further, the function button system 100 can determine to display the action record option 1404 responsive to determining that the user account repeatedly performs one or more types of actions within the webpage 1402. In some embodiments, the function button system 100 can determine to display the action record option 1404 responsive to determining that one or more additional user accounts (e.g., within a content management system) have accessed the webpage or a similar webpage.

In some embodiments, the function button system 100 can provide the action record option 1404 in a button generation panel. In some embodiments, the function button system 100 can provide the action record option 1404 in a floating widget that the function button system 100 displays in the webpage 1402. For example, in some embodiments, the function button system 100 can display the action record option 1404 responsive to determining that the webpage 1402 includes one or more modifiable fields (such as "Select Your Image," "Select Modification Type," "Customize Your Image," and "Description").

As shown in FIG. 14, responsive to determining an interaction with the action record option 1404 (e.g., such as a click or a tap), the function button system 100 can perform an act 1406 of recording a set of user account interactions. As used herein, the term "user account interaction" can refer to an interaction of a user account taken within a client device. For example, a user account interaction can include modifying a field of a webpage (e.g., such as by inserting text or uploading a content item into the field), navigating between webpages of a web browser, navigating between web browsers, and/or navigating between applications on the client device. In some embodiments, a user account interaction can be a navigational input (e.g., such as a scroll, tap, or swipe). A set of user account interactions can be any combination of user account interactions.

Based on performing the act 1406, the function button system 100 can determine an adaptive set of user account interactions 1408. Specifically, the function button system 100 can generate the adaptive set of user account interactions 1408 to be adaptable to differences in content within one or more webpages related to the webpage 1402 displayed in the web browser. For example, the function button system 100 can generate the adaptive set of user account interactions 1408 to account for differences in content such as different, but related fields. To illustrate, the function button system 100 can perform the act 1406 by recording a set of user account interactions with the webpage 1402, where the webpage 1402 relates to editing an image. The function button system 100 can generate the adaptive set of user account interactions 1408 to be adaptable or otherwise compatible with webpages similar to the webpage 1402 (e.g., such as webpages that share a domain with the webpage 1402). For example, the function button system 100 can generate the adaptive set of user account interactions 1408 to be adaptable to modifying a different type of content item, such as a document, audio file, or video file as opposed to an image. Additionally, the function button system 100 can generate the adaptive set of user account interactions 1408 to be adaptive to variations of the adaptive set of user account interactions 1408 within the webpage 1402.

For example, as shown in FIG. 14, the webpage 1402 includes a plurality of fields (e.g., "Select Your Image," "Select Modification Type," "Customize Your Image," and "Description"). The function button system 100 can generate the adaptive set of user account interactions 1408 to enable the function button system 100 to modify the fields in different ways. For example, the function button system 100 can generate the adaptive set of user account interactions 1408 to indicate an image to indicate one or more images to upload to modify the "Select Your Image" field. In some embodiments, the function button system 100 can generate the adaptive set of user account interactions 1408 to indicate inputs to use in the "Select Modification Type" field, the "Customize Your Image" field, and the "Description" field based on an entry or upload into the "Select Your Image" field. In some embodiments, the function button system 100 can generate the adaptive set of user account interactions 1408 to indicate an anchor user account interaction (e.g., such as a field modification, data upload, navigational input, and/or data entry) that determines downstream user account interactions of the adaptive set of user account interactions 1408. For example, in some embodiments the anchor user account interaction can be a modification of a first field (e.g., "Select Your Image"), a second field (e.g., "Select Modification Type"), a third field (e.g., "Customize Your Image"), a fourth field (e.g., "Description"), or another field.

To provide another example, in some embodiments the function button system 100 can determine that the webpage 1402 relates to filing a claim with an entity. Further, the function button system 100 can determine that the webpage includes a plurality of fields relating to filing the claim with the entity (such as "Select Your Account," "Merchant or Provider," "Purchase Date," and "Description"). The function button system 100 can generate the adaptive set of user account interactions 1408 to enable the function button system 100 to modify the fields in different ways. For example, the function button system 100 can generate the adaptive set of user account interactions 1408 to indicate one or more accounts to select from to modify the "Select Your Account" field. In some embodiments, the function button system 100 can generate the adaptive set of user account interactions 1408 to indicate data to use in the "Merchant or Provider" field, the "Purchase Date" field, and the "Description" field based on an entry into the "Select Your Account" field.

As illustrated in FIG. 14, based on generating the adaptive set of user account interactions 1408, the function button system 100 can generate a modified adaptive set of user account interactions 1410. For example, the function button system 100 can generate the modified adaptive set of user account interactions 1410 by providing a description of the adaptive set of user account interactions 1408 for display on the client device 1400 (e.g., such as within a button generation panel). The description of the adaptive set of user account interactions 1408 can be a natural language description of the adaptive set of user account interactions 1408. Based on providing the description of the adaptive set of user account interactions 1408, the function button system 100 can receive feedback or a modification of the adaptive set of user account interactions 1408 to generate the modified adaptive set of user account interactions 1410. For example, the function button system 100 can provide the description of the adaptive set of user account interactions 1408 as editable text in a window of the button generation panel and request modifications and/or feedback of the description of the adaptive set of user account interactions 1408 from a user account. In some embodiments, the feedback can be an approval of the description of the adaptive set of user account interactions 1408. Based on receiving the modifications and/or approval, the function button system 100 can generate the modified adaptive set of user account interactions 1410.

In some embodiments, the function button system 100 can generate the adaptive set of user account interactions 1408 to be adaptable to changes in the webpage 1402. For example, the function button system 100 can generate the adaptive set of user account interactions 1408 to be adaptive to changes in a layout of the webpage 1402 and/or changes in content of the webpage 1402. To illustrate, the function button system 100 can generate the adaptive set of user account interactions 1408 to include independent, non-linear descriptions of user account interactions within the webpage 1402. In some embodiments, the function button system 100 can generate the adaptive set of user account interactions 1408 to include a description of a structure or layout of the webpage 1402. The function button system 100 can further generate the adaptive set of user account interactions 1408 to include instructions for an LLM to interact with elements of the webpage 1402 according to the structure or layout of the webpage 1402. In some embodiments, responsive to detecting an update or change to the webpage 1402 (e.g., such as detecting a change in content or structure of the webpage 1402), the function button system 100 can modify the adaptive set of user account interactions 1408 according to the update or change to the webpage 1402. Further, the function button system 100 can similarly generate the modified adaptive set of user account interactions 1410 to be adaptable to changes or updates to the webpage 1402.

As illustrated in FIG. 14, based on generating the modified adaptive set of user account interactions 1410, the function button system 100 can generate a new LLM function button 1411. The function button system 100 can provide the new LLM function button 1411 for display in the webpage 1402 (or webpages similar to the webpage), such as within a floating widget. Indeed, the function button system 100 can generate the new LLM function button 1411 to be selectable to execute a workflow based on the modified adaptive set of user account interactions 1410 (and/or the adaptive set of user account interactions 1408). For example, the function button system 100 can generate the new LLM function button 1411 to be selectable to replicate the set of user account interactions that the function button system 100 recorded at the act 1406. In some embodiments, the function button system 100 can generate the new LLM function button 1411 to be selectable to replicate one or more outcomes of the set of user account interactions.

As illustrated in FIG. 14, the function button system 100 can generate a prompt 1412 to provide to an LLM 1414. In some embodiments, the function button system 100 can generate the prompt 1412 by extracting a workflow from the modified adaptive set of user account interactions 1410. Further, in some embodiments the function button system 100 can generate the prompt 1412 by extracting content from the webpage 1402. For example, the function button system 100 can generate the prompt 1412 by extracting the content from the webpage 1402 and extracting the workflow from the modified adaptive set of user account interactions 1410 that is specific to the content of the webpage 1402. The function button system 100 can provide the prompt 1412 to the LLM 1414 to use the LLM 1414 to interact with the webpage 1402. For example, the function button system 100 can use the LLM 1414 to modify the webpage 1402, to generate a content item based on content of the webpage 1402, to summarize content of the webpage 1402, among others.

Figure 15:
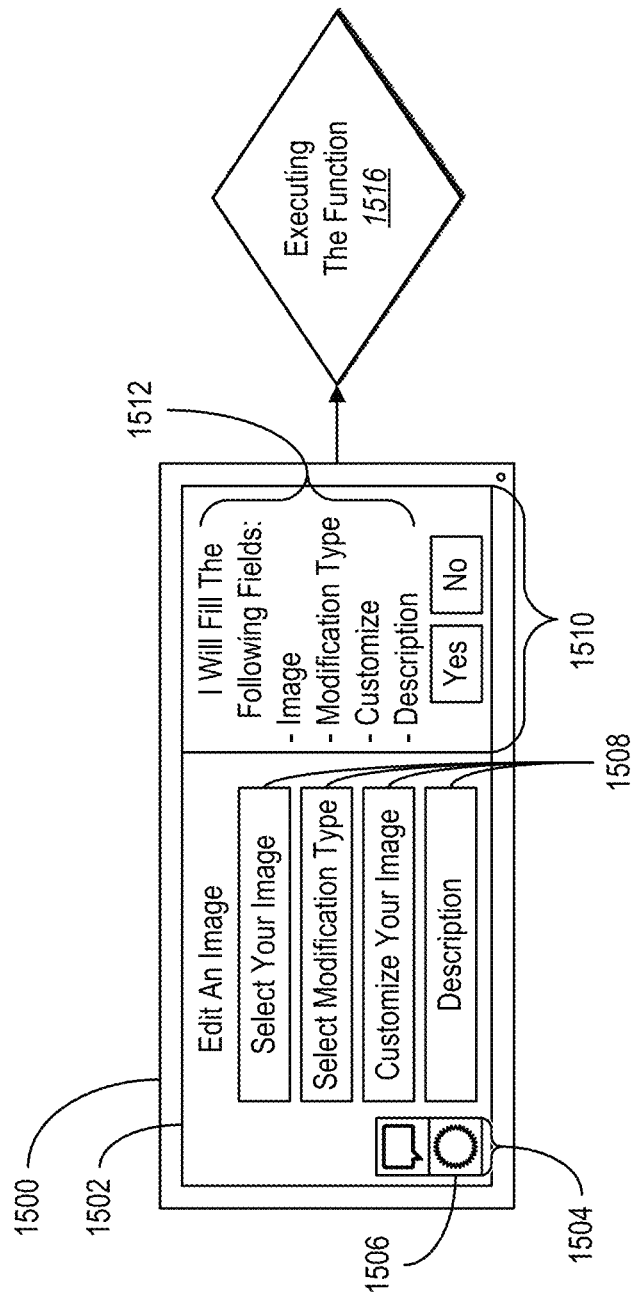
FIG. 15 illustrates the function button system executing a function of a custom LLM function button in response to receiving an indication of approval of a description of the function in accordance with some embodiments.

As previously mentioned, in some embodiments, the function button system 100 can execute a function of an LLM function button responsive to receiving a confirmation of a description of the function. For example, the function button system 100 can provide a description of a function of an LLM function button, such as a new LLM function button generated in response to an interaction with an LLM button generation option. FIG. 15 illustrates the function button system 100 executing the function of an LLM function button responsive to receiving a confirmation of a description of the LLM function button in accordance with one or more embodiments.

As shown in FIG. 15, the function button system 100 can provide a new LLM function button 1506 (e.g., an "LLM function button") for display in a floating widget 1504. As previously mentioned, the function button system 100 can display the new LLM function button 1506 and/or the floating widget 1504 in a webpage 1502 of a web browser of a client device 1500 responsive to generating the new LLM function button 1506 via detecting one or more interactions within a button generation panel (e.g., as discussed above at least with regard to the discussion of FIG. 13). For example, the function button system 100 can determine that a web address of the webpage 1502 matches a web address the function button system 100 received as an input via the button generation panel.

Responsive to determining a selection of the new LLM function button 1506, the function button system 100 can generate a side panel 1510 within the web browser. Based on the selection of the new LLM function button 1506, the function button system 100 can provide a description 1512 of a functionality of the new LLM function button 1506 that the function button system 100 will execute. For example, the function button system 100 can generate the description 1512 to identify fields 1508 of the webpage 1502 that the function button system 100 will modify (e.g., "I Will Fill the Following Fields: Image, Modification Type, Customize, Description"). Further, based on providing the description 1512, the function button system 100 can request a confirmation of executing the function of the new LLM function button 1506. For example, the function button system 100 can request confirmation via interface elements (e.g., "Yes" and "No"). The function button system 100 can receive confirmation via an interaction with the "Yes" interface element. Additionally, in some embodiments, the function button system 100 can determine to request access to one or more content items. For example, the function button system 100 can determine, responsive to receiving a selection of the new LLM function button 1506, to access data from a content item in order to execute a functionality of the new LLM function button 1506. Accordingly, the function button system 100 can generate a request for permission to access the one or more content items within the side panel 1510.

As shown in FIG. 15, based on receiving the confirmation (e.g., through the interaction with the "Yes" interface element), the function button system 100 can perform an act 1516 of executing the function of the new LLM function button. For example, the function button system 100 can perform the act 1516 by modifying the fields 1508 of the webpage 1502. Specifically, the function button system 100 can generate a prompt that includes an instruction to modify the fields 1508 of the webpage 1502 and content of the webpage 1502 and provide the prompt to an LLM to use the LLM to modify the fields 1508 according to the prompt. In some embodiments, the function button system 100 can generate the instruction of the prompt to identify a content item for the function button system 100 to extract data from as well as a data extraction instruction that corresponds to the content item.

In some embodiments, the function button system 100 can modify the function of the new LLM function button 1506 responsive to detecting an interaction with the "No" interface element. For example, the function button system 100 can request input from the user account regarding the description 1512 responsive to detecting the interaction with the "No" interface element. Responsive to requesting input from the user account, the function button system 100 can receive one or more modifications to the description 1512, such as via a chat interface of the side panel 1510. To illustrate, the function button system 100 can receive a modification instruction and determine, based on the modification instruction, not to modify the "Description" field of the fields 1508. Based on receiving the modification instruction, the function button system 100 can generate an updated description that indicates that the function button system 100 will not modify the description field of the fields 1508. The function button system 100 can further request approval, through the side panel 1510, of the updated description. Based on receiving approval (e.g., such as a selection of the "Yes" user interface element), the function button system 100 can execute a modified function of the new LLM function button 1506 according to the updated description.

FIGS. 12-15, the corresponding text, and the examples provide a number of different systems and methods for generating an LLM function button according to a function option and an address option of a button generation panel. In addition to the foregoing, implementations can also be described in terms of flowcharts comprising acts or steps in a method for accomplishing a particular result. For example, FIG. 16 illustrates an example series of acts for generating an LLM function button according to interactions with a button generation panel in accordance with one or more embodiments.

Figure 16:
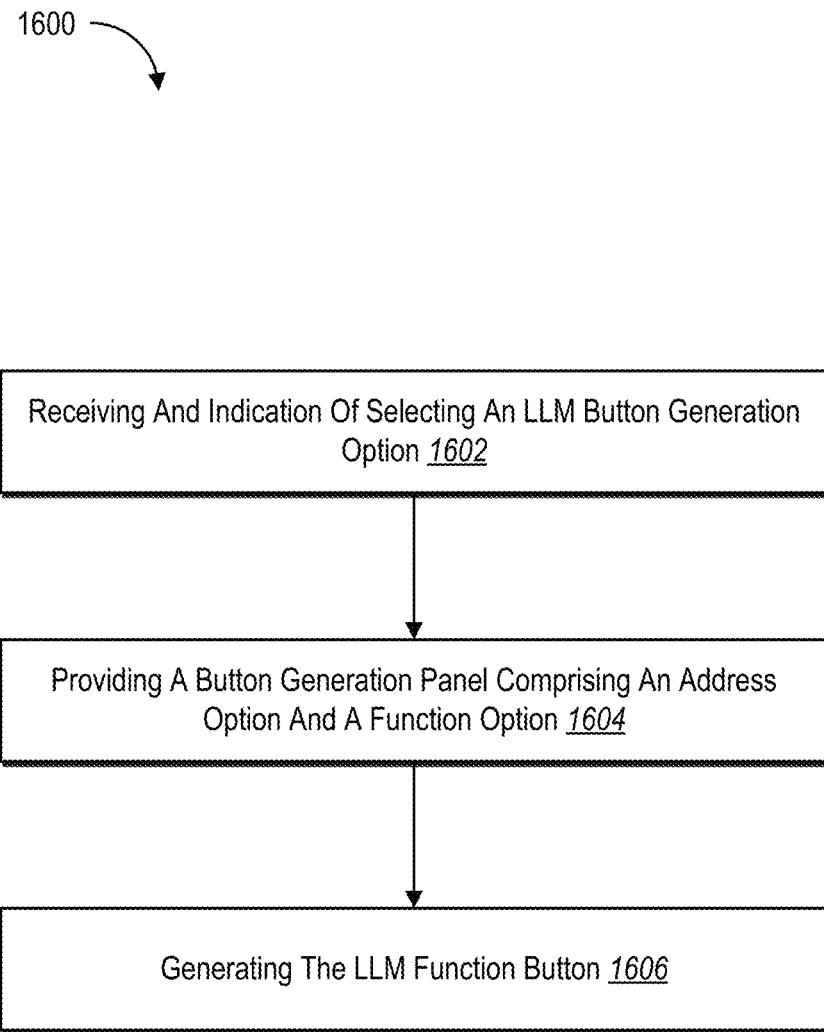
FIG. 16 illustrates an example flowchart of a series of acts for generating a custom function button in accordance with some embodiments.

While FIG. 16 illustrates acts according to certain implementations, alternative implementations may omit, add to, reorder and/or modify any of the acts shown in FIG. 16. The acts of FIG. 16 can be performed as part of a computer-implemented method. Alternatively, a non-transitory computer readable medium can comprise instructions, that when executed by one or more processors, cause a computing device to perform the acts of FIG. 16. In still further implementations, a system can perform the acts of FIG. 16.

As shown, the series of acts 1600 can include an act 1602 of receiving an indication of selecting an LLM button generation option. Specifically, the act 1602 can include receiving, from a client device displaying a webpage within a web browser, an indication of selecting a large language model (LLM) button generation option to generate an LLM function button.

As illustrated, the series of acts 1600 can include an act 1604 of providing a button generation panel comprising an address option and a function option. In particular, the act 1604 can include, in response to the indication of selecting the LLM button generation option, providing, for display within the web browser displayed on the client device, a button generation panel comprising: an address option for defining one or more web addresses where the LLM function button appears; and a function option for defining a function executed upon selection of the LLM function button.

As illustrated, the series of acts 1600 can include an act 1606 of generating the LLM function button. Specifically, the act 1606 can include generating the LLM function button based on an interaction with the address option defining the one or more web addresses and based on interaction with the function option defining the function executed upon selection of the LLM function button.

Additionally, in some embodiments, the series of acts 1600 can include defining the function executed upon selection of the LLM function button by receiving, from the client device displaying the webpage, an indication of selecting an action record option to record user account interaction with the webpage displayed within the web browser. Further, the series of acts 1600 can include in response to the indication of selecting the action record option, recording a set of user account interactions.

Moreover, in one or more embodiments, the series of acts 1600 can include modifying the set of user account interactions to generate an adaptive set of user account interactions adaptable to differences in content within one or more webpages related to the webpage displayed within the web browser.

In addition, in some embodiments, the series of acts 1600 can include providing a description of the adaptive set of user account interactions for review in the button generation panel of the web browser. Moreover, the series of acts 1600 can include generating a modified adaptive set of user account interactions by modifying the adaptive set of user account interactions responsive to feedback from the client device regarding the adaptive set of user account interactions. Additionally, the series of acts 1600 can include generating a prompt to provide to an LLM based on the modified adaptive set of user account interactions.

Further, in one or more embodiments, the series of acts 1600 can include providing, within the button generation panel, a function adaptation option to adapt the function of the LLM function button to one or more webpages related to the webpage. Moreover, the series of acts 1600 can include adapting the function to the one or more webpages related to the webpage responsive to receiving an indication of an interaction with the function adaptation option.

Additionally, in some embodiments, the series of acts 1600 can include displaying the LLM function button within a floating widget that overlays content of the webpage based on determining that a web address of the webpage matches the one or more web addresses where the LLM function button appears.

Moreover, in one or more embodiments, the series of acts 1600 can include generating, based on detecting an indication of an interaction with the LLM function button, a side panel within the web browser. Indeed, the series of acts 1600 can include providing, within the side panel, a description of the function executed upon selection of the LLM function button.

Furthermore, in some embodiments, the series of acts 1600 can include executing the function responsive to receiving a confirmation from the client device to execute the function of the LLM function button.

In addition, in one or more embodiments, the series of acts 1600 can include receiving from a client device displaying a webpage within a web browser, an indication of selecting a large language model (LLM) button generation option to generate an LLM function button. Indeed, the series of acts 1600 can include, in response to the indication of selecting the LLM button generation option, providing, for display within the web browser displayed on the client device, a button generation panel comprising: an address option for defining one or more web addresses where the LLM function button appears; and a function option for defining a function executed upon selection of the LLM function button; and a function adaptation option to adapt the function of the LLM function button to one or more webpages related to the webpage. In addition, the series of acts 1600 can include generating the LLM function button based on an interaction with the address option defining the one or more web addresses and based on interaction with the function option defining the function executed upon selection of the LLM function button.

Moreover, in some embodiments, the series of acts 1600 can include receiving, via the function option, a natural language instruction defining the function executed upon selection of the LLM function button. In addition, the series of acts 1600 can include extracting a workflow from the natural language instruction using a large language model, the workflow comprising a series of executable processes that, upon execution, accomplish the function defined via the function option. Indeed, the series of acts 1600 can include defining the function according to the workflow extracted from the natural language instruction.

Additionally, in one or more embodiments, the series of acts 1600 can include providing, within the button generation panel, an interface element selectable to enable an LLM to access one or more content items stored within a content management system during execution of the function executed upon selection of the LLM function button.

Furthermore, in some embodiments, the series of acts 1600 can include receiving, from the client device displaying the webpage, an indication of selecting an action record option to record user account interaction with the webpage displayed within the web browser. Additionally, the series of acts 1600 can include, in response to the indication of selecting the action record option, recording a set of user account interactions.

Moreover the series of acts 1600 can include modifying the set of user account interactions to generate an adaptive set of user account interactions adaptable to differences in content within one or more webpages related to the webpage displayed within the web browser.

Further, the series of acts 1600 can include providing a description of the adaptive set of user account interactions for review in the button generation panel of the web browser. Additionally, the series of acts 1600 can include generating a modified adaptive set of user account interactions by modifying the adaptive set of user account interactions responsive to feedback from the client device regarding the adaptive set of user account interactions. Moreover, the series of acts 1600 can include generating a prompt to provide to an LLM based on the modified adaptive set of user account interactions.

In some embodiments, the series of acts 1600 can include receiving, from a client device displaying a webpage within a web browser, an indication of selecting a large language model (LLM) button generation option to generate an LLM function button. Further, the series of acts 1600 can include, in response to the indication of selecting the LLM button generation option, providing, for display within the web browser displayed on the client device, a button generation panel comprising an address option for defining one or more web addresses where the LLM function button appears and a function option for defining a function executed upon selection of the LLM function button. Additionally, the series of acts 1600 can include generating the LLM function button based on an interaction with the address option defining the one or more web addresses and based on interaction with the function option defining the function executed upon selection of the LLM function button. Further, the series of acts 1600 can include displaying the LLM function button within a floating widget that overlays content of the webpage based on determining that a web address of the webpage matches the one or more web addresses where the LLM function button appears.

Moreover, in one or more embodiments, the series of acts 1600 can include generating, based on detecting an indication of an interaction with the LLM function button, a side panel within the web browser. In addition, the series of acts 1600 can include providing within the side panel, a description of the function executed upon selection of the LLM function button.

Furthermore, in some embodiments, the series of acts 1600 can include generating based on detecting an indication of an interaction with the LLM function button, a side panel within the web browser. In addition, the series of acts 1600 can include providing, within the side panel, a description of the function executed upon selection of the LLM function button. Additionally, the series of acts 1600 can include executing the function responsive to receiving a confirmation from the client device to execute the function of the LLM function button.

Moreover, in one or more embodiments, the series of acts 1600 can include receiving, from the client device displaying the webpage, an indication of selecting an action record option to record user account interaction with the webpage displayed within the web browser. In addition, the series of acts 1600 can include, in response to the indication of selecting the action record option, recording a set of user account interactions.

Further, in some embodiments, the series of acts 1600 can include modifying the set of user account interactions to generate an adaptive set of user account interactions adaptable to differences in content within one or more webpages related to the webpage displayed within the web browser. Additionally, the series of acts 1600 can include providing a description of the adaptive set of user account interactions for review in the button generation panel of the web browser. Moreover, the series of acts 1600 can include generating a modified adaptive set of user account interactions by modifying the adaptive set of user account interactions responsive to feedback from the client device regarding the adaptive set of user account interactions. Furthermore, the series of acts 1600 can include generating a prompt to provide to an LLM based on the modified adaptive set of user account interactions.

Figure 17:
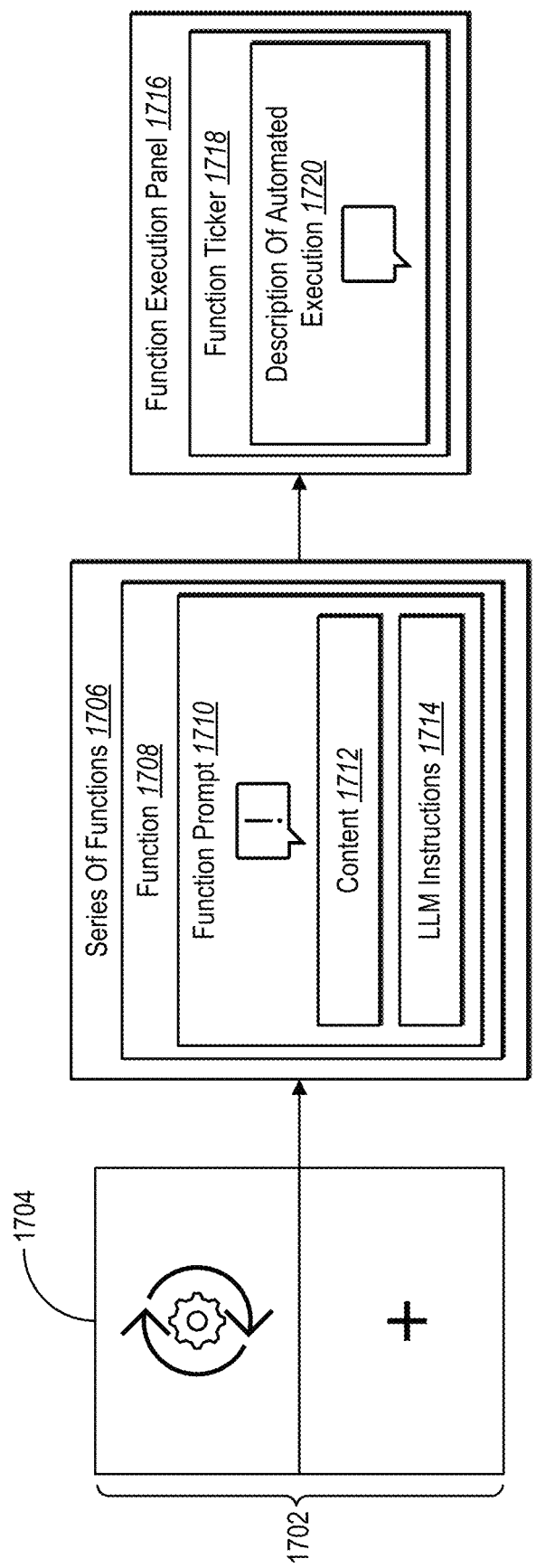
FIG. 17 illustrates an overview of the function button system executing a series of functions responsive to a selection of an autonomous workflow function button in accordance with some embodiments.

Autonomous Workflow Function Button:

As previously mentioned, in some embodiments the function button system 100 can generate an LLM function button (sometimes hereinafter referred to as an autonomous workflow function button) to perform an automated function for a user account. For example, the function button system 100 can generate the autonomous workflow function button to perform a function of a series of functions based on content of a webpage. FIG. 17 illustrates an overview of performing a function and providing a description of the function within a function execution panel responsive to determining a selection of the autonomous workflow function button in accordance with one or more embodiments. Additional detail regarding the acts and processes introduced in relation to FIG. 17 is provided thereafter with reference to subsequent figures.

As shown in FIG. 17, the function button system 100 can generate a floating widget 1702 that includes one or more LLM function buttons for display within a web browser (e.g., such as within a webpage of a web browser). In some embodiments, the one or more LLM function buttons can include an autonomous workflow function button 1704. In some embodiments, the autonomous workflow function button 1704 can be the autonomous workflow function button 804 of FIG. 8. In some embodiments, the function button system 100 can generate the autonomous workflow function button 1704 from interactions with the LLM button generation option 1204 and the button generation panel 1206 as described above with regard to FIG. 12 (e.g., the function button system 100 can generate the autonomous workflow function button 1704 according to context and/or input specific to the user account).

As illustrated in FIG. 17, in response to an indication of selecting the autonomous workflow function button 1704, the function button system 100 can determine a function 1708 of a series of functions 1706 to execute. In some embodiments, the function button system 100 can generate the series of functions 1706 to correspond to a series of related webpages. For example, the function button system 100 can generate the series of functions 1706 (e.g., as a singular unit) to correspond to a group of webpages that have web addresses with a common domain. Further, the function button system 100 can generate each of the series of functions 1706 to correspond to a particular path or query string of the web address. In some embodiments, the function button system 100 can generate the series of functions to correspond to different actions the function button system 100 can perform within the webpage.

Further, in some embodiments, the function button system 100 can determine the function 1708 from the series of functions 1706 according to content 1712 of the webpage. For example, the function button system 100 can determine that the webpage includes a first type of content (e.g., such as text), a second type of content (e.g., such as images), and a third type of content (e.g., such as videos). The function button system 100 can determine that a first function of the series of functions 1706 corresponds to the first type of content, a second function of the series of functions 1706 corresponds to the second type of content, and that a third function of the series of functions corresponds to the third type of content. The function button system 100 can determine that the content 1712 of the webpage includes one or more of the first type of content, the second type of content, or the third type of content, and determine the function 1708 accordingly. In some embodiments, the function button system 100 can determine the function 1708 according to elements of the web address and the content 1712.

Moreover, the function button system 100 can generate or otherwise structure the series of functions 1706 to include additional functionalities. For example, the series of functions 1706 can include: application programming interface (API) calls, data transmission, content fetching, data querying, web navigation, file synchronization, task scheduling, data caching, or other functionalities. In addition, the function button system 100 can perform one or more functions of the series of functions 1706 outside of a webpage or a web browser, such as by extracting data from a content item. More information regarding functions the function button system 100 executes as a part of the series of functions 1706 (e.g., responsive to a selection of the autonomous workflow function button 1704) is provided below with regard to the discussion of FIG. 23.

As shown in FIG. 17, based on determining the function 1708 from the series of functions 1706, the function button system 100 can generate a function prompt 1710 to provide to an LLM. Specifically, the function button system 100 can generate the function prompt 1710 to include content 1712 of the webpage. In some embodiments, the function button system 100 can determine the content 1712 by extracting a subset of the webpage that the function button system 100 displays in a client device when the autonomous workflow function button 1704 is selected. In some embodiments, the function button system 100 can extract webpage content from the webpage and parse the webpage content to determine the content 1712. Further, the function button system 100 can generate the function prompt 1710 to include LLM instructions 1714 to provide to the LLM. For example, the function button system 100 can generate the LLM instructions 1714 to indicate the function 1708 (e.g., an action or a series of actions for the LLM to perform) according to one or more aspects of the content 1712. The function button system 100 can provide the function prompt 1710 including the content 1712 and the LLM instructions 1714 to the LLM to use the LLM to execute or otherwise complete the function 1708.

Based on the selection of the autonomous workflow function button 1704, the function button system 100 can generate a function execution panel 1716 that includes a function ticker 1718. As used herein, the term "function execution panel" can refer to a side panel that the function button system 100 generates within the web browser responsive to the selection of the automated function button. The function execution panel can provide information regarding a function executed based on a selection of the autonomous workflow function button 1704. Further, as used herein, the term "function ticker" can refer to an autonomous component of the function execution panel that interprets actions performed by the LLM and generates natural language descriptions of the actions to display in the function execution panel 1716.

As shown in FIG. 17, the function button system 100 can use the function ticker 1718 to provide a description of automated execution 1720 of the function 1708 within the function execution panel 1716. Specifically, the function button system 100 can generate the description of the automated execution 1720 in real-time or near real-time (e.g., contemporaneously to when the function button system 100 executes the function 1708). For example, the function button system 100 can instantiate the automated execution of the function 1708 that includes multiple steps. After completing each step, the function button system 100 can use the function ticker 1718 to generate a natural language description of the step and the function button system 100 can display the natural language description in the function execution panel 1716. In some embodiments, the function button system 100 can use the function ticker 1718 to generate a natural language description of a combination of steps. In some embodiments, the function button system 100 can determine to exclude steps from the description of the automated execution 1720.

As previously mentioned, the function button system 100 provides a variety of technical advantages relative to conventional systems, such as improving efficiency compared to conventional computing systems. Specifically, through the autonomous workflow function button (e.g., an LLM function button for executing a series of functions related to content within a webpage), the function button system 100 can automatically execute a function or a series of functions within a webpage. By automatically executing the function or the series of functions, the function button system 100 reduces inputs and navigational inputs within a webpage. Further, in some embodiments, the function button system 100 can use the autonomous workflow function button to access content items from other locations (such as content items hosted within a content management system or other locations on a client device). Accordingly, the function button system 100 decreases navigational inputs required for a user account to traverse multiple webpages, web browsers, and/or applications typically required for user accounts to complete tasks within webpages. Furthermore, the function button system 100 reduces the computational resources (e.g., such as memory, bandwidth, and processing power) required to process, cache, render, or otherwise facilitate the user account interactions.

Figure 18A:
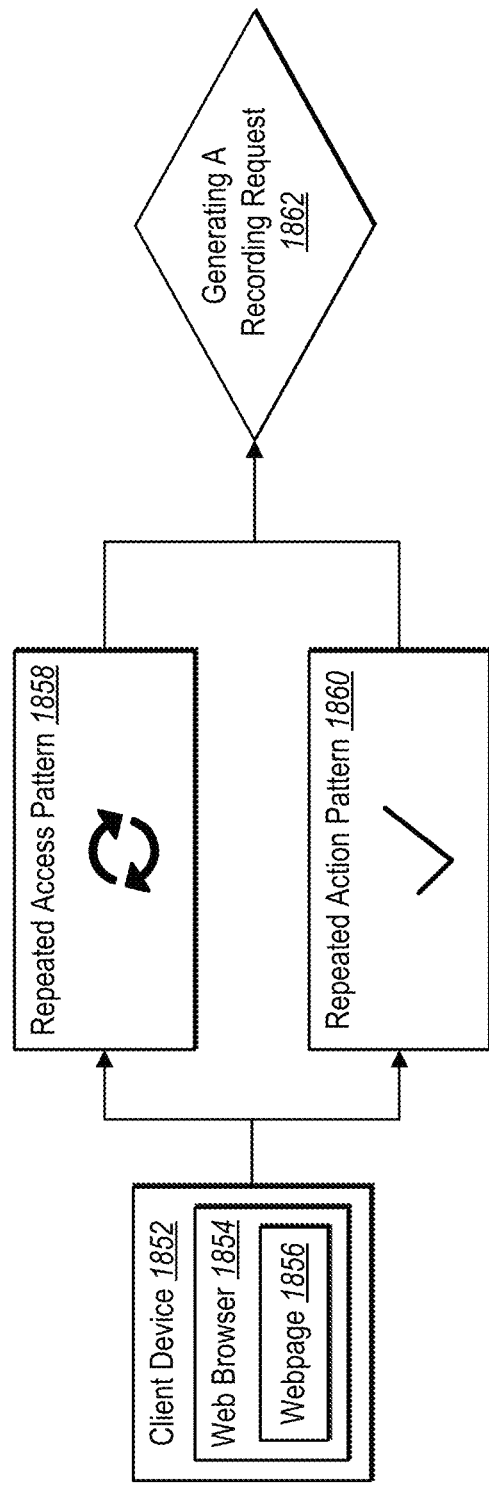
FIG. 18A illustrates the function button system generating a recording request to generate an autonomous function workflow button based on determining a repeated access pattern and a repeated action pattern in accordance with some embodiments.

As previously mentioned, the function button system 100 can generate a recording request to record a series of user account interactions. For example, the function button system 100 can generate the recording request responsive to determining a repeated access pattern and a repeated action pattern associated with a webpage. FIG. 18A illustrates the function button system 100 generating a recording request responsive to determining a repeated access pattern and a repeated action pattern in accordance with one or more embodiments.

As illustrated in FIG. 18A, in some embodiments, the function button system 100 can determine a repeated access pattern 1858 and a repeated action pattern 1860 corresponding to a webpage 1856 (e.g., a webpage 1856 corresponding to a web browser 1854 of a client device 1852). As used herein, the term "repeated access pattern" can refer to a frequency or periodicity of access of a webpage by a user account. For example, the function button system 100 can determine a repeated access pattern by determining that a user account visits a webpage at a consistent frequency, such as within a first five business days of each month. Further, as used herein, the term "repeated action pattern" can refer to a series of actions performed by the user account within the periodically accessed webpage that relate to content of the periodically accessed webpage. The series of actions can have slight variations. For example, in some embodiments the series of actions can relate to different types of content within a webpage. In some embodiments, the series of actions can be performed in a different order or with a different cadence/timing. The repeated action pattern can include navigational inputs (e.g., taps, clicks, or swipes), data entry into a field of the webpage (e.g., modifying a field of the webpage by entering text and/or uploading content items), or a combination thereof, among others. In some embodiments, a repeated action pattern can include actions performed by the user account at a virtual location other than the webpage to ultimately enable the user account to perform an action within the webpage, such as downloading a content item from a location other than the webpage to upload the content item within the webpage.

A holistic example of the function button system 100 determining the repeated access pattern 1858 and the repeated action pattern 1860 will now be provided. To illustrate, the function button system 100 can determine the repeated access pattern 1858 corresponding to the webpage 1856 by determining that a user account visits the webpage 1856, such as a webpage for reimbursements, on a monthly basis, such as within the first five business days of a calendar month. Further, the function button system 100 can determine the repeated action pattern 1860 related to the webpage 1856 by determining that the user account repeatedly interacts with or modifies fields of the webpage 1856 in the same way. Additionally, the function button system 100 can determine a relationship between the repeated interactions and the repeated access pattern 1858.

To illustrate, not only can the function button system 100 determine that the user account visits the webpage within the first five business days of a calendar month, but the function button system 100 can determine that the repeated actions within the webpage relate to a calendar month that immediately preceded the calendar month of the repeated access pattern 1858. To illustrate, the function button system 100 can determine that the user account accesses the webpage 1856 for reimbursements within the first five business days of each month to perform actions relating to submitting reimbursement information for the preceding month. Thus, in some embodiments the function button system 100 can determine the repeated action pattern 1860 by determining a temporal relationship between the repeated access pattern 1858 for the webpage and repeated interactions taken or performed by the user account within the webpage 1856. Accordingly, in some embodiments, the function button system 100 can determine the repeated action pattern 1860 based on determining the repeated access pattern 1858.

As shown in FIG. 18A, based on determining the repeated access pattern 1858 and the repeated action pattern 1860, the function button system 100 can perform an act 1862 of generating a recording request. Indeed, the function button system 100 can perform the act 1862 of generating the recording request to indicate to the user account that the function button system 100 can generate an autonomous workflow function button to perform one or more functions for the user account that relate to the repeated action pattern 1860. The function button system 100 can display or otherwise indicate the recording request to the user account in a variety of ways. For example, in some embodiments, the function button system 100 can provide the recording request within a side panel of the web browser 1854 (e.g., a side panel that the function button system 100 generates in response to detecting an interaction with an LLM function button, such as discussed above at least with regard to FIG. 2). In some embodiments, the function button system 100 can provide the recording request by generating a floating widget to include an LLM button generation option (e.g., the LLM button generation option 1204 of FIG. 12) and displaying the floating widget within the webpage. In some embodiments, the function button system 100 can display the recording request within a button generation panel (e.g., the button generation panel 1206 of FIG. 12). As will be discussed below with regard to FIG. 18B, in some embodiments, the function button system 100 can display the recording request in a function execution panel in accordance with one or more embodiments.

Figure 18B:
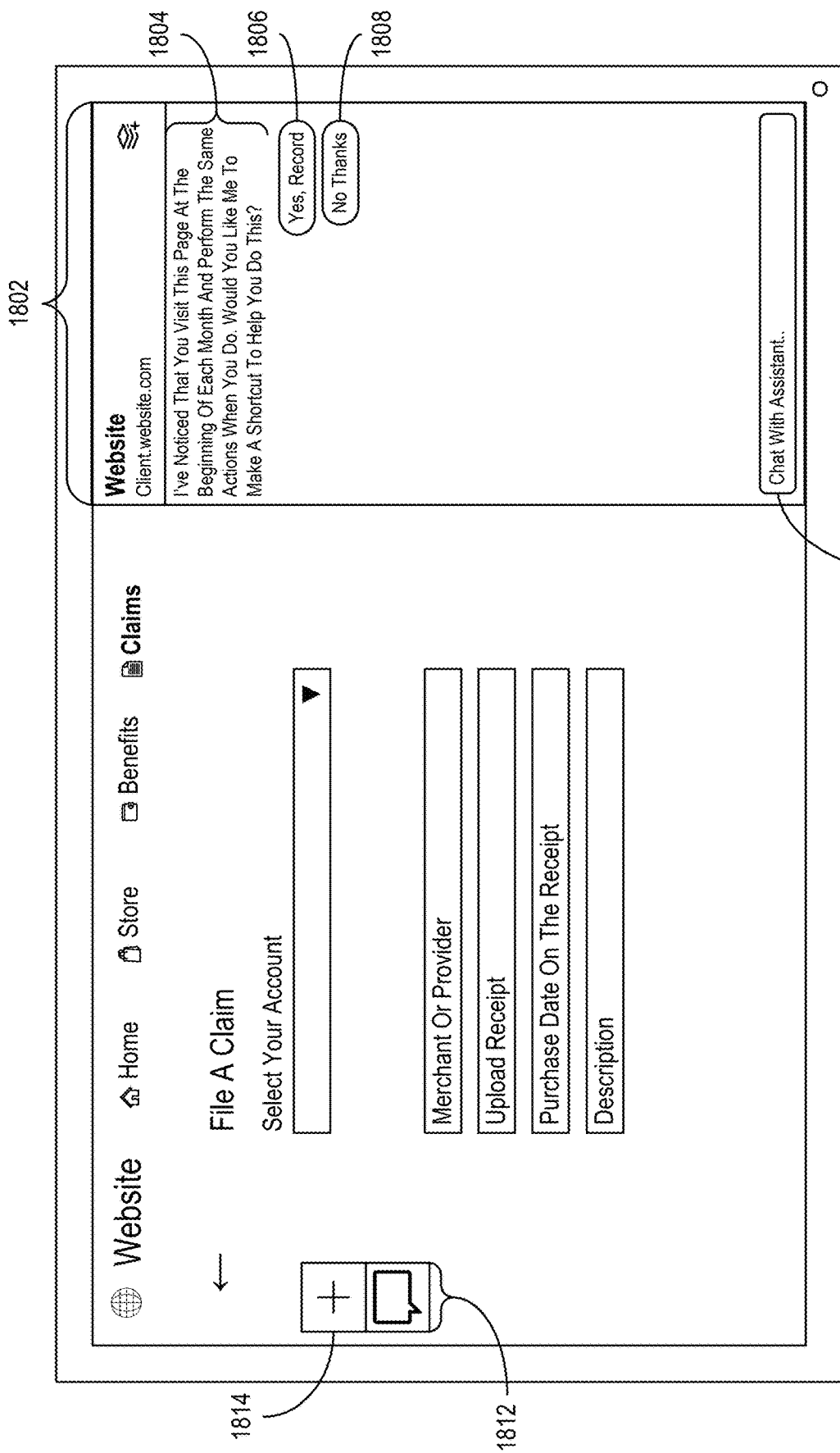
FIG. 18B illustrates the function button system providing the recording request for display in a function execution panel responsive to determining a selection of a LLM button generation option in accordance with some embodiments.

As shown in FIG. 18B (and as discussed above at least with regard to FIG. 12) the function button system 100 can provide a LLM button generation option 1814 within a floating widget 1812 of a webpage of a web browser. Responsive to detecting an indication of a selection with the LLM button generation option 1814, the function button system 100 can generate a function execution panel 1802 within the web browser. In some embodiments, the function execution panel 1802 can be an embodiment of the button generation panel 1206 of FIG. 12. In some embodiments, the function button system 100 can determine to generate the function execution panel 1802 responsive to determining a repeated access pattern and a repeated action pattern.

As illustrated in FIG. 18B, the function button system 100 can generate and display a recording request 1804 (e.g., "I've Noticed That You Visit This Page At The Beginning Of Each Month And Perform The Same Actions When You Do. Would You Like Me To Create A Shortcut To Help You Do This?") in the function execution panel 1802. Specifically, the function button system 100 can generate the recording request 1804 to indicate the repeated access pattern (e.g., "at the beginning of each month,"), the repeated action pattern (e.g., "perform the same actions"). Further the function button system 100 can generate the recording request 1804 to indicate an autonomously executable function based on the repeated access pattern and the repeated action pattern (e.g., "Would You Like Me To Make A Shortcut To Help You Do This?"). In some embodiments, the function button system 100 can generate the recording request 1804 to indicate one or more functions that the function button system 100 can generate an autonomous workflow function button to perform for the user account (e.g., such as "I can generate a shortcut to fill out your reimbursements for you").

Based on providing the recording request 1804 in the function execution panel 1802, the function button system 100 can generate a first interface element 1806 (e.g., "Yes, Record") selectable for the function button system 100 to receive permission from the user account for the function button system 100 to record a series of user account interactions relating to the webpage. Additionally, the function button system 100 can generate a second interface element 1808 (e.g., "No, Thanks") selectable for the function button system 100 to not receive permission from the user account to record the series of user account interactions. Additionally, the function button system 100 can generate the function execution panel 1802 to include a chat interface 1810. The function button system 100 can use the chat interface 1810 to receive queries from and provide answers to the user account regarding the function button system 100 generating the automated function button based on the series of user account interactions.

Figure 19:
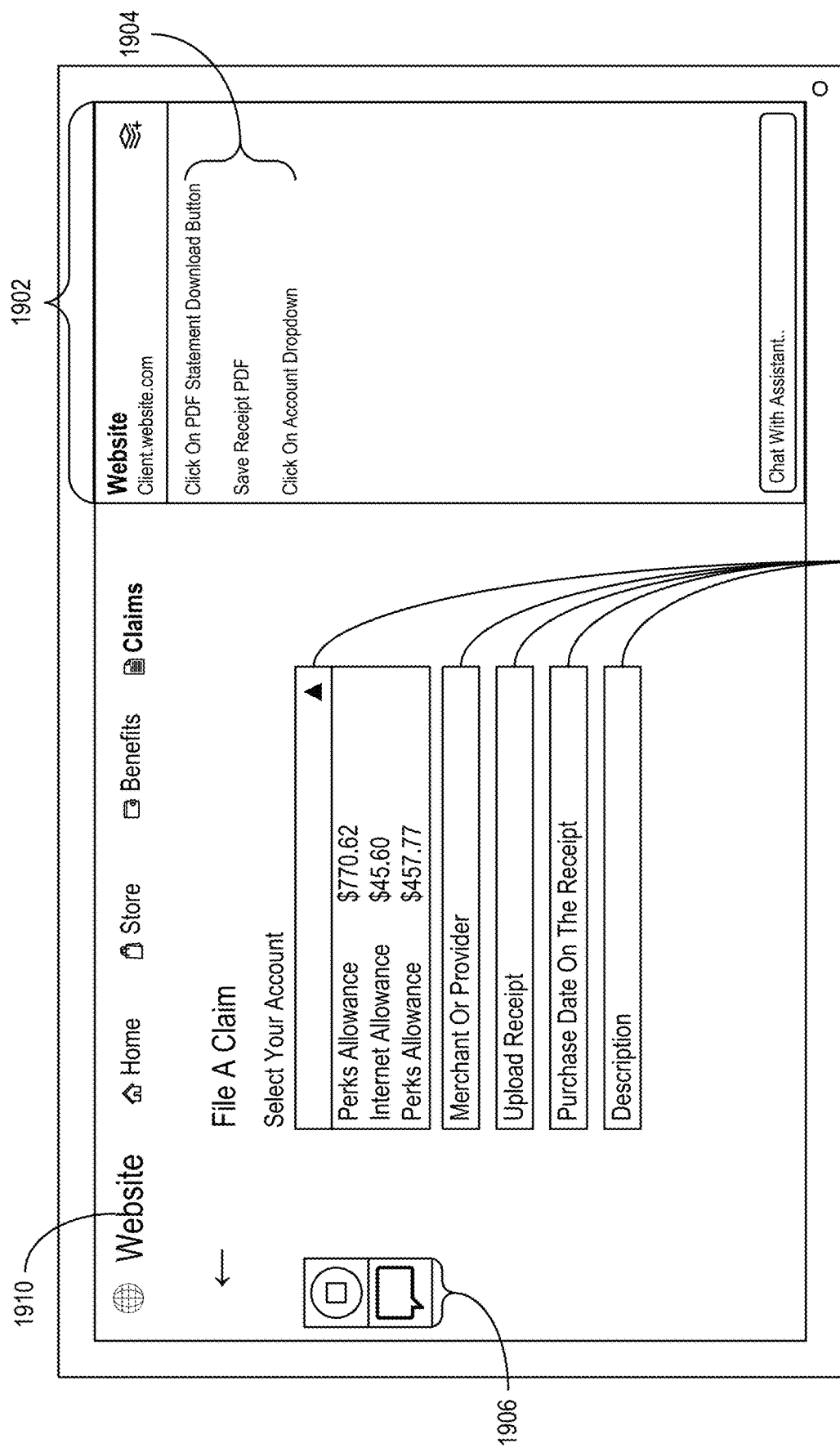
FIG. 19 illustrates the function button system recording a set of user account interactions corresponding to a webpage in accordance with some embodiments.

As previously mentioned, the function button system 100 can record a series of user account interactions and use the series of user account interactions. For example, responsive to receiving an indication of consent (e.g., such as an interaction with the first interface element 1806 as discussed above with regard to FIG. 18B), the function button system 100 can record the series of user account interactions relating to the webpage. FIG. 19 illustrates the function button system 100 recording a series of user account interactions relating to a webpage and providing a description of a workflow based on the series of user account interactions in accordance with one or more embodiments.

As illustrated in FIG. 19, the function button system 100 can update a floating widget 1906 to indicate that the function button system 100 is recording a series of user account interactions relating to a webpage 1910 (e.g., by displaying a record icon in the floating widget 1906). For example, the function button system 100 can record the series of user account interactions by generating a screen recording of a client device displaying the webpage 1910. In some embodiments, the function button system 100 can record the series of user account interactions by recording one or more modifications by the user account to one or more fields 1908 of the webpage 1910. To illustrate, the set of user account interactions can include a navigational input to a field of the one or more fields 1908 (e.g., such as a drag of a computer mouse, a click or a tap on the field). Further, the set of user account interactions can include data entry into the field of the one or more fields 1908 (e.g., such as entering natural language data into the field, or uploading a content item into the field, among others). In some embodiments, a user account interaction can include accessing a content item from a location other than the webpage. For example, the function button system 100 can record a user account interaction that involves navigating to (and executing a process within) a separate application or location to access a content item hosted at the separate content item or location.

As illustrated, as the function button system 100 records the series of user account interactions, the function button system 100 can use a function ticker to generate a description 1904 of the series of user account interactions within a function execution panel 1902. The function button system 100 can use the function ticker to generate multiple parts of the description 1904 that correspond to determining multiple user account interactions. For example, responsive to determining a first user account interaction outside of the webpage 1910, the function button system 100 can generate a first part of the description 1904 (e.g., "Click On PDF Statement Download Button"). Further, based on determining a second user account interaction, the function button system 100 can generate a second part of the description 1904 (e.g., Save Receipt PDF"). Moreover, based on determining a third user account interaction, the function button system 100 can generate a third part of the description 1904 (e.g., "Click On Account Dropdown").

The function button system 100 can continue to record user account interactions until the function button system 100 receives an indication from the user account to stop recording. In some embodiments, the function button system 100 can receive the indication to stop recording by determining an interaction with the floating widget 1906 (e.g., an interaction with the record icon of the floating widget 1906). In some embodiments, the function button system 100 can receive the indication to stop recording by receiving an instruction to stop recording via a chat interface of the function execution panel 1902. In some embodiments, the function button system 100 can generate the function execution panel 1902 to include an interface element selectable to cause the function button system 100 to stop recording the set of user account interactions. Further, in some embodiments, the function button system 100 can receive, via the chat interface of the function execution panel 1902, a modification to the description 1904. For example, the function button system 100 can receive an instruction to add an extra step to the description 1904, an instruction to remove a step from the description 1904, and/or an instruction to modify a step of the description 1904.

In some embodiments, the description 1904 can be an adaptive set of user account interactions (e.g., the adaptive set of user account interactions 1408 of FIG. 14). To illustrate, the function button system 100 can generate the description 1904 to be adaptable to changes in the webpage 1910, such as changes in content of the webpage 1910 and/or changes to a layout of the webpage 1910. Additionally, the function button system 100 can generate the description 1904 to include a description of a structure of the webpage 1910 and a description of user account interactions within the webpage 1910 based on elements of the webpage.

Figure 20A:
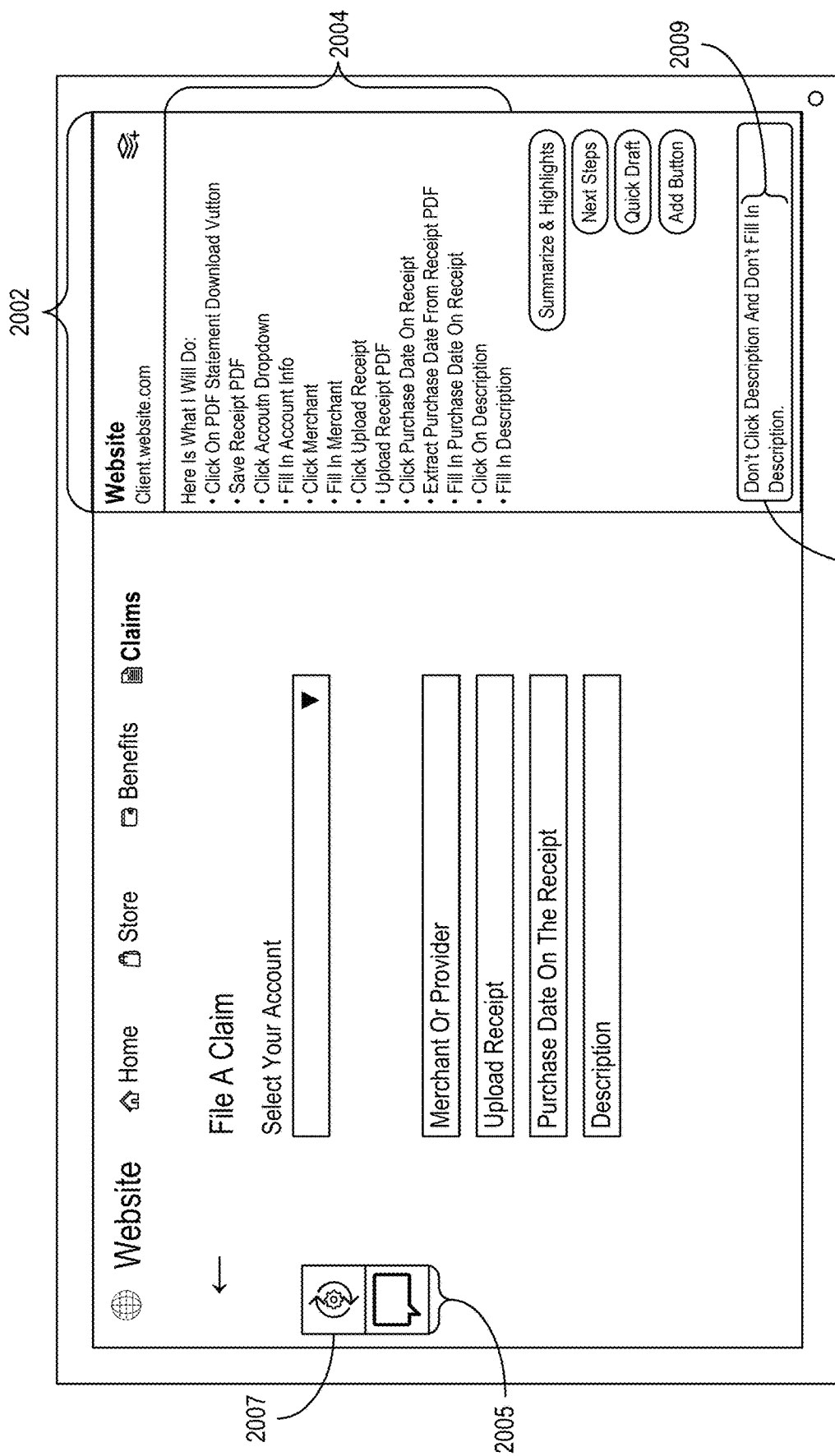
FIG. 20A illustrates the function button system providing a preliminary description of an autonomous workflow responsive to determining a selection of an autonomous workflow function button in accordance with some embodiments.
Figure 20B:
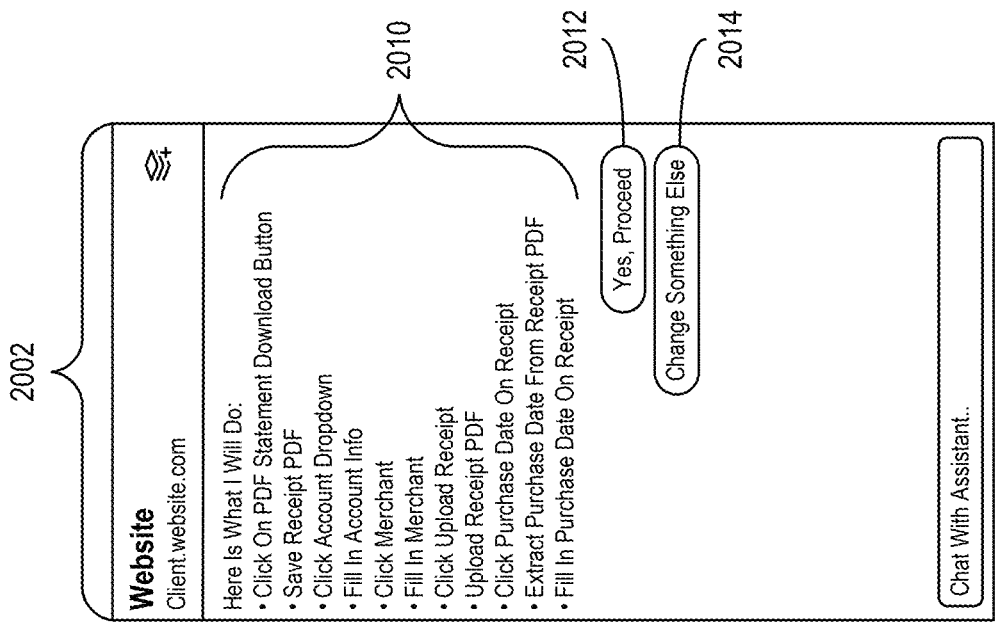
FIG. 20B illustrates the function button system receiving a modification to the preliminary description and updating the preliminary description in accordance with some embodiments.

Based on recording the user account interactions and generating the description 1904, the function button system 100 can process the description 1904 and/or a recording of the set of user account interactions to generate a workflow based on the set of user account interactions. Specifically, the function button system 100 can generate the workflow to include instructions for an LLM to perform a series of functions based on the set of user account interactions. For example, the workflow can include a first instruction to cause an LLM to perform a first function of the series of functions, a second instruction to cause the LLM to perform a second function of the series of functions, a third instruction to cause the LLM to perform a third function of the series of functions, and so on. Further, the function button system 100 can generate an autonomous workflow function button based on the description and/or the set of user account interactions. FIGS. 20A and 20B illustrate the function button system 100 receiving a selection of an autonomous workflow function button, generating a preliminary description of an automated execution of a function the function button system 100 will perform based on the selection of the autonomous workflow function button, and executing the function according to a modification to the preliminary description in accordance with one or more embodiments.

As illustrated in FIG. 20A, the function button system 100 can display an autonomous workflow function button 2007 within a floating widget 2005 on a webpage. In some embodiments, the function button system 100 can include the autonomous workflow function button 2007 in the floating widget 2005 based on analyzing content of the webpage and/or a web address of the webpage. For example, in some embodiments, the function button system 100 can analyze the web address to determine that the function button system 100 had previously received a selection of a LLM button generation option and recorded a set of user account interactions corresponding to the web address. In some embodiments, the function button system 100 can analyze the content of the webpage to determine that the content matches or otherwise corresponds to a previously determined set of user account interactions.

As illustrated in FIG. 20A, based on receiving the selection of the autonomous workflow function button 2007, the function button system 100 can generate a function execution panel 2002 within a web browser. In some embodiments, the function button system 100 can modify a display of the webpage in the web browser by generating the function execution panel 2002 adjacent to the webpage. Based on generating the function execution panel 2002 and on receiving the selection of the autonomous workflow function button 2007, the function button system 100 can generate a preliminary description 2004 of a series of functions associated with the autonomous workflow function button 2007. Indeed, the function button system 100 can generate the preliminary description 2004 to include one or more functions the function button system 100 will perform (e.g., an automated function that the function button system 100 will execute). In some embodiments, the function button system 100 can use a function ticker to generate the preliminary description 2004.

As shown in FIG. 20A, the function button system 100 can generate the preliminary description 2004 to include a first description of a first function of the series of functions the function button system 100 will perform (e.g., "Click On PDF Statement Download Button"). Further, the function button system 100 can generate the description to include a second description of a second function of the series of functions the function button system 100 will perform (e.g., "Save PDF Receipt"). Moreover, the function button system 100 can generate the description to include a third description of a third function of the series of functions the function button system 100 will perform (e.g., "Click Account Dropdown"). Additionally, the function button system 100 can generate the description to include a fourth description of a fourth function of the series of functions the function button system 100 will perform (e.g., "Fill In Account Info"). Furthermore, the function button system 100 can generate the description to include a fifth description of a fifth function of the series of functions the function button system 100 will perform (e.g., "Click Merchant"). In addition, the function button system 100 can generate the description to include a sixth description of a sixth function of the series of functions the function button system 100 will perform (e.g., "Fill In Merchant"). Moreover, the function button system 100 can generate the description to include a seventh description of a seventh function of the series of functions the function button system 100 will perform (e.g., "Click Upload Receipt"). Additionally, the function button system 100 can generate the description to include an eighth description of an eighth function of the series of functions the function button system 100 will perform (e.g., "Upload Receipt PDF"). Furthermore, the function button system 100 can generate the description to include a ninth description of a ninth function of the series of functions the function button system 100 will perform (e.g., Click Purchase Date On Receipt"). In addition, the function button system 100 can generate the description to include a tenth description of a tenth function of the series of functions the function button system 100 will perform (e.g., "Extract Purchase Date From Receipt PDF"). Additionally, the function button system 100 can generate the description to include an eleventh description of an eleventh function of the series of functions the function button system 100 will perform (e.g., "Fill In Purchase Date On Receipt"). Moreover, the function button system 100 can generate the description to include a twelfth description of a twelfth function of the series of functions the function button system 100 will perform (e.g., "Click On Description"). In addition, the function button system 100 can generate the description to include a thirteenth description of a thirteenth function of the series of functions the function button system 100 will perform (e.g., "Fill In Description").

Based on providing the preliminary description 2004 in the function execution panel 2002, the function button system 100 can receive a modification 2009 (e.g., feedback, such as "Don't Click Description And Don't Fill In Description) regarding the preliminary description 2004. Indeed, the function button system 100 can receive the modification 2009 via a chat interface 2006 of the function execution panel 2002. Based on receiving the modification 2009, the function button system 100 can generate a modified description of the series of functions that the function button system 100 will automatedly execute. FIG. 20B illustrates the function button system 100 providing a modified preliminary description for display within the function execution panel 2002.

As illustrated in FIG. 20B, the function button system 100 can provide a modified preliminary description 2010 for display in the function execution panel 2002. In some embodiments, the function button system 100 can use a function ticker to generate the modified preliminary description 2010. Indeed, the function button system 100 can generate the modified preliminary description 2010 based on the modification 2009 of FIG. 20A. Additionally, based on receiving the modification 2009, the function button system 100 can generate the modified preliminary description 2010 by processing the preliminary description 2004 according to the modification 2009. Indeed, in this example, the function button system 100 can determine, based on the modification 2009, to remove the twelfth and thirteenth descriptions of the twelfth and thirteenth functions of the series of functions.

Further, the function button system 100 can generate a first interface element 2012 and a second interface element 2014 for display in the function execution panel 2002. Indeed, the function button system 100 can generate the first interface element 2012 to be selectable to execute the automated function (e.g., provide confirmation to execute the series of functions) according to the modified preliminary description 2010. For example, based on determining an interaction with the first interface element 2012, the function button system 100 can propagate changes of the modification 2009 to the series of functions, such as by providing a modified function prompt that contains the steps listed in the modified preliminary description 2010 to an LLM to cause the LLM to execute a modified series of functions according to the modified preliminary description 2010. Further, responsive to providing the modified preliminary description 2010 for display in the function execution panel 2002, the function button system 100 can generate the second interface element 2014 for display in the function execution panel 2002. Specifically, the function button system 100 can generate the second interface element 2014 to be selectable to receive further modifications to the preliminary description 2004 and/or the modified preliminary description 2010.

Figure 21:
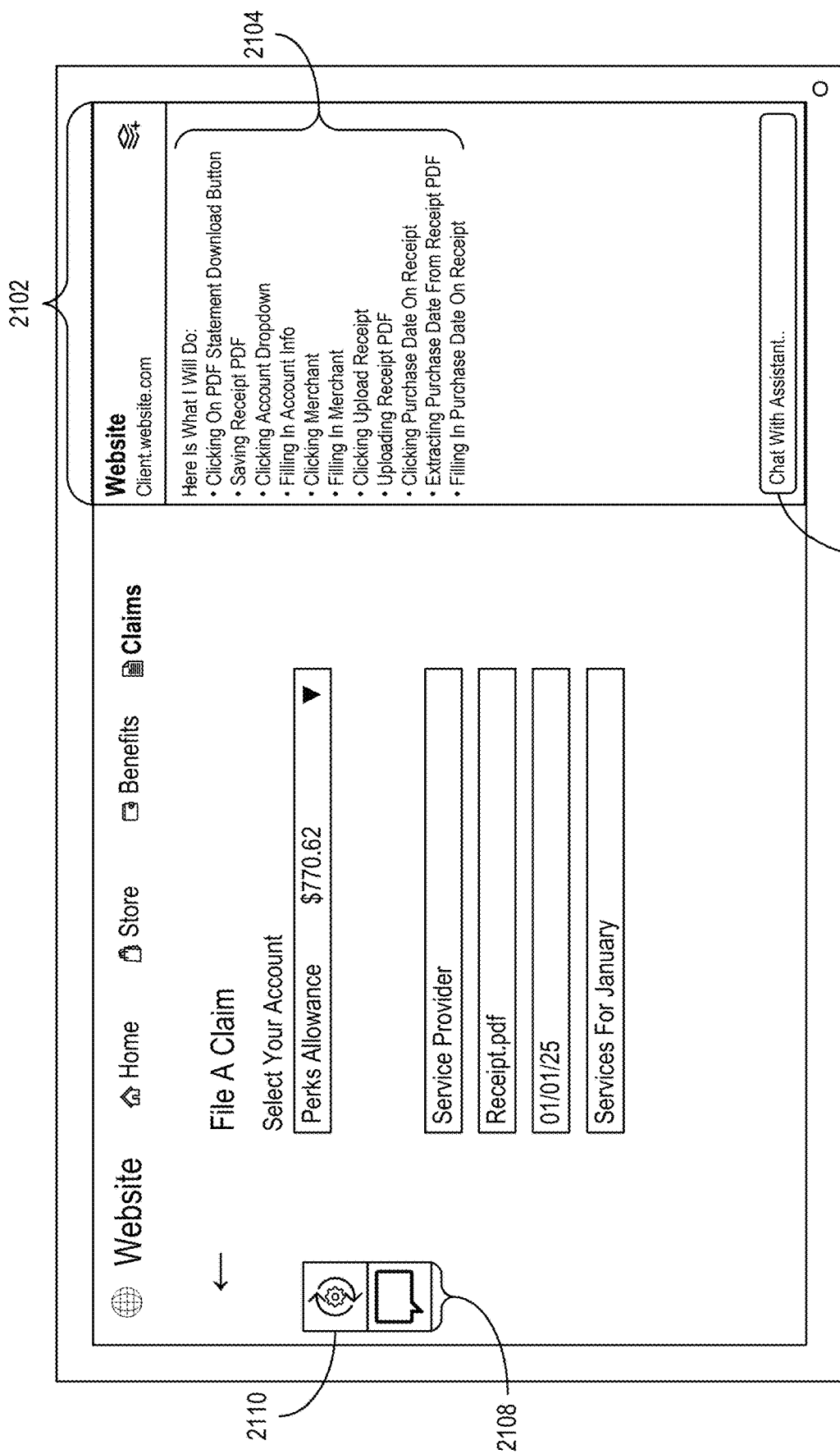
FIG. 21 illustrates the function button system executing a series of functions and providing a description of an automated workflow for display in a function execution panel in accordance with some embodiments.

As previously mentioned, in some embodiments, the function button system 100 can execute a series of functions responsive to detecting an interaction with an automated function button. For example, responsive to receiving a confirmation of a preliminary description and/or a modified preliminary description, the function button system 100 can provide a function prompt corresponding to the series of functions to an LLM to cause the LLM to execute the series of functions. FIG. 21 illustrates the function button system 100 executing a series of functions responsive to a selection of an autonomous workflow function button and using a function ticker to generate a description of how automated execution of the series of functions was performed by the LLM in accordance with one or more embodiments.

As illustrated in FIG. 21, the function button system 100 can receive a selection of an autonomous workflow function button 2110 that the function button system 100 displays in a floating widget 2108 of a webpage. Based on receiving the selection of the autonomous workflow function button 2110 (and/or based on receiving a confirmation of a preliminary description and/or a modified preliminary description of an automated workflow), the function button system 100 can execute an automated workflow that includes a series of functions. Specifically, the function button system 100 can generate a function prompt (e.g., the autonomous workflow prompt 806 of FIG. 8) to provide to an LLM to use the LLM to execute the series of functions. As previously discussed, the function button system 100 can execute the automated workflow that includes the series of functions.

Additionally, the function button system 100 can generate a function execution panel 2102 within the webpage. Simultaneously with executing the series of functions, the function button system 100 can use a function ticker within the function execution panel 2102 to depict or otherwise provide a description 2104 of how automated execution of the series of functions was performed by the LLM. Specifically, the function button system 100 can generate the description 2104 by generating a function-specific description of each function of the series of functions that the function button system 100 uses the LLM to execute. Further, the function button system 100 can use the function ticker to generate each function-specific description as the LLM executes the function. To illustrate, the function button system 100 can generate the description to progressively depict "Clicking On PDF Statement Download Button. Saving Receipt PDF. Clicking Account Dropdown. Filling In Account Info. Clicking Merchant. Filling In Merchant. Clicking Upload Receipt. Uploading Receipt PDF. Clicking Purchase Date On Receipt. Extracting Purchase Date From Receipt PDF. Filling In Purchase Date on Receipt" as the function button system 100 executes the functions that correspond to each description. In some embodiments, the function button system 100 can receive a modification to the description 2104 via a chat interface 2106.

Figure 22:
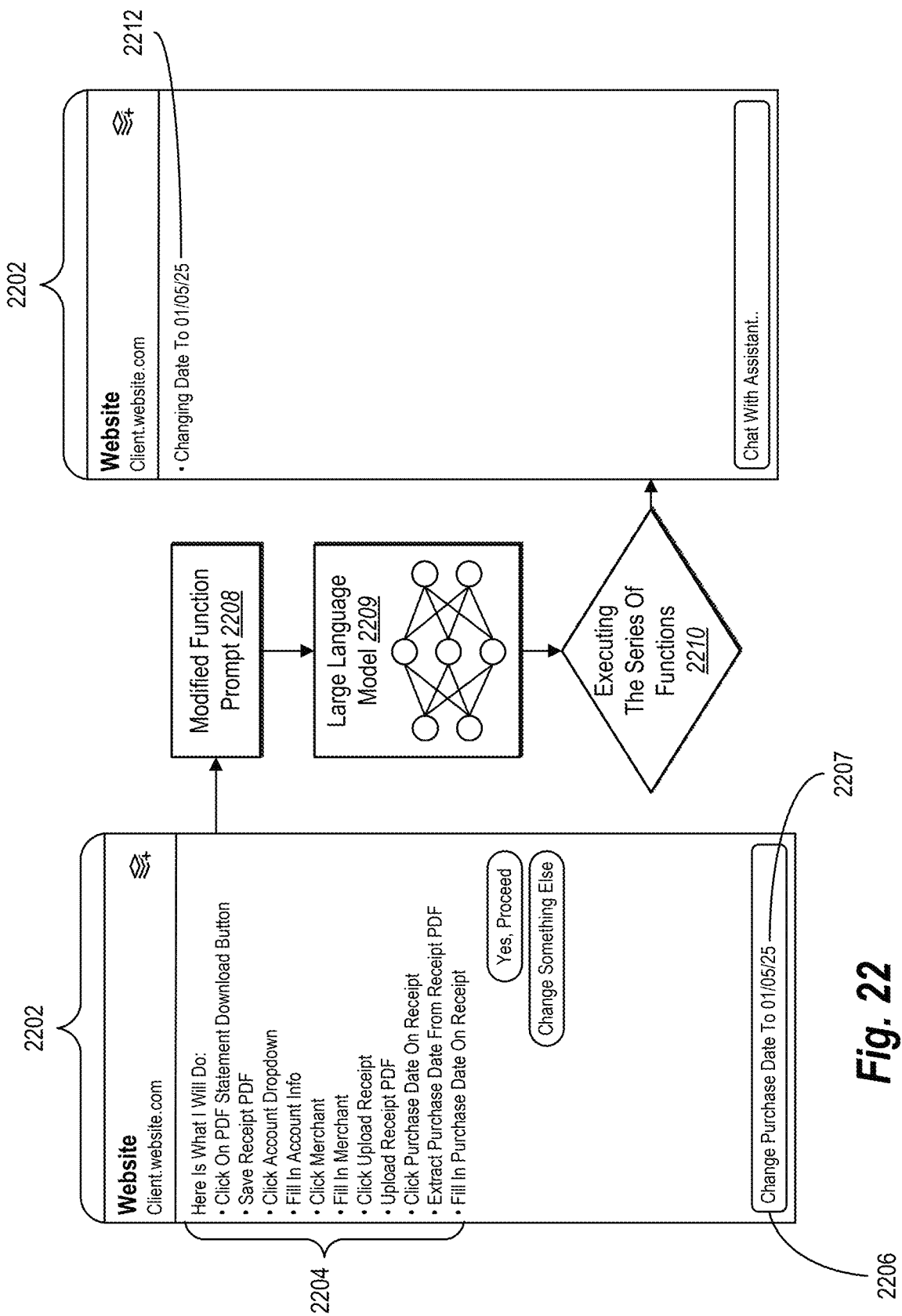
FIG. 22 illustrates the function button system receiving a modification to the description of the automated workflow and executing the series of functions according to the modification in accordance with some embodiments.

As previously mentioned, the function button system 100 can execute a function based on a modification received to a description of an execution of an automated function. For example, the function button system 100 can execute a series of functions and generate a description of the series of function within a function execution panel. FIG. 22 illustrates the function button system 100 receiving a modification to the description and executing the series of functions based on the modification in accordance with one or more embodiments.

As illustrated in FIG. 22, the function button system 100 can provide a description 2204 of automated execution of a series of functions performed by an LLM 2209 in a function execution panel 2202 of a webpage. For example, the function button system 100 can generate the description 2204 to indicate one or more modifications or interactions the function button system 100 used an LLM 2209 to perform relating to the webpage. Further, based on providing the description 2204 in the function execution panel 2202, the function button system 100 can receive a modification 2207 to the description 2204 via a chat interface 2206 of the function execution panel 2202.

As shown in FIG. 22, the function button system 100 can provide the modified function prompt 2208 to the LLM 2209 to use the LLM 2209 to perform an act 2210 of executing the series of functions. Specifically, the function button system 100 can generate the modified function prompt 2208 to indicate one or more functions of the series of functions for the function button system 100 to use the LLM 2209 to execute (e.g., to perform the act 2210) according to different input parameters. For example, based on the description 2204, modification 2207, and/or content of the webpage, the function button system 100 can generate the modified function prompt 2208 to indicate one or more different input parameters for the LLM 2209 to use (e.g., such as a different date) when the function button system 100 performs the act 2210. Thus, by generating the description 2204 and receiving the modification 2207 to the description 2204, the function button system 100 can propagate changes described in the modification 2207 to the series of functions that the function button system 100 autonomously executes to provide an increase in operational flexibility and accuracy compared to conventional systems. In some embodiments, the series functions can include subroutines/other computer processes in addition to LLM functions. For example, the series of functions can include functions and subroutines that the function button system 100 can use functionalities of a web browser to perform. Further, the series of functions can include functions that the function button system 100 uses to augment functionalities of the web browser.

As shown in FIG. 22, based on performing the act 2210, the function button system 100 can use the function ticker to generate a modified description 2212 of the automated execution of the series of functions within the function execution panel 2202. Specifically, the function button system 100 can generate the modified description 2212 to indicate one or more changes the function button system 100 made according to the modification 2207. Further, the function button system 100 can iteratively receive additional modifications (e.g., via the chat interface 2206) and execute the series of functions according to the additional modifications.

Indeed, as the foregoing discussion illustrates, when the function button system 100 performs the act 2210 to execute the series of functions, the series of functions can include a variety of types of functions. For example, the series of functions can include a first function type corresponding to navigating to specific fields within the webpage or locations other than the webpage. Additionally, the series of functions can include a second function type corresponding to data extraction from content items. Further, the series of functions can include a third function type corresponding to modifying a specific field of a webpage. Moreover, the series of functions can include additional function types corresponding to functions of other LLM function buttons previously described (e.g., such as a fourth function type corresponding to generating a summary of content of the webpage, a fifth function type corresponding to generating tone-specific composed text according to content of the webpage, a sixth function type corresponding to generating a templated content item according to content of the webpage, among others).

Figure 23:
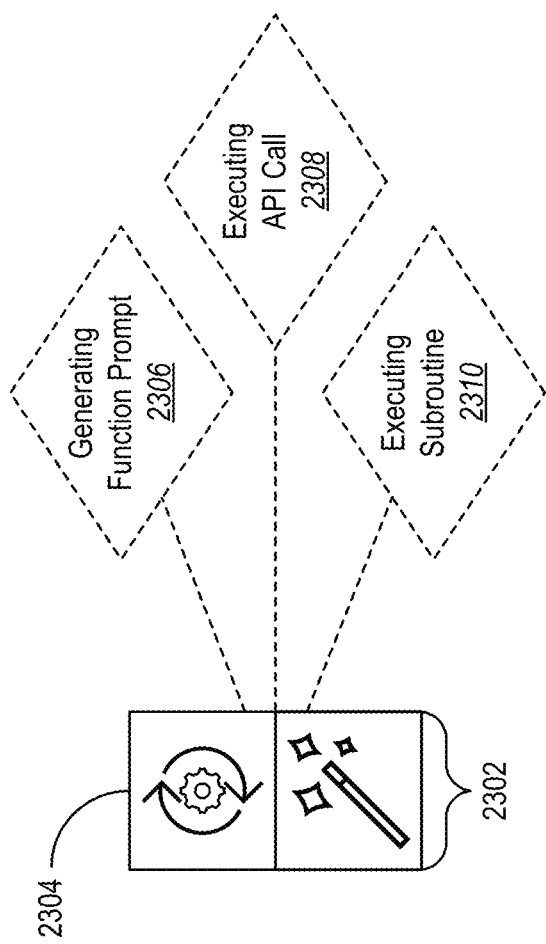
FIG. 23 illustrates the function button system executing a series of functions responsive to a selection of an autonomous function workflow button by generating a function prompt to provide to an LLM, executing an application programming interface (API) call, or executing a subroutine defined by computer code embedded in the autonomous function workflow button in accordance with some embodiments.

As previously mentioned, the function button system 100 can generate an autonomous workflow function button to utilize an LLM to perform the autonomous function. In some embodiments, the function button system 100 can implement additional methods, such as executing an application programming interface (API) call or executing a subroutine defined by computer code, to execute the series of functions of the autonomous function. FIG. 23 illustrates the function button system 100 executing the series of functions by generating a function prompt (e.g., to provide to an LLM), executing an API call, or executing a subroutine defined in computer code in accordance with one or more embodiments.

As illustrated in FIG. 23 and as previously discussed, the function button system 100 can display a floating widget 2302 within a webpage. Specifically, the function button system 100 can display the floating widget 2302 within the webpage by overlaying the floating widget on content of the webpage. Further, the function button system 100 can generate the floating widget 2302 to include an autonomous workflow function button 2304 that the function button system 100 generated according to recording a set of user account interactions corresponding to the webpage (e.g., as discussed above at least with regard to FIG. 19) or by determining a functionality for the autonomous workflow function button 2304 through a function option of a button generation panel (e.g., as discussed above at least with regard to FIG. 12).

As shown in FIG. 23, responsive to detecting an interaction with the autonomous workflow function button 2304, the function button system 100 can perform an act 2306 of generating a function prompt (e.g., to provide to an LLM to cause the LLM to perform or otherwise execute a series of functions). In some embodiments, the function button system 100 implement additional methodologies to execute or otherwise perform the series of functions.

In some embodiments, the function button system 100 can perform or otherwise execute the series of functions by performing an act 2308 of executing an API call. For example, the function button system 100 can perform the act 2308 by transmitting data (e.g., such as content of the webpage) to a server. For example, the function button system 100 can construct an HTTP request that identifies an operation method (e.g., such as GET to retrieve data and/or POST to submit data), identifies a target URL, and further includes any necessary headers corresponding to content type. The function button system 100 can convert content of the webpage and/or instructions corresponding to the content into JSON format and can insert the JSON formatted data into a request body of the HTTP request. Based on generating the request body of the JSON format, the function button system 100 sends the HTTP request to a server to execute the series of function as indicated by the HTTP request. The function button system 100 can further generate an LLM prompt from the retrieved data and can execute a function by providing the prompt to the LLM.

In some embodiments, the function button system 100 can perform or otherwise execute the series of functions by performing an act 2310 of executing a subroutine. Specifically, the function button system 100 can perform the act 2310 by executing a subroutine defined by computer code embedded in the autonomous workflow function button 2304. For example, responsive to detecting a selection of the autonomous workflow function button 2304, the function button system 100 can perform the act 2310 by using the web browser to execute the subroutine embedded in the computer code. To illustrate, the function button system 100 can generate the subroutine to have a variety of different structures, such as a named function, an inline function, or an anonymous function, among others. The function button system 100 can execute the subroutine to execute the series of functions as indicated by content of the webpage.

FIGS. 17-23, the corresponding text, and the examples provide a number of different systems and methods for generating an LLM function button according to a function option and an address option of a button generation panel. In addition to the foregoing, implementations can also be described in terms of flowcharts comprising acts or steps in a method for accomplishing a particular result. For example, FIG. 24 illustrates an example series of acts for generating an LLM function button according to interactions with a button generation panel in accordance with one or more embodiments.

Figure 24:
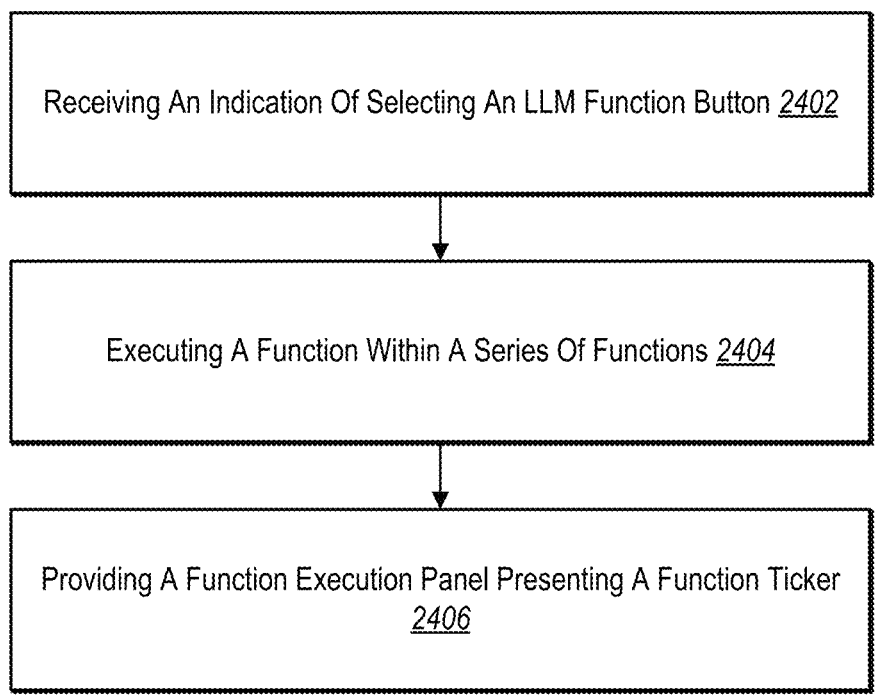
FIG. 24 illustrates an example flowchart of a series of acts for automatedly performing a function of a series of functions in response to a selection of an autonomous workflow function button in accordance with some embodiments.

While FIG. 24 illustrates acts according to certain implementations, alternative implementations may omit, add to, reorder and/or modify any of the acts shown in FIG. 24. The acts of FIG. 24 can be performed as part of a computer-implemented method. Alternatively, a non-transitory computer readable medium can comprise instructions, that when executed by one or more processors, cause a computing device to perform the acts of FIG. 24. In still further implementations, a system can perform the acts of FIG. 24.

As illustrated, the series of acts 2400 can include an act 2402 of receiving an indication selecting an LLM function button. Specifically, the act 2402 can include receiving, from a client device displaying a webpage within a web browser, an indication of selecting a large language model (LLM) function button for executing a series of functions related to content within the webpage. Further, the series of acts 2400 can include an act 2404 of executing a function within a series of functions. Specifically, the act 2404 can include, in response to the indication of selecting the LLM function button, executing a function within the series of functions by generating a function prompt comprising the content within the webpage and further comprising LLM instructions to execute the function based on the content within the webpage. Moreover, the series of acts 2400 can include an act 2406 of providing a function execution panel presenting a function execution ticker. Specifically, the act 2406 can include providing, for display within the web browser on the client device, a function execution panel presenting a function ticker depicting a description of how automated execution of the function was performed by an LLM using the function prompt.

In addition, in some embodiments, the series of acts 2400 can include determining the function within the series of functions according to the content within the webpage.

Further, in one or more embodiments, the series of acts 2400 can include providing, via the function execution panel, a preliminary description of the automated execution of the function. Indeed, the series of acts 2400 can include requesting, via the function execution panel, a modification to the automated execution of the function.

Additionally, in some embodiments, the series of acts 2400 can include receiving, via a chat interface of the function execution panel, a modification to the preliminary description of the automated execution of the function. Indeed, the series of acts 2400 can include executing the function according to the modification based on receiving an approval of a modified preliminary description of the automated execution of the function via the function execution panel.

Moreover, in one or more embodiments, the series of acts 2400 can include recording a series of user account interactions relating to the webpage. Indeed, the series of acts 2400 can include extracting a workflow comprising a plurality of steps from the series of user account interactions. Further, the series of acts 2400 can include determining the series of functions according to combinations of the plurality of steps.

In addition, in some embodiments, the series of acts 2400 can include determining a repeated access pattern and a repeated action pattern corresponding to the webpage. Indeed, the series of acts 2400 can include generating a recording request that indicates an autonomously executable function according to the repeated access pattern and the repeated action pattern. Further, the series of acts 2400 can include receiving a confirmation of the recording request.

Furthermore, in one or more embodiments, the series of acts 2400 can include performing one or more of: modifying a field of the webpage, mimicking a navigational input, or extracting data from a content item.

Indeed, in some embodiments, the series of acts 2400 can include receiving, from a client device displaying a webpage within a web browser, an indication of selecting a large language model (LLM) function button for executing a series of functions related to content within the webpage. Additionally, the series of acts 2400 can include in response to the indication of selecting the LLM function button, determining a function within a series of functions to execute at least according to the content within the webpage. Moreover, the series of acts 2400 can include executing a function within the series of functions by generating a function prompt comprising the content within the webpage and further comprising LLM instructions to execute the function based on the content within the webpage. In addition, the series of acts 2400 can include providing, for display within the web browser on the client device, a function execution panel presenting a function ticker depicting a description of how automated execution of the function was performed by an LLM using the function prompt.

Additionally, in one or more embodiments, the series of acts 2400 can include performing a first function comprising navigating to a field of the webpage. Indeed, the series of acts 2400 can include performing a second function to extract data that is relevant to the field of the webpage from a content item hosted within a content management system. Further, the series of acts 2400 can include performing a third function comprising modifying the field of the webpage by inputting the data.

Moreover, in some embodiments, the series of acts 2400 can include performing the function by executing a call to an application processing interface (API).

In addition, in one or more embodiments, the series of acts 2400 can include providing, via the function execution panel, a preliminary description of the automated execution of the function; and requesting, via the function execution panel, a modification to the automated execution of the function.

Furthermore, in some embodiments, the series of acts 2400 can include receiving, via a chat interface of the function execution panel, a modification to the preliminary description of the automated execution of the function. Indeed, the series of acts 2400 can include executing the function according to the modification based on receiving an approval of a modified preliminary description of the automated execution of the function via the function execution panel.

Additionally, in one or more embodiments, the series of acts 2400 can include recording a series of user account interactions relating to the webpage. Further, the series of acts 2400 can include extracting a workflow comprising a plurality of steps from the series of user account interactions. Indeed, the series of acts 2400 can include determining the series of functions according to combinations of the plurality of steps.

Moreover, in some embodiments, the series of acts 2400 can include determining a repeated access pattern and a repeated action pattern corresponding to the webpage. Further, the series of acts 2400 can include generating a recording request that indicates an autonomously executable function according to the repeated access pattern and the repeated action pattern. Furthermore, the series of acts 2400 can include receiving a confirmation of the recording request.

Indeed, in one or more embodiments, the series of acts 2400 can include receiving, from a client device displaying a webpage within a web browser, an indication of selecting a large language model (LLM) function button for executing a series of functions related to content within the webpage. Further, the series of acts 2400 can include in response to the indication of selecting the LLM function button, executing the series of functions by generating a function prompt comprising the content within the webpage and further comprising LLM instructions to execute the series of functions based on the content within the webpage. Additionally, the series of acts 2400 can include providing, for display within the web browser on the client device, a function execution panel presenting a function ticker depicting a description of how automated execution of the series of functions was performed by an LLM using the function prompt.

In addition, in some embodiments, the series of acts 2400 can include receiving a modification to the description of how automated execution of the series of functions was performed by the LLM. Furthermore, the series of acts 2400 can include generating a modified function prompt according to the modification to the description. Indeed, the series of acts 2400 can include executing the series of functions according to the modified function prompt. Additionally, the series of acts 2400 can include providing, for display within the web browser on the client device, the function execution panel presenting a function ticker depicting a modified description of how automated execution of the series of functions was performed according to the modified function prompt.

Furthermore, in one or more embodiments, the series of acts 2400 can include performing the series of functions by executing a subroutine defined by computer code embedded in the LLM function button.

Additionally, in some embodiments, the series of acts 2400 can include providing, via the function execution panel, a preliminary description of the automated execution of the series of functions. Indeed, the series of acts 2400 can include requesting, via the function execution panel, a modification to the automated execution of the series of functions.

Moreover, in one or more embodiments, the series of acts 2400 can include receiving, via a chat interface of the function execution panel, a modification to the preliminary description of the automated execution of the series of functions. Indeed, the series of acts 2400 can include executing the series of functions according to the modification based on receiving an approval of a modified preliminary description of the automated execution of the series of functions via the function execution panel.

Furthermore, in some embodiments, the series of acts 2400 can include recording a series of user account interactions relating to the webpage. Additionally, the series of acts 2400 can include extracting a workflow comprising a plurality of steps from the series of user account interactions. Moreover, the series of acts 2400 can include determining the series of functions according to combinations of the plurality of steps.

Figure 25:
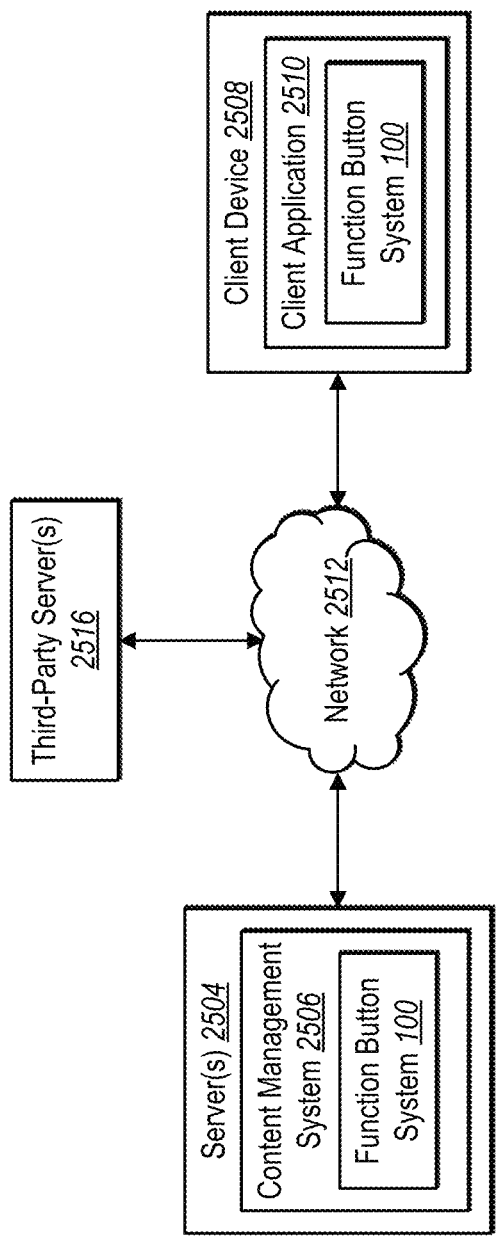
FIG. 25 illustrates a schematic diagram of an example environment of a function button system in accordance with some embodiments.

Additional detail regarding the function button system will now be provided with reference to the figures. For example, FIG. 25 illustrates a schematic diagram of an example system environment for implementing a function button system 100 in accordance with one or more implementations.

As shown, the environment includes server(s) 2504, a client device 2508 (e.g., the client devices described herein), third-party servers 2516 and a network 2512. Each of the components of the environment can communicate via the network 2512, and the network 2512 may be any suitable network over which computing devices can communicate. Example networks are discussed in more detail below in relation to FIGS. 26-27.

As mentioned above the example environment includes a client device 2508. The client device 2508 can be one of a variety of computing devices, including a smartphone, a tablet, a smart television, a desktop computer, a laptop computer, a virtual reality device, an augmented reality device, or another computing device as described in relation to FIGS. 26-27. The client device 2508 can communicate with the server(s) 2504 via the network 2512. For example, the client device 2508 can receive user input from a user interacting with the client device 2508 (e.g., via a client application 2510) to, for instance, select or otherwise indicate an LLM function button (such as an LLM function button the function button system 100 displays in a floating widget in a webpage. In addition, the function button system 100 on the server(s) 2504 can receive information relating to various interactions with LLM function buttons content items and/or interface elements within side panels based on the input received by the client device 2508 (e.g., to generate side panels, including button generation panels and/or function execution panels, to extract data from content items, or to provide prompts to LLMs).

As shown, the client device can include a client application 2510. In particular, the client application 2510 may be a web application, a native application installed on the client device 2508 (e.g., a mobile application, a desktop application, etc.), or a cloud-based application where all or part of the functionality performed by the server(s) 2504. Based on instructions from the client application 2510, the client device 2508 can present or display information, including a side panel for previewing or otherwise editing one or more functionalities of an LLM function button.

As illustrated in FIG. 25, the example environment also includes the server(s) 2504. The server(s) 2504 may generate, track, store, process, receive, and transmit electronic data, such as digital content (e.g., content items), LLMs, prompts for LLMs, summaries, tone-specific composed text, templated content items, interface elements within side panels, queries and responses to queries (e.g., received via chat interfaces of side panels), customized or autonomous workflows, and/or interactions between user accounts on client devices. In addition, the server(s) 2504 can transmit data to the client device in the form of outputs of LLM function buttons or notifications. Indeed, the server(s) 2504 can communicate with the client device 2508 to send and/or receive data via the network 2512. In some implementations, the server(s) 2504 include(s) a number of server devices distributed across the network 2512 and located in different physical locations. The server(s) 2504 can comprise one or more content servers, application servers, communication servers, web-hosting servers, machine learnings servers, and other types of servers.

As shown in FIG. 25, the server(s) 2504 can also include the function button system 100 as part of the content management system 2506. The content management system 2506 can communicate with the client device 2508 to perform various functions associated with the client application 2510 such as managing user accounts, generating a subset of LLM function buttons for display within a floating widget of a webpage, updating the subset of LLM function buttons for display within the floating widget responsive to determining a change in context (e.g., such as a change of a webpage), executing functions of selected LLM function buttons, and otherwise facilitating user account interaction with LLMs or other types of artificial intelligence. Indeed, the content management system 2506 can include a network-based smart cloud storage system to manage, store, and maintain content items, models, and related data across numerous user accounts, including user accounts in collaboration with one another.

Additionally, as shown in FIG. 25, the example environment includes third-party server(s) 2516. The third-party server(s) 2516 may generate, track, store, process, receive, and transmit electronic data, such as digital content (e.g., content items), prompts for LLMs (e.g., responsive to selection of an LLM function button), content of webpages, and/or interactions between user accounts or client devices. In addition, the third-party server(s) 2516 can transmit data to the client device 2508 in the responses to prompts provided to LLMs, such as summaries of content of a webpage, chat interfaces, tone-specific composed text, templated content items, autonomous workflows, side panels, and/or interactions between user accounts or client devices. Indeed, the third-party server(s) 2516 can communicate with the client device 2508 to send and/or receive data via the network 2512. The third-party server(s) 2516 can comprise one or more content servers, application servers, communication servers, web-hosting servers, machine learning servers, and other types of servers. In some embodiments, the function button system 100 can interface with the third-party servers 2516 to access, store, modify, or otherwise interact with content items.

Although FIG. 25 depicts the function button system 100 located on the server(s) 2504, in some implementations, the function button system 100 may be implemented by (e.g., located entirely on or in part on) one or more other components of the environment. For example, the function button system 100 may be implemented by the client device 2508 and/or a third-party device. For example, the client device 2508 can download all or part of the function button system 100 for implementation independent of, or together with, the server(s) 2504 and/or third-party server(s) 2516. Moreover, in some implementations, the function button system 100 may solely generate a single scrollable page within a scroll navigation interface.

In some implementations, though not illustrated in FIG. 25, the environment may have a different arrangement of components and/or may have a different number or set of components altogether. For example, the client device 2508 may communicate directly with the function button system 100, bypassing the network 2512. As another example, the environment can include a database located external to the server(s) 2504 (e.g., in communication via the network 2512) or located on the server(s), on a third-party system, and/or on the client device 2508.

The components of the function button system 100 can include software, hardware, or both. For example, the components of the function button system 100 can include one or more instructions stored on a computer-readable storage medium executable by processors of one or more computing devices. When executed by one or more processors, the computer-executable instructions of the function button system 100 can cause a computing device to perform the methods described herein. Alternatively, the components of the function button system 100 can comprise hardware, such as a special processing device to perform a certain function or group of functions. Additionally or alternatively, the components of the function button system 100 can include a combination of computer-executable instructions and hardware.

Furthermore, the components of the function button system 100 performing the functions described herein may, for example, be implemented as part of a stand-alone application, as a module of an application, as a plug-in for applications including content management applications, as a library function or functions that may be called by other applications, and/or as a cloud-computing model. Thus, the components of the function button system 100 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 26:
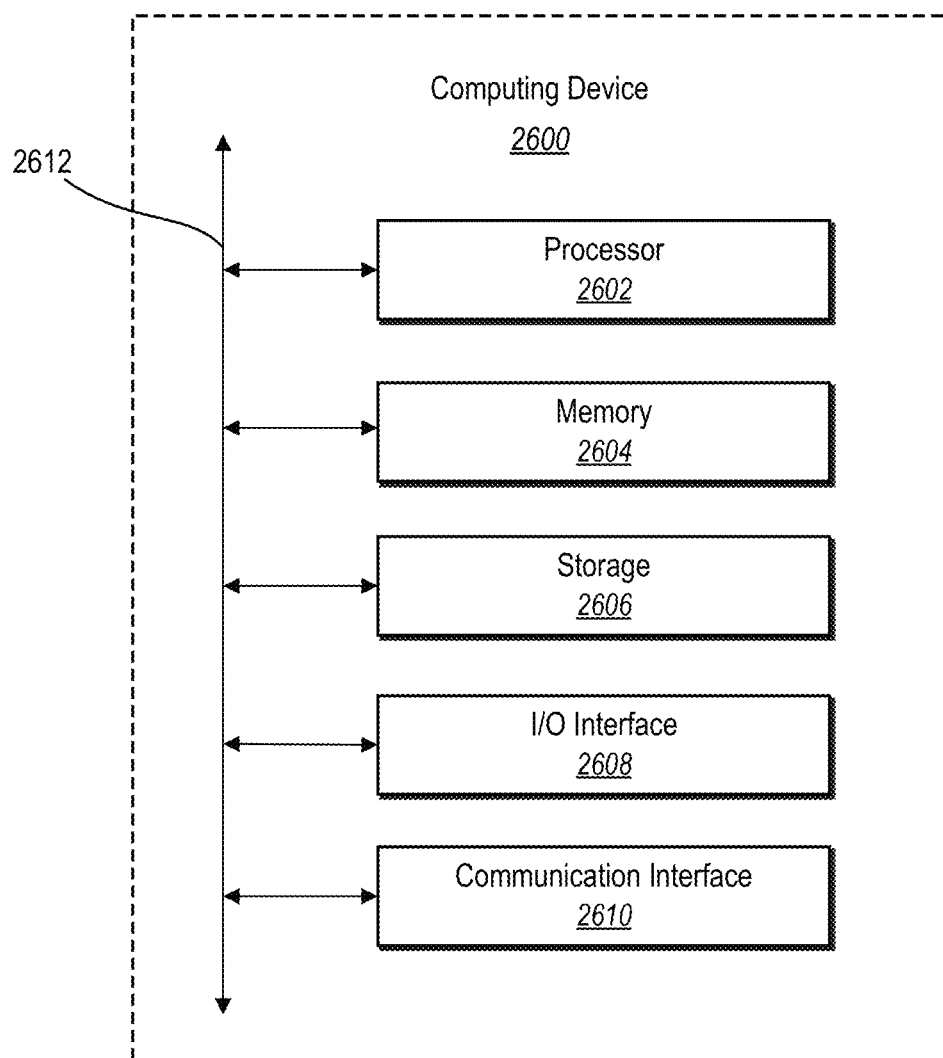
FIG. 26 illustrates a block diagram of a computing device for implementing one or more embodiments of the function button system.

FIG. 26 illustrates a block diagram of exemplary computing device 2600 (e.g., the server(s) 2504 and/or the client device 2508) that may be configured to perform one or more of the processes described above in accordance with one or more implementations. One will appreciate that server(s) 2504 and/or the client device 2508 may comprise one or more computing devices such as computing device 2600. As shown by FIG. 26, computing device 2600 can comprise processor 2602, memory 2604, storage device 2606, I/O interface 2608, and communication interface 2610, which may be communicatively coupled by way of communication infrastructure 2612. While an exemplary computing device 2600 is shown in FIG. 26, the components illustrated in FIG. 26 are not intended to be limiting. Additional or alternative components may be used in other implementations. Furthermore, in certain implementations, computing device 2600 can include fewer components than those shown in FIG. 26. Components of computing device 2600 shown in FIG. 26 will now be described in additional detail.

In particular implementations, processor 2602 includes hardware for executing instructions, such as those making up a computer program. As an example and not by way of limitation, to execute instructions, processor 2602 may retrieve (or fetch) the instructions from an internal register, an internal cache, memory 2604, or storage device 2606 and decode and execute them. In particular implementations, processor 2602 may include one or more internal caches for data, instructions, or addresses. As an example and not by way of limitation, processor 2602 may include one or more instruction caches, one or more data caches, and one or more translation lookaside buffers (TLBs). Instructions in the instruction caches may be copies of instructions in memory 2604 or storage device 2606.

Memory 2604 may be used for storing data, metadata, and programs for execution by the processor(s). Memory 2604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 2604 may be internal or distributed memory.

Storage device 2606 includes storage for storing data or instructions. As an example and not by way of limitation, storage device 2606 can comprise a non-transitory storage medium described above. Storage device 2606 may include a hard disk drive (HDD), a floppy disk drive, flash memory, an optical disc, a magneto-optical disc, magnetic tape, or a Universal Serial Bus (USB) drive or a combination of two or more of these. Storage device 2606 may include removable or non-removable (or fixed) media, where appropriate. Storage device 2606 may be internal or external to computing device 2600. In particular implementations, storage device 2606 is non-volatile, solid-state memory. In other implementations, Storage device 2606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 2608 allows a user to provide input to, receive output from, and otherwise transfer data to and receive data from computing device 2600. I/O interface 2608 may include a mouse, a keypad or a keyboard, a touch screen, a camera, an optical scanner, network interface, modem, other known I/O devices or a combination of such I/O interfaces. I/O interface 2608 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 2608 is configured to provide graphical data to a display for presentation to a user. The graphical data may be representative of one or more graphical user interfaces and/or any other graphical content as may serve a particular implementation.

Communication interface 2610 can include hardware, software, or both. In any event, communication interface 2610 can provide one or more interfaces for communication (such as, for example, packet-based communication) between computing device 2600 and one or more other computing devices or networks. As an example and not by way of limitation, communication interface 2610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 2610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 2610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 2610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 2612 may include hardware, software, or both that couples components of computing device 2600 to each other. As an example and not by way of limitation, communication infrastructure 2612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

Figure 27:
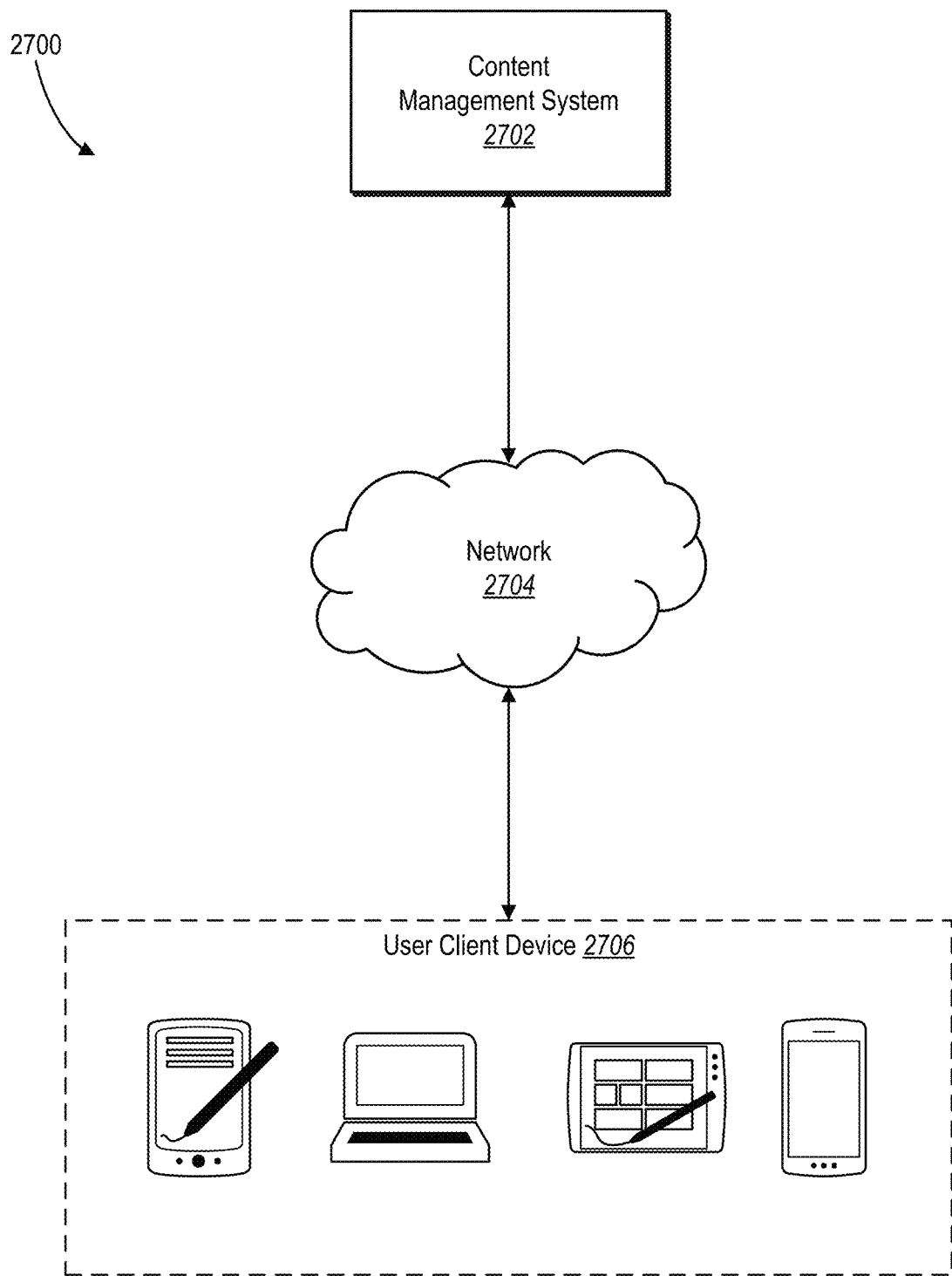
FIG. 27 illustrates an example environment of a content management system having the function button system in accordance with one or more embodiments.

FIG. 27 is a schematic diagram illustrating environment 2700 within which one or more implementations of the function button system 100 can be implemented. For example, the function button system 100 may be part of a content management system 2702 (e.g., the content management system 2702). Content management system 2702 may generate, store, manage, receive, and send digital content (such as digital content items). For example, content management system 2702 may send and receive digital content to and from client devices 2706 by way of network 2704. In particular, content management system 2702 can store and manage a collection of digital content. Content management system 2702 can manage the sharing of digital content between computing devices associated with a plurality of users. For instance, content management system 2702 can facilitate a user sharing a digital content with another user of content management system 2702.

In particular, content management system 2702 can manage synchronizing digital content across multiple client devices 2706 associated with one or more users. For example, a user may edit digital content using client device 2706. The content management system 2702 can cause client device 2706 to send the edited digital content to content management system 2702. Content management system 2702 then synchronizes the edited digital content on one or more additional computing devices.

In addition to synchronizing digital content across multiple devices, one or more implementations of content management system 2702 can provide an efficient storage option for users that have large collections of digital content. For example, content management system 2702 can store a collection of digital content on content management system 2702, while the client device 2706 only stores reduced-sized versions of the digital content. A user can navigate and browse the reduced-sized versions (e.g., a thumbnail of a digital image) of the digital content on client device 2706. In particular, one way in which a user can experience digital content is to browse the reduced-sized versions of the digital content on client device 2706.

Another way in which a user can experience digital content is to select a reduced-size version of digital content to request the full- or high-resolution version of digital content from content management system 2702. In particular, upon a user selecting a reduced-sized version of digital content, client device 2706 sends a request to content management system 2702 requesting the digital content associated with the reduced-sized version of the digital content. Content management system 2702 can respond to the request by sending the digital content to client device 2706. Client device 2706, upon receiving the digital content, can then present the digital content to the user. In this way, a user can have access to large collections of digital content while minimizing the amount of resources used on client device 2706.

Client device 2706 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 2706 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 2704.

Network 2704 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 2706 may access content management system 2702.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   generating, for display overlaid on a first webpage within a web browser, a floating widget comprising a large language model (LLM) function button corresponding to first content of the first webpage overlaid by the floating widget;
   updating, in response to detecting a navigational input within the web browser navigating from the first webpage to a second webpage comprising second content different from the first content, the floating widget to overlay the second content of the second webpage;
   modifying, in response to detecting the floating widget overlaying the second content, the floating widget to include a different LLM function button corresponding to the second content of the second webpage;

generating, based on detecting an interaction with the LLM function button, a prompt for an LLM associated with the LLM function button, the prompt comprising an instruction for the LLM to complete a function of the LLM function button; and providing the instruction and the first content of the first webpage to the LLM to cause the LLM to complete a function according to the prompt that includes the instruction and the first content.

2. The computer-implemented method of claim 1, further comprising:
generating the floating widget to display a first subset of a plurality of LLM function buttons; and
modifying the floating widget to display a second subset of the plurality of LLM function buttons in response to detecting the navigational input.

3. The computer-implemented method of claim 2, further comprising:
responsive to receiving an indication of a selection of a summarize function button from among the plurality of LLM function buttons:
extracting current content of a current webpage overlaid by the floating widget at selection of the summarize function button;
generating a summary prompt comprising the current content and instructions to summarize the current content;
generating, based on providing the summary prompt to an LLM, a summary of the current content; and
providing the summary within a side panel of the web browser.

4. The computer-implemented method of claim 2, further comprising:
responsive to receiving an indication of a selection of a chat function button from among the plurality of LLM function buttons:
instantiating a chat interface in a side panel of the web browser;
extracting current content of a current webpage overlaid by the floating widget at selection of the chat function button;
generating, in response to a query provided via the chat interface, a chat prompt comprising the current content, the query, and an instruction to generate a response to the query from the current content; and
generating the response to the query for display in the chat interface by providing the chat prompt to an LLM.

5. The computer-implemented method of claim 2, further comprising:
responsive to receiving an indication of a selection of a tone function button from among the plurality of LLM function buttons:
extracting current content of a current webpage overlaid by the floating widget at selection of the tone function button;
generating a tone prompt comprising the current content and an instruction to generate tone-specific composed text according to a tone associated with the current content of the current webpage;
generating, based on providing the tone prompt to an LLM, the tone-specific composed text; and
providing the tone-specific composed text for display within a side panel of the web browser.

6. The computer-implemented method of claim 2, further comprising:
responsive to receiving an indication of a selection of a template function button from among the plurality of LLM function buttons:
extracting current content of a current webpage overlaid by the floating widget at selection of the template function button;
generating a template prompt comprising the current content and instructions to generate a templated content item according to the current content within the current webpage;
generating, based on providing the template prompt to an LLM, the templated content item; and
providing the templated content item within a side panel of the web browser.

7. The computer-implemented method of claim 2, further comprising:
responsive to receiving an indication of a selection of an autonomous workflow function button from among the plurality of LLM function buttons:
extracting current content of a current webpage overlaid by the floating widget at selection of the autonomous workflow function button;
generating an autonomous workflow prompt comprising the current content and instructions to execute an autonomous workflow based on the current content; and
executing the autonomous workflow by providing the autonomous workflow prompt to an LLM for modifying one or more fields within the current webpage.

8. A system comprising:
at least one processor; and
at least one non-transitory computer readable storage medium storing instructions that, when executed by the at least one processor, cause the system to:
generate, for display overlaid on a first webpage within a web browser, a floating widget comprising a first subset of a plurality of large language model (LLM) function buttons corresponding to first content of the first webpage overlaid by the floating widget;
update, in response to detecting a navigational input within the web browser navigating from the first webpage to a second webpage comprising second content different from the first content, the floating widget to overlay the second content of the second webpage;
modify, in response to detecting the floating widget overlaying the second content, the floating widget to include a second subset of the plurality of LLM function buttons corresponding to the second content of the second webpage;
generate, based on detecting an interaction with an LLM function button of the first subset of LLM function buttons, a prompt for an LLM associated with the LLM function button, the prompt comprising an instruction for the LLM to complete a function of the LLM function button; and
provide the instruction and the first content of the first webpage to the LLM to cause the LLM to complete a function according to the prompt that includes the instruction and the first content.

9. The system of claim 8, further comprising instructions that, when executed by the at least one processor, cause the system to:
determine a context set relevant to the second content of the second webpage, the context set comprising a plurality of webpages open in respective tabs of the web browser; and modify the floating widget to include the second subset of the plurality of LLM function buttons based on the context set.

10. The system of claim 8, further comprising instructions that, when executed by the at least one processor, cause the system to, responsive to receiving an indication of a selection of a summarize function button from among the first subset of the plurality of LLM function buttons:
   extract current content of a current webpage overlaid by the floating widget at selection of the summarize function button;
   generate a summary prompt comprising the current content and instructions to summarize the current content;
   generate, based on providing the summary prompt to an LLM, a summary of the current content; and
   provide the summary within a side panel of the web browser.

11. The system of claim 8, further comprising instructions that, when executed by the at least one processor, cause the system to, responsive to receiving an indication of a selection of a chat function button from among the first subset of the plurality of LLM function buttons:
   instantiate a chat interface in a side panel of the web browser;
   extract current content of a current webpage overlaid by the floating widget at selection of the chat function button;
   generate, in response to a query provided via the chat interface, a chat prompt comprising the current content, the query, and an instruction to generate a response to the query from the current content; and
   generate the response to the query for display in the chat interface by providing the chat prompt to an LLM.

12. The system of claim 8, further comprising instructions that, when executed by the at least one processor, cause the system to, responsive to receiving an indication of a selection of a tone function button from among the plurality of LLM function buttons:
   extract current content of a current webpage overlaid by the floating widget at selection of the tone function button;
   generate a tone prompt comprising the current content and an instruction to generate tone-specific composed text according to a tone indication within the current content of the current webpage;
   generate, based on providing the tone prompt to an LLM, the tone-specific composed text; and
   provide the tone-specific composed text within a side panel of the web browser.

13. The system of claim 8, further comprising instructions that, when executed by the at least one processor, cause the system to, responsive to receiving an indication of a selection of a template function button from among the plurality of LLM function buttons:
   extract current content of a current webpage overlaid by the floating widget at selection of the template function button;
   generate a template prompt comprising the current content and instructions to generate a templated content item according to the current content within the current webpage;
   generate, based on providing the template prompt to an LLM, the templated content item; and
   provide the templated content item within a side panel of the web browser.

14. The system of claim 8, further comprising instructions that, when executed by the at least one processor, cause the system to embed, based on current content of a current webpage, at least one LLM function button of the first subset of the plurality of LLM function buttons in the current webpage.

15. A non-transitory computer-readable medium storing instructions thereon that, when executed by at least one processor, cause a computing device to:
   generate, for display overlaid on a first webpage within a web browser, a floating widget comprising a large language model (LLM) function button corresponding to first content of the first webpage overlaid by the floating widget;
   update, in response to detecting a navigational input within the web browser navigating from the first webpage to a second webpage comprising second content different from the first content, the floating widget to overlay the second content of the second webpage;
   modify, in response to detecting the floating widget overlaying the second content, the floating widget to include a different LLM function button corresponding to the second content of the second webpage;
   generate, based on detecting an interaction with the LLM function button, a prompt for an LLM associated with the LLM function button, the prompt comprising an instruction for the LLM to complete a function of the LLM function button; and
   provide the instruction and the first content of the first webpage to the LLM to cause the LLM to complete the function according to the prompt that includes the instruction and the first content.

16. The non-transitory computer-readable medium of claim 15, further comprising instructions that, when executed by the at least one processor, cause the computing device to:
   generate, based on detecting the interaction with the LLM function button, a side panel adjacent to the first webpage within the web browser; and
   provide, for display in the side panel, a description of the LLM function button.

17. The non-transitory computer-readable medium of claim 15, further comprising instructions that, when executed by the at least one processor, cause the computing device to:
   generate the floating widget to display a first subset of a plurality of LLM function buttons; and
   modify the floating widget to display a second subset of the plurality of LLM function buttons in response to detecting the navigational input.

18. The non-transitory computer-readable medium of claim 17, further comprising instructions that, when executed by the at least one processor, cause the computing device to, based on determining that the LLM function button is a summarize function button:
   extract current content of a current webpage overlaid by the floating widget at selection of the summarize function button;
   generate a summary prompt comprising the current content and instructions to summarize the current content;
   generate, based on providing the summary prompt to an LLM, a summary of the current content; and
   provide the summary within a side panel of the web browser.

19. The non-transitory computer-readable medium of claim 17, further comprising instructions that, when executed by the at least one processor, cause the computing device to, based on determining that the LLM function button is a chat function button:

instantiate a chat interface in a side panel of the web browser;

extract current content of a current webpage overlaid by the floating widget at selection of the chat function button;

generate, in response to a query provided via the chat interface, a chat prompt comprising the current content, the query, and an instruction to generate a response to the query from the current content; and generate the response to the query for display in the chat interface by providing the chat prompt to an LLM.

20. The non-transitory computer-readable medium of claim 17, further comprising instructions that, when executed by the at least one processor, cause the computing device to, based on determining that the LLM function button is a template function button:

extract current content of a current webpage overlaid by the floating widget at selection of the template function button;

generate a template prompt comprising the current content and instructions to generate a templated content item according to the current content within the current webpage;

generate, based on providing the template prompt to an LLM, the templated content item; and provide the templated content item within a side panel of the web browser.

\* \* \* \* \*